United States Patent
Smith et al.

(10) Patent No.: US 9,971,356 B2
(45) Date of Patent: May 15, 2018

(54) RETRACTABLE AERODYNAMIC STRUCTURES FOR CARGO BODIES AND METHODS OF CONTROLLING POSITIONING OF THE SAME

(71) Applicant: Stemco Products, Inc., Charlotte, NC (US)

(72) Inventors: Andrew F. Smith, Redwood City, CA (US); Riccardo M. Pagliarella, San Francisco, CA (US); Court S. Hinricher, San Francisco, CA (US); Jeffrey J. Grossmann, San Francisco, CA (US); Jared A. Niemiec, Belmont, CA (US); Michael W. Polidori, Hayward, CA (US)

(73) Assignee: Stemco Products, Inc., Charlotte, NC (US)

( * ) Notice: Subject to any disclaimer, the term of this patent is extended or adjusted under 35 U.S.C. 154(b) by 0 days. days.

(21) Appl. No.: 14/830,114

(22) Filed: Aug. 19, 2015

(65) Prior Publication Data
US 2016/0077529 A1    Mar. 17, 2016

Related U.S. Application Data

(63) Continuation of application No. 13/939,924, filed on Jul. 11, 2013, now Pat. No. 9,145,177.
(Continued)

(51) Int. Cl.
*G05D 3/00* (2006.01)
*B62D 35/00* (2006.01)

(52) U.S. Cl.
CPC .............. *G05D 3/00* (2013.01); *B62D 35/00* (2013.01); *B62D 35/001* (2013.01); *B62D 35/004* (2013.01); *B62D 35/007* (2013.01)

(58) Field of Classification Search
CPC ...... G05D 3/00; B62D 35/004; B62D 35/007; B62D 35/001; B62D 35/00
(Continued)

(56) References Cited

U.S. PATENT DOCUMENTS

| 227,401 A | 5/1880 | Chaeles et al. |
|---|---|---|
| 609,789 A | 8/1898 | George |

(Continued)

FOREIGN PATENT DOCUMENTS

| CA | 2166495 A1 | 7/1997 | |
|---|---|---|---|
| CA | 2171398 A1 * | 9/1997 | ............. B62D 35/00 |

(Continued)

OTHER PUBLICATIONS

Vanhoenacker, Mark; "What's That Thing? Truck Fins Edition", Apr. 3, 2013, http://www.slate.com/blogs/browbeat/2013/04/03/truck_panels_what_do_they_do_explained_photos.html.*
(Continued)

*Primary Examiner* — Brian P Sweeney
(74) *Attorney, Agent, or Firm* — Perkins Coie LLP

(57) ABSTRACT

A system that has electrically or electro-pneumatically actuated aerodynamic structures. An electric or electro-pneumatic actuator is employed, which receives signals from an existing anti-lock braking system (ABS) controller to determine when actuation occurs. Other systems are also provided that feature electric or electro-pneumatic actuation, including underbody skirts and scoops, as well as inflatable tractor-trailer gap sealing devices, adjustable tractor-trailer gap sealing flaps and inflatable trailer upper streamlining devices. Electronic control units (ECUs) for aerodynamic system control interfacing with alternate sensors for calculating speed are also provided. Satellite navigation, platooning awareness and managed pressure reserve capability can be employed with the aerodynamics ECU.

24 Claims, 35 Drawing Sheets

Related U.S. Application Data

(60) Provisional application No. 61/779,777, filed on Mar. 13, 2013, provisional application No. 61/670,160, filed on Jul. 11, 2012.

(58) Field of Classification Search
USPC .................................................. 701/49
See application file for complete search history.

(56) References Cited

U.S. PATENT DOCUMENTS

| | | |
|---|---|---|
| 797,077 A | 8/1905 | Angus et al. |
| 891,537 A | 6/1908 | Graff |
| 1,352,679 A | 9/1920 | Myers |
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale et al. |
| 2,338,533 A | 1/1944 | Pash et al. |
| 2,344,515 A | 3/1944 | Massey |
| 2,547,528 A | 4/1951 | Lewis |
| 2,569,354 A | 9/1951 | Tracy et al. |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Forrest, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker et al. |
| 3,016,700 A | 1/1962 | Howald |
| 3,053,351 A | 9/1962 | Fulcher et al. |
| 3,074,079 A | 1/1963 | Isaacson et al. |
| 3,112,135 A | 11/1963 | Conrad et al. |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | Vaughn |
| 3,455,594 A | 7/1969 | Mrlik et al. |
| 3,496,687 A | 2/1970 | Greenberg et al. |
| 3,526,365 A | 9/1970 | Ursery et al. |
| 3,711,146 A | 1/1973 | Madzsar et al. |
| 3,743,343 A | 7/1973 | Grote et al. |
| 3,791,468 A | 2/1974 | Bryan et al. |
| 3,807,787 A | 4/1974 | Gotz |
| 3,834,752 A | 9/1974 | Friedenfeld et al. |
| 3,934,922 A | 1/1976 | MacCready et al. |
| 3,941,334 A | 3/1976 | Cole |
| 3,951,445 A | 4/1976 | Tatom et al. |
| 3,960,402 A | 6/1976 | Keck et al. |
| 3,971,586 A | 7/1976 | Saunders et al. |
| 3,977,716 A | 8/1976 | Whited et al. |
| 3,994,451 A | 11/1976 | Cole |
| 3,994,452 A | 11/1976 | Cole et al. |
| 3,999,797 A | 12/1976 | Kirsch et al. |
| 4,006,932 A | 2/1977 | McDonald et al. |
| 4,021,069 A | 5/1977 | Hersh et al. |
| 4,035,013 A | 7/1977 | Abbott et al. |
| 4,053,124 A | 10/1977 | Cole et al. |
| 4,113,299 A | 9/1978 | Johnson et al. |
| 4,117,900 A | 10/1978 | Amick et al. |
| 4,126,974 A | 11/1978 | Hardin et al. |
| 4,142,755 A | 3/1979 | Keedy et al. |
| 4,154,149 A | 5/1979 | Holford et al. |
| 4,174,863 A | 11/1979 | Gotz et al. |
| 4,210,354 A | 7/1980 | Canning et al. |
| 4,214,787 A | 7/1980 | Chain et al. |
| 4,236,745 A | 12/1980 | Davis et al. |
| 4,248,103 A | 2/1981 | Halsall et al. |
| 4,257,641 A | 3/1981 | Keedy et al. |
| 4,269,444 A | 5/1981 | Emory et al. |
| 4,300,797 A | 11/1981 | Whitley et al. |
| 4,316,630 A | 2/1982 | Evans et al. |
| 4,320,920 A | 3/1982 | Goudey et al. |
| 4,349,155 A | 9/1982 | Donguy |
| 4,357,045 A | 11/1982 | Kinford et al. |
| 4,375,898 A | 3/1983 | Stephens et al. |
| 4,379,582 A | 4/1983 | Miwa et al. |
| 4,383,407 A | 5/1983 | Inman et al. |
| 4,384,630 A | 5/1983 | Steiner et al. |
| 4,386,801 A | 6/1983 | Chapman et al. |
| 4,421,354 A | 12/1983 | Lemaster et al. |
| 4,433,865 A | 2/1984 | Crompton et al. |
| RE31,565 E | 4/1984 | Beaulieu |
| 4,451,074 A | 5/1984 | Scanlon et al. |
| D274,322 S | 6/1984 | Hayes et al. |
| 4,457,550 A | 7/1984 | Gielow et al. |
| 4,458,936 A | 7/1984 | Mulholland et al. |
| 4,458,937 A | 7/1984 | Beckmann et al. |
| 4,462,628 A | 7/1984 | Gregg et al. |
| 4,486,046 A | 12/1984 | Whitney et al. |
| 4,489,889 A | 12/1984 | Inman et al. |
| 4,508,380 A | 4/1985 | Sankrithi et al. |
| 4,518,188 A | 5/1985 | Witten et al. |
| 4,525,123 A | 6/1985 | Curci et al. |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Di et al. |
| 4,678,118 A | 7/1987 | Fukami et al. |
| 4,682,808 A | 7/1987 | Bilanin et al. |
| 4,688,841 A | 8/1987 | Moore et al. |
| 4,702,509 A | 10/1987 | Elliott, Sr. et al. |
| 4,706,910 A | 11/1987 | Walsh et al. |
| 4,722,500 A | 2/1988 | Bray |
| 4,741,569 A | 5/1988 | Sutphen et al. |
| 4,746,160 A | 5/1988 | Wiesemeyer |
| 4,773,692 A | 9/1988 | Schleicher et al. |
| 4,784,429 A | 11/1988 | Hodges et al. |
| 4,810,022 A | 3/1989 | Takagi et al. |
| 4,818,015 A | 4/1989 | Scanlon et al. |
| 4,944,550 A | 7/1990 | Drown et al. |
| 4,951,994 A | 8/1990 | Miwa et al. |
| 4,976,349 A | 12/1990 | Adkins |
| 4,978,162 A | 12/1990 | Labbe |
| 5,000,508 A | 3/1991 | Woods et al. |
| 5,058,945 A | 10/1991 | Elliott et al. |
| 5,108,145 A | 4/1992 | Harris et al. |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus et al. |
| 5,237,887 A | 8/1993 | Appleberry et al. |
| 5,240,306 A | 8/1993 | Flemming et al. |
| 5,280,990 A | 1/1994 | Rinard |
| 5,317,880 A | 6/1994 | Spears et al. |
| 5,332,280 A | 7/1994 | DuPont et al. |
| 5,348,366 A | 9/1994 | Baker et al. |
| 5,375,903 A | 12/1994 | Lechner et al. |
| 5,498,059 A | 3/1996 | Switlik |
| 5,570,924 A | 11/1996 | Few et al. |
| 5,609,384 A | 3/1997 | Loewen et al. |
| 5,823,610 A | 10/1998 | Ryan et al. |
| 5,842,734 A | 12/1998 | Lechner et al. |
| 5,857,648 A | 1/1999 | Dailey et al. |
| 5,902,000 A | 5/1999 | Wold et al. |
| 5,908,217 A | 6/1999 | Englar et al. |
| 5,947,548 A | 9/1999 | Carper et al. |
| 6,045,095 A | 4/2000 | Parrish et al. |

(56) References Cited

U.S. PATENT DOCUMENTS

| | | |
|---|---|---|
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham et al. |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,428,084 B1 | 8/2002 | Liss et al. |
| 6,457,766 B1 | 10/2002 | Telnack et al. |
| 6,467,833 B1 | 10/2002 | Travers et al. |
| 6,485,087 B1 | 11/2002 | Roberge et al. |
| 6,561,575 B2 | 5/2003 | Fairburn et al. |
| 6,565,112 B2 | 5/2003 | Hanson et al. |
| 6,595,578 B1 | 7/2003 | Calsoyds et al. |
| 6,616,218 B2 | 9/2003 | Bauer et al. |
| 6,644,720 B2 | 11/2003 | Long et al. |
| 6,666,498 B1 | 12/2003 | Whitten et al. |
| 6,669,270 B1 | 12/2003 | Card et al. |
| 6,742,616 B2 | 6/2004 | Leban et al. |
| 6,779,834 B1 | 8/2004 | Keller et al. |
| 6,789,839 B1 | 9/2004 | Samuelson et al. |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory et al. |
| 6,886,882 B2 | 5/2005 | Farlow et al. |
| 6,915,611 B2 | 7/2005 | Reiman et al. |
| 6,959,958 B2 | 11/2005 | Basford et al. |
| 6,974,178 B2 | 12/2005 | Ortega et al. |
| 7,008,004 B2 | 3/2006 | Ortega et al. |
| 7,008,005 B1 | 3/2006 | Graham et al. |
| 7,118,164 B2 | 10/2006 | Frank et al. |
| 7,147,270 B1 | 12/2006 | Andrus et al. |
| 7,192,077 B1 | 3/2007 | Hilleman et al. |
| 7,207,620 B2 | 4/2007 | Cosgrove et al. |
| 7,240,958 B2 | 7/2007 | Skopic et al. |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 | 6/2008 | Breidenbach et al. |
| 7,404,592 B2 | 7/2008 | Reiman et al. |
| 7,431,381 B2 | 10/2008 | Wood et al. |
| 7,484,791 B1 | 2/2009 | Chen et al. |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald et al. |
| 7,641,262 B2 | 1/2010 | Nusbaum et al. |
| 7,712,821 B2 | 5/2010 | Moscoso et al. |
| 7,740,304 B1 | 6/2010 | Breu et al. |
| 7,748,771 B2 | 7/2010 | Distel et al. |
| 7,748,772 B2 | 7/2010 | Boivin et al. |
| 7,780,224 B2 | 8/2010 | Roush et al. |
| 7,784,854 B2 | 8/2010 | Breidenbach et al. |
| 7,789,412 B2 | 9/2010 | Algüera et al. |
| 7,789,453 B2 | 9/2010 | Roush et al. |
| 7,794,011 B2 | 9/2010 | Kjellgren et al. |
| 7,806,464 B2 | 10/2010 | Cardolle et al. |
| 7,845,708 B2 | 12/2010 | Breidenbach |
| 7,850,224 B2 | 12/2010 | Breidenbach et al. |
| 7,854,468 B2 | 12/2010 | Vogel et al. |
| 7,857,376 B2 | 12/2010 | Breidenbach |
| 7,862,102 B1 | 1/2011 | Benton et al. |
| 7,887,120 B2 | 2/2011 | Boivin et al. |
| 7,938,475 B2 | 5/2011 | Boivin et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,720 B2 | 5/2011 | Skopic et al. |
| 7,976,096 B2 | 7/2011 | Holubar et al. |
| 7,992,923 B2 | 8/2011 | Dayton et al. |
| D649,090 S | 11/2011 | Roberge et al. |
| 8,079,634 B2 | 12/2011 | Visser et al. |
| 8,100,461 B2 | 1/2012 | Smith et al. |
| 8,177,287 B2 | 5/2012 | Vogel et al. |
| 8,251,436 B2 | 8/2012 | Henderson et al. |
| 8,272,680 B2 | 9/2012 | Breidenbach et al. |
| 8,292,351 B2 | 10/2012 | Boivin et al. |
| 8,360,509 B2 | 1/2013 | Grossmann et al. |
| 8,360,510 B2 | 1/2013 | Smith et al. |
| 8,449,017 B2 | 5/2013 | Boivin et al. |
| 8,480,162 B2 | 7/2013 | Breidenbach et al. |
| 8,590,961 B2 | 11/2013 | Breidenbach |
| 8,608,228 B2 | 12/2013 | Visentin et al. |
| 8,622,461 B2 | 1/2014 | Breidenbach et al. |
| 8,678,474 B1 | 3/2014 | Boivin et al. |
| 8,708,398 B2 | 4/2014 | Breidenbach |
| 8,708,399 B2 | 4/2014 | Grossmann et al. |
| 8,845,007 B2 | 9/2014 | Tuerk et al. |
| 8,876,191 B2 | 11/2014 | Breidenbach |
| 9,039,069 B2 | 5/2015 | Smith et al. |
| 9,126,638 B2 | 9/2015 | Thomas |
| 9,145,177 B2 | 9/2015 | Smith et al. |
| 9,180,919 B2 | 11/2015 | Thomas |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1 | 3/2003 | Long et al. |
| 2003/0205913 A1 | 11/2003 | Leonard et al. |
| 2003/0227194 A1 | 12/2003 | Farlow et al. |
| 2004/0118055 A1 | 6/2004 | Reiman et al. |
| 2004/0119319 A1 | 6/2004 | Reiman et al. |
| 2004/0256885 A1 | 12/2004 | Bui et al. |
| 2004/0261335 A1 | 12/2004 | Eungard |
| 2005/0040637 A1 | 2/2005 | Wood et al. |
| 2005/0146161 A1 | 7/2005 | Uland et al. |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson et al. |
| 2006/0273625 A1 | 12/2006 | Andrus et al. |
| 2007/0001481 A1 | 1/2007 | Breidenbach et al. |
| 2007/0120397 A1 | 5/2007 | Layfield et al. |
| 2007/0126261 A1 | 6/2007 | Breidenbach et al. |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar et al. |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0184835 A1 | 8/2008 | Breidenbach et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1 | 7/2009 | Holubar et al. |
| 2009/0200834 A1 | 8/2009 | Vogel et al. |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood et al. |
| 2009/0295190 A1* | 12/2009 | Kottenstette ......... B62D 35/005 296/180.3 |
| 2010/0066123 A1 | 3/2010 | Ortega et al. |
| 2010/0106380 A1* | 4/2010 | Salari .................. B62D 35/001 701/49 |
| 2010/0164249 A1 | 7/2010 | Nusbaum et al. |
| 2010/0201153 A1 | 8/2010 | Pesotini et al. |
| 2010/0222671 A1 | 9/2010 | Cohen et al. |
| 2010/0225143 A1 | 9/2010 | Skopic et al. |
| 2011/0037291 A1 | 2/2011 | Pickering et al. |
| 2011/0068605 A1 | 3/2011 | Domo et al. |

(56) References Cited

U.S. PATENT DOCUMENTS

| | | |
|---|---|---|
| 2011/0084516 A1 | 4/2011 | Smith et al. |
| 2011/0084517 A1 | 4/2011 | Vogel et al. |
| 2011/0095564 A1 | 4/2011 | Chen et al. |
| 2011/0095565 A1 | 4/2011 | Chen et al. |
| 2011/0095566 A1 | 4/2011 | Chen et al. |
| 2011/0115254 A1 | 5/2011 | Skopic et al. |
| 2011/0175394 A1 | 7/2011 | Breidenbach et al. |
| 2011/0210578 A1 | 9/2011 | Breidenbach et al. |
| 2011/0304173 A1 | 12/2011 | Breidenbach et al. |
| 2012/0001451 A1 | 1/2012 | Breidenbach et al. |
| 2012/0086233 A1 | 4/2012 | Visser et al. |
| 2012/0086234 A1 | 4/2012 | Visser et al. |
| 2012/0104792 A1 | 5/2012 | Smith et al. |
| 2012/0223544 A1 | 9/2012 | Benton et al. |
| 2012/0235441 A1 | 9/2012 | Dayton et al. |
| 2012/0299330 A1 | 11/2012 | Breidenbach et al. |
| 2013/0038086 A1 | 2/2013 | Breidenbach et al. |
| 2013/0057019 A1 | 3/2013 | Breidenbach et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0249241 A1 | 9/2013 | Baker et al. |
| 2014/0117713 A1 | 5/2014 | Baker et al. |
| 2014/0217775 A1 | 8/2014 | Breidenbach et al. |
| 2014/0319870 A1 | 10/2014 | Breidenbach et al. |
| 2014/0346807 A1 | 11/2014 | Breidenbach |
| 2015/0266520 A1 | 9/2015 | Thomas |

FOREIGN PATENT DOCUMENTS

| | | |
|---|---|---|
| CA | 2221593 A1 | 7/1999 |
| CA | 2311204 A1 | 1/2001 |
| CA | 2281064 A1 | 2/2001 |
| CA | 2315339 A1 | 2/2001 |
| CA | 2316584 A1 | 2/2001 |
| CA | 2450243 A1 | 12/2002 |
| CA | 2510464 A1 | 7/2004 |
| CA | 2361224 C | 2/2006 |
| DE | 2911084 A1 | 9/1980 |
| DE | 2922130 A1 | 12/1980 |
| DE | 3817497 A1 | 12/1988 |
| DE | 19524825 A1 | 1/1997 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| GB | 2207398 A | 2/1989 |
| JP | 06016157 A | 1/1994 |
| WO | 2007079306 A2 | 7/2007 |
| WO | 2007005344 | 10/2007 |
| WO | 2008024386 A2 | 2/2008 |
| WO | 2008124573 A1 | 10/2008 |
| WO | 2008144025 A2 | 11/2008 |
| WO | 2014011886 A1 | 1/2014 |

OTHER PUBLICATIONS

Notification of Transmittal of the International Search Report and the Written Opinion of the International Searching Authority, or the Declaration relating to PCT Application No. PCT/US06/24642 (dated Jul. 27, 2007).
Clarkson University, Kenneth Visser, 2 pages, http://www.clarkson.edu/mae/faculty_pages/visser.html.
International Search Report and Written Opinion of the International Searching Authority of the European Patent Office for PCT/US2012/056365, dated Feb. 27, 2013. 10 pages.
International Search Report and Written Opinion of the International Searching Authority of the European Patent Office for PCT/US2008/006374, dated Nov. 14, 2008. 14 pages.
International Search Report and Written Opinion of the International Searching Authority of the European Patent Office for PCT/US2011/055758, dated Mar. 2, 2012. 13 pages
International Search Report and Written Opinion of the International Searching Authority of the European Patent Office for PCT/US2013/050083, dated Oct. 24, 2013. 9 pages.
International Search Report and Written Opinion of the International Searching Authority of the United States Patent Office for PCT/US12/62237, dated Jan. 15, 2013. 8 pages.
Ken Visser, "Drag Reduction of Tractor Trailers", Clarkson University, Nov. 2005, 4 pages.
Machine translation of DE19524825 printed from the internet Nov. 3, 2010.
McCallen, et al., "Progress in Reducing Aerodynamic Drag for Higher Efficiency of Heavy Duty Trucks (Class 7-8)", Lawrence Livermore National Laboratory, Apr. 1999, 14 pages.
Ogburn, et al., "Truck Efficiency and GHG Reduction Opportunities in the Canadian Truck Fleet", Rocky Mountain Institute, 13 pages.
Ortega, et al., "An Experimental Study of Drag Reduction Devices for a Trailer Underbody and Base", Lawrence Livermore National Laboratory, Jun. 4, 2004, 17 pages.
Randal Scott Funderburk, "An Investigation of a Drag Reducing Device for Tractor-Trailers", A Thesis in Mechanical Engineering, May 1996, 128 pages.
Randall L. Peterson, "Drag Reduction Obtained by the Addition of a Boattail to a Box Shaped Vehicle", NASA Contractor Report 163113, Aug. 1981, 32 pages.
Salari, "Heavy Vehicle Drag Reduction Devices: Computational Evaluation & Design", DOE Heavy Vehicle Systems Review, Apr. 2006, 24 pages.
Smith, et al., "U.S. Appl. No. 61/600,579, Rear-Mounted Retractable Aerodynamic Structure for Cargo Bodies", Published in: US.
U.S. Department of Energy, "Heavy Vehicle Systems Optimization", FreedomCAR and Vehicle Technologies Program, 2004 Annual Progress Report, Feb. 2005, 206 pages.
U.S. Appl. No. 60/927,614, titled "Aerodynamic Trailer With Sliding Rear Door", filed May 4, 2007 by Mark Roush.
U.S. Appl. No. 60/938,697, titled "Rear-Mounted Aerodynamic Structure for Truck Cargo Bodies", filed May 17, 2007 by Andrew F. Smith et al.
U.S. Appl. No. 61/039,411, titled "Rear-Mounted Aerodynamic Structure for Truck Cargo Bodies", filed Mar. 25, 2008 by Andrew F. Smith et al.
U.S. Appl. No. 61/065,490, titled "Self-Deploying Drag Reducing Device", filed Feb. 12, 2008 by Lee Telnack, et al.
U.S. Appl. No. 61/070,669, titled "Rounded Cargo Doors for Trailers and Trucks", filed Mar. 25, 2008 by Mark Roush.
U.S. Appl. No. 61/070,670, titled "Drag Reduction Arrangement for Cargo Trucks and Trailers", filed Mar. 25, 2008 by Mark Roush.
Written Opinion of the International Searching Authority for PCT/US2014/049201, dated Apr. 6, 2015, 8 pages.

\* cited by examiner

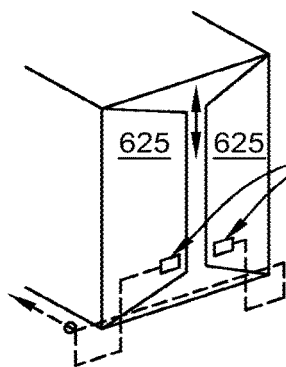
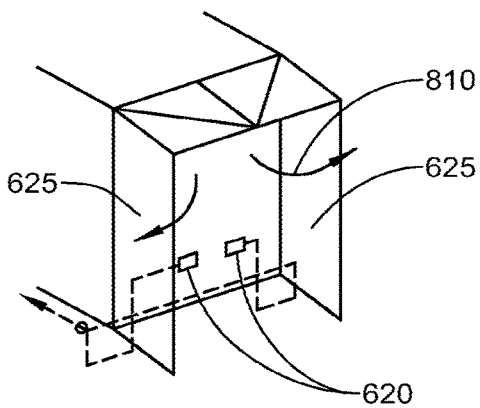
FIG. 7　　　　　　　　FIG. 8
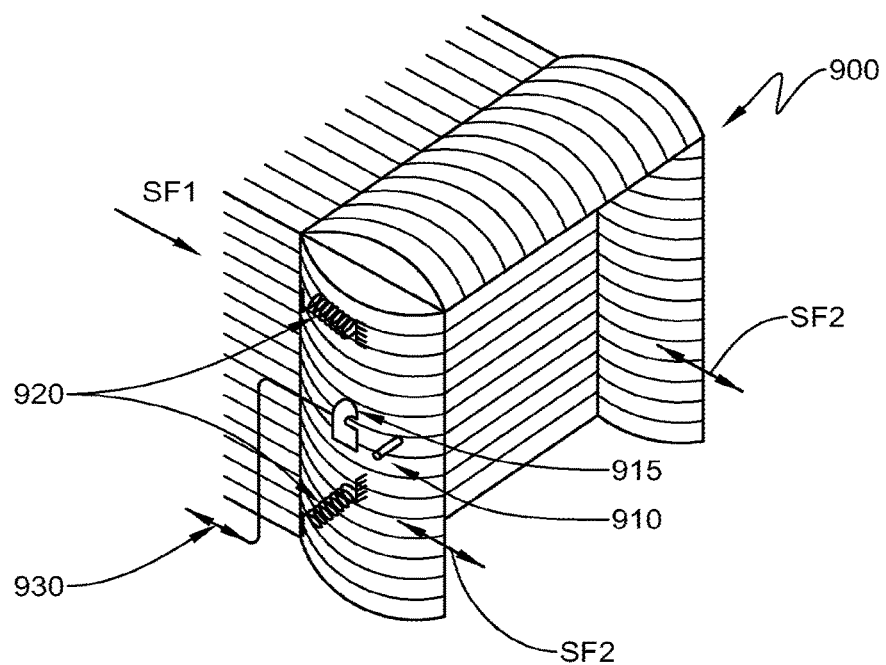
FIG. 9

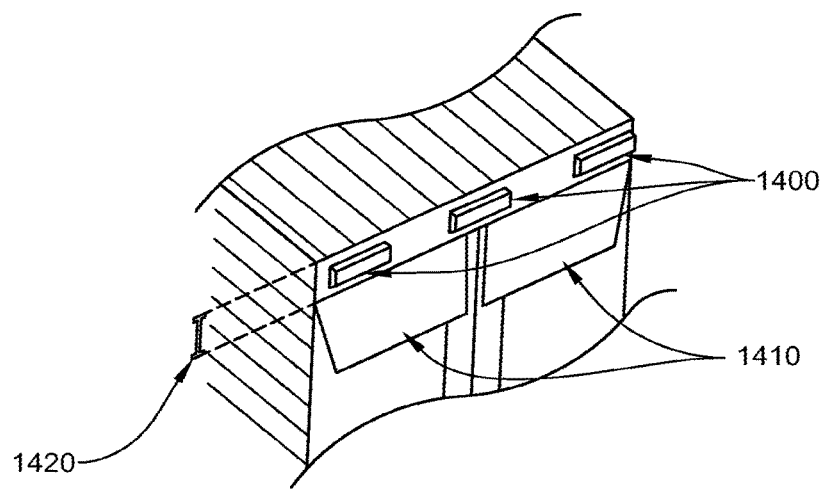
FIG. 14
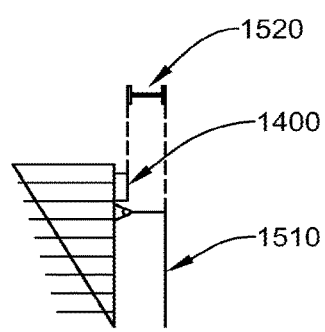 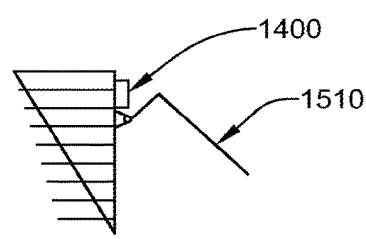 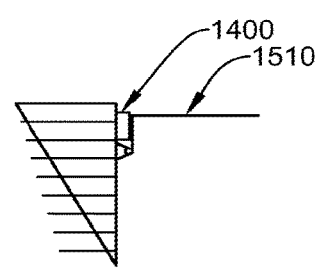
FIG. 15          FIG. 16          FIG. 17
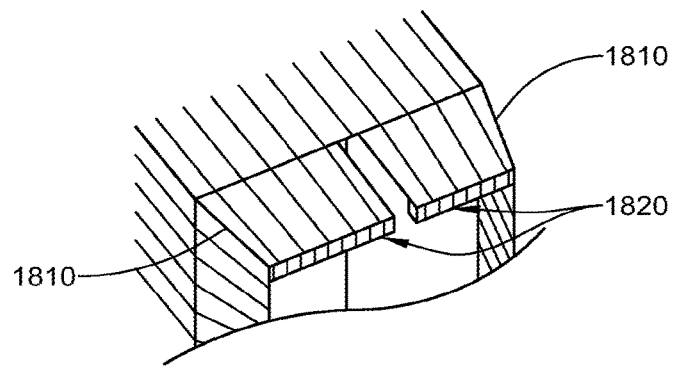
FIG. 18

AXIS OF
ROTATION

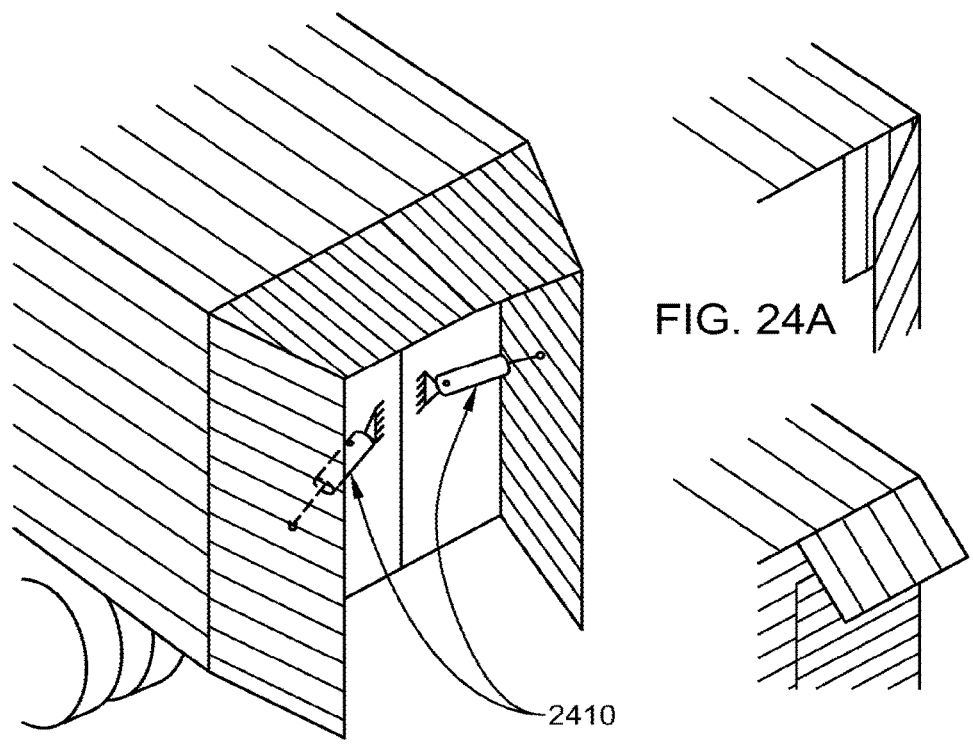
FIG. 24A
FIG. 24B
FIG. 24
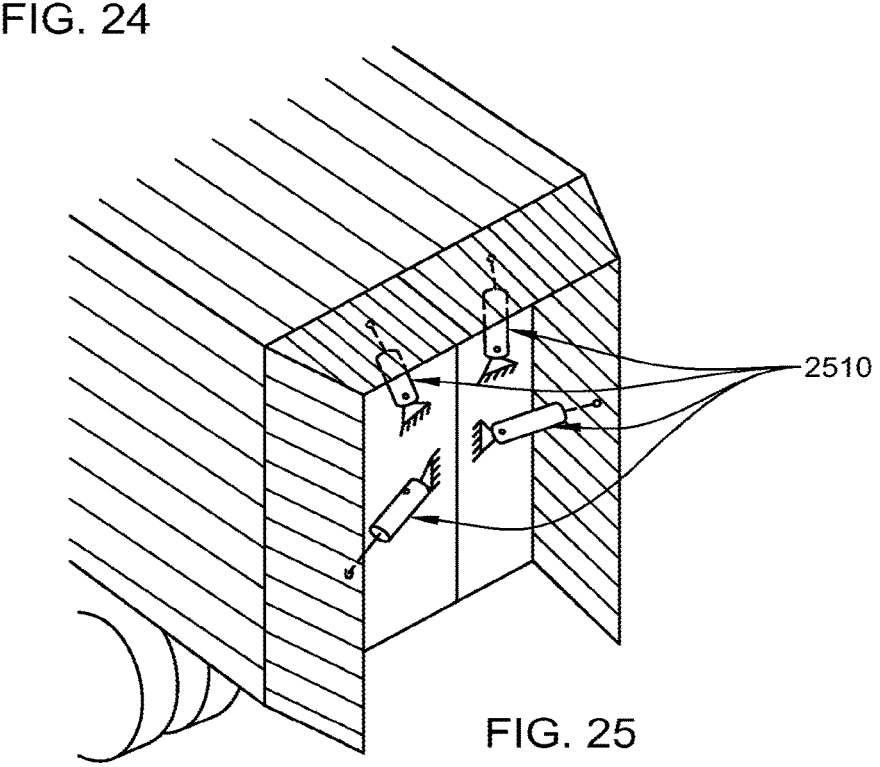
FIG. 25

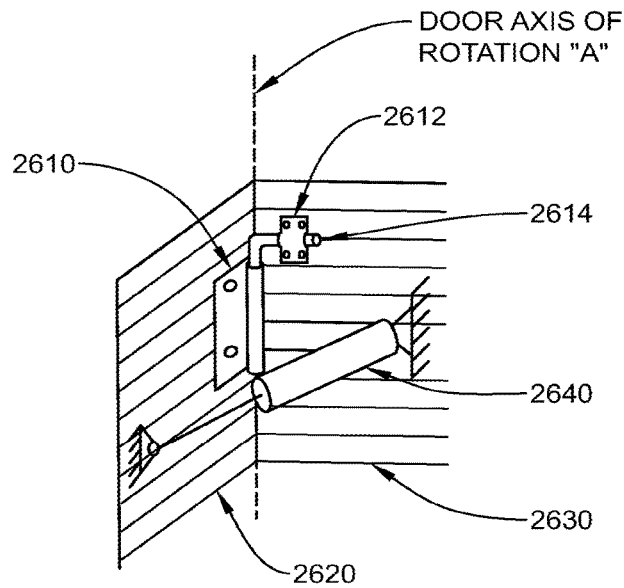
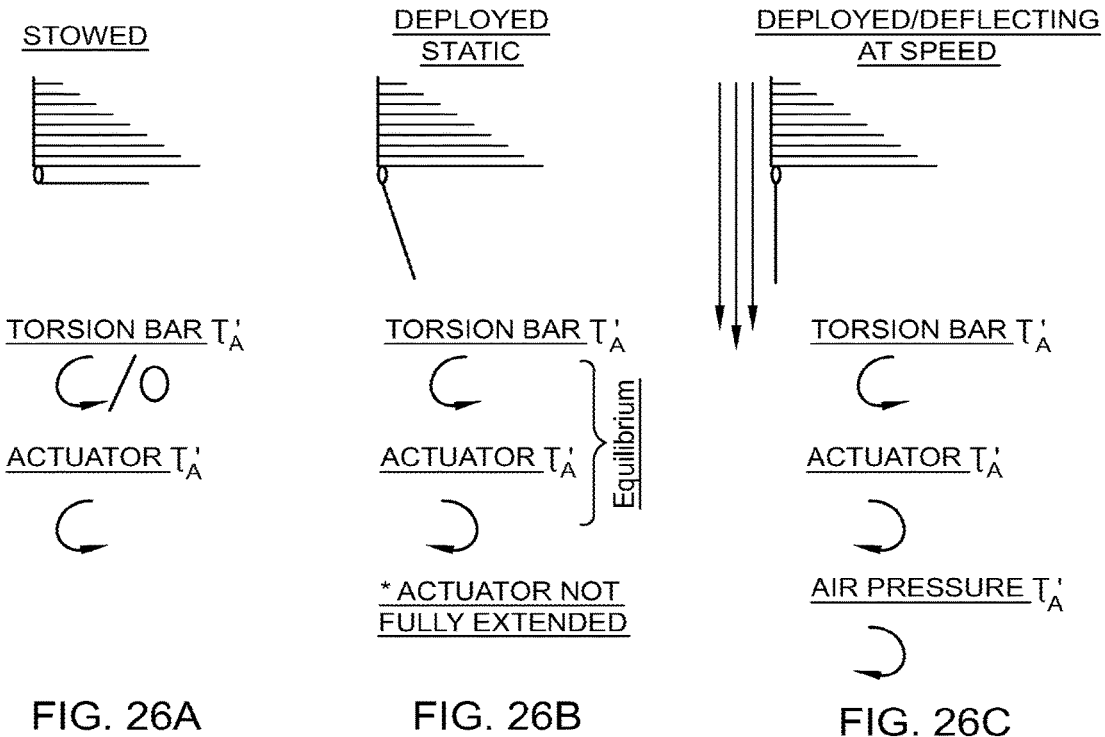
FIG. 26
FIG. 26A  FIG. 26B  FIG. 26C

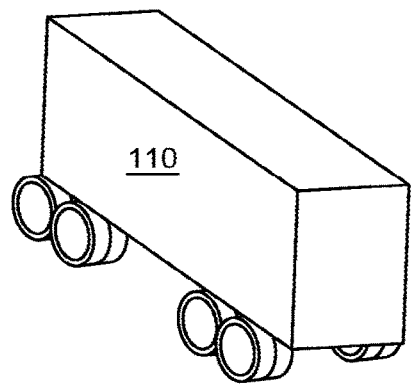
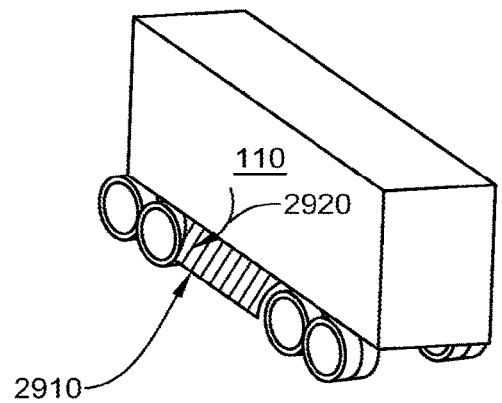
FIG. 29A          FIG. 29B
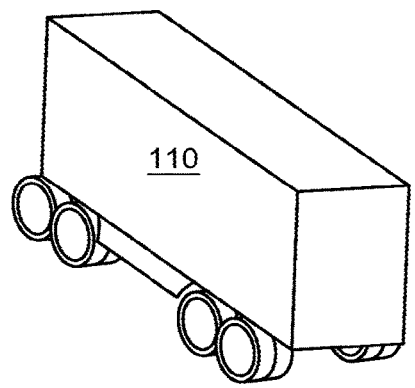
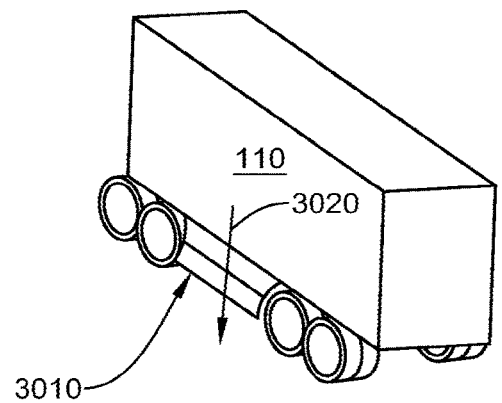
FIG. 30A          FIG. 30B
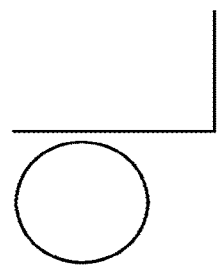
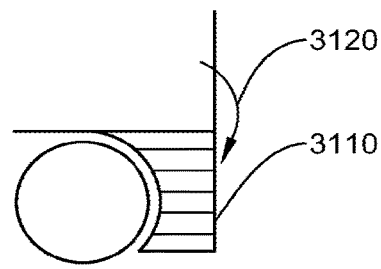
FIG. 31A          FIG. 31B

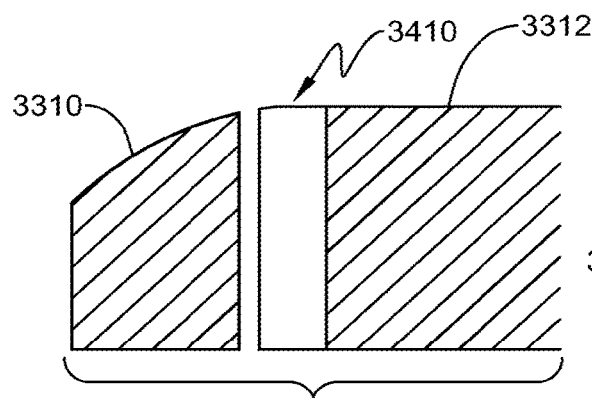 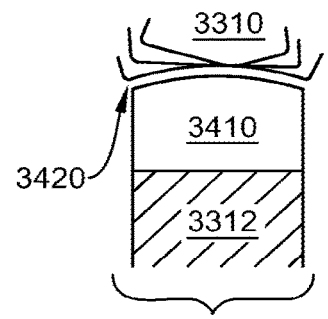
FIG. 34A    FIG. 34B
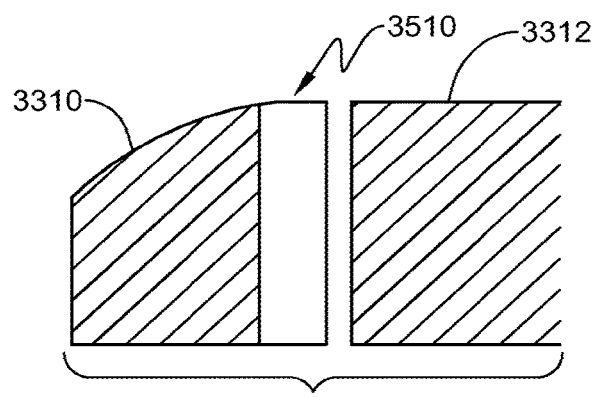 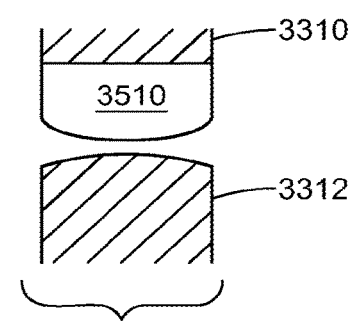
FIG. 35A    FIG. 35B
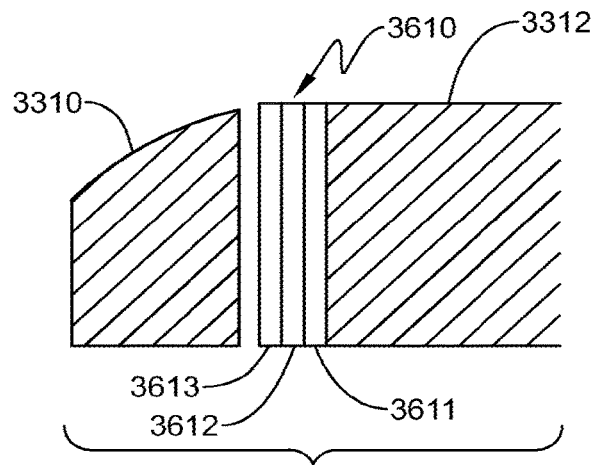 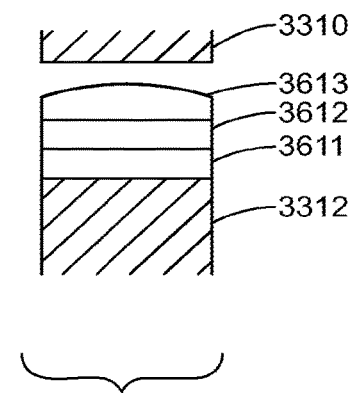
FIG. 36A    FIG. 36B

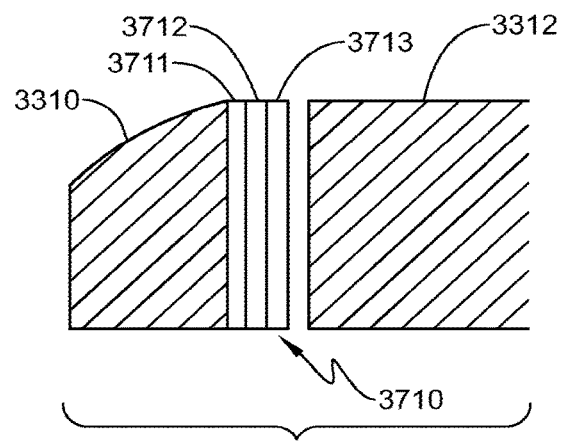
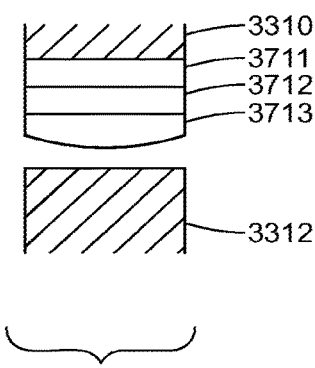
FIG. 37A  FIG. 37B
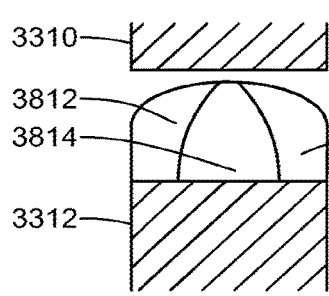
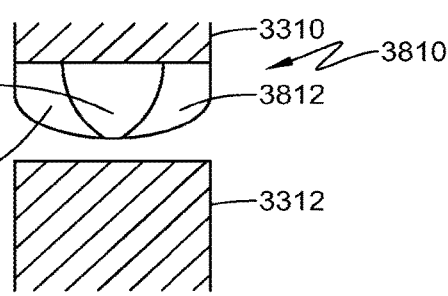
FIG. 38A  FIG. 38B
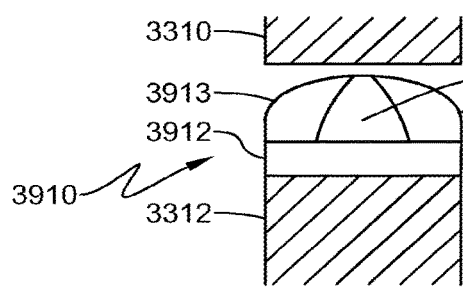
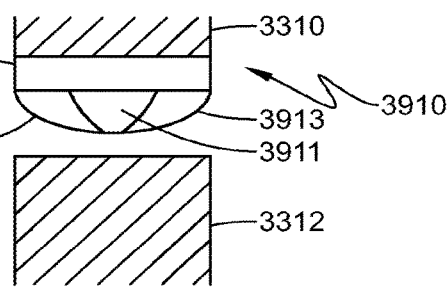
FIG. 39A  FIG. 39B

RETRACTABLE AERODYNAMIC STRUCTURES FOR CARGO BODIES AND METHODS OF CONTROLLING POSITIONING OF THE SAME

RELATED APPLICATIONS

This application is a continuation of U.S. patent application Ser. No. 13/939,924, filed Jul. 11, 2013, now U.S. Pat. No. 9,145,177 which claims the benefit of U.S. Provisional Application Ser. No. 61/670,160, filed Jul. 11, 2012, entitled RETRACTABLE AERODYNAMIC STRUCTURES FOR CARGO BODIES AND METHODS OF CONTROLLING POSITIONING OF THE SAME, the entire disclosure of which is herein incorporated by reference. This application also claims the benefit of U.S. Provisional Application Ser. No. 61/779,777, filed Mar. 13, 2013, entitled RETRACTABLE AERODYNAMIC STRUCTURES FOR CARGO BODIES AND METHODS OF CONTROLLING POSITIONING OF THE SAME, the entire disclosure of which is herein incorporate by reference.

FIELD OF THE INVENTION

The present invention relates to aerodynamic structures for truck and trailer bodies and other large cargo vehicles, and more particularly to controlling the positioning of the aerodynamic structures.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs—particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

Nevertheless, most attempts to provide aerodynamic structures that integrate with the structure and function of the rear cargo doors of a truck have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

In fact, most loading dock arrangements require that the relatively thin cargo doors of conventional trucks swing open fully to about 270 degrees so that they can be latched against the adjacent sides of the cargo body. Only in this manner can the truck be backed into a standard-side-clearance loading dock, which is often populated by a line of closely-spaced trailers that are frequently entering and leaving the dock. In such an environment, side-projecting or top-projecting fairings would invariably interfere with operations at the loading dock.

A possible solution is to bifurcate the aerodynamic structure into a left hinged and a right-hinged unit that defines a complete unit when closed, and hinges open to reveal the doors. However, the two separate sections still present a large projection that would be incapable of swinging the requisite 270 degrees, and would undesirably tend to project into the adjacent loading bays when opened.

Another alternative is to remove the fairing structure from the truck before it is parked at the loading bay. However, the removed structure must then be placed somewhere during the loading/unloading process. Because most truck doors are relatively large, being in the range of approximately 7-8 feet by 8-9 feet overall, removing, manipulating and storing a fairing in this manner may be impractical, or impossible, for the driver and loading dock staff.

In the face of ever-increasing fuel costs, it is critical to develop aerodynamic structures that can be applied to the rear of a truck cargo body, either as an original fitment, or by retrofit to existing vehicles. These structures should exhibit durability and long service life, be easy to use by the average operator, not interfere with normal loading and unloading operations through a rear cargo door, and not add substantial additional cost or weight to the vehicle. The structure should exhibit a low profile on the vehicle frame and/or doors, not impede side clearance when the doors are opened, and where possible, allow for clearance with respect to conventional door latching mechanisms. Such structures should also allow for lighting on the rear, as well as other legally required structures. Furthermore, it is particularly desirable for control of the position of the aerodynamic structure to be automatic, so that user manipulation is not required and so that the aerodynamic structure is assured of deployment when the vehicle is motion and at highway speed.

SUMMARY OF THE INVENTION

The disadvantages of the prior art can be overcome by providing a system that has electrically- or electro-pneumatically actuated rear aerodynamic structures. An electric or electro-pneumatic actuator is employed, which receives signals from a vehicle speed sensor to determine when actuation occurs. Other systems are also provided that feature electric or electro-pneumatic actuation, including underbody skirts and scoops, as well as inflatable tractor-trailer gap sealing devices, adjustable tractor-trailer gap sealing flaps and inflatable trailer upper streamlining devices. Electronic control units (ECUs) for aerodynamic system control interfacing with the ABS controller are also provided. Satellite navigation, platooning awareness and managed pressure reserve capability can be employed with the aerodynamics ECU.

BRIEF DESCRIPTION OF THE DRAWINGS

The invention description below refers to the accompanying drawings, of which:

FIG. 7 is a rear perspective view of the system for automatic control of the positioning of the folding aerodynamic structures, with the aerodynamic structure shown in the stowed, or folded, position, according to the illustrative embodiment;

FIG. 8 is a rear perspective view of the system for automatic control of the positioning of the folding aerodynamic structures, with the aerodynamic structure shown in the deployed, or open, position, according to the illustrative embodiment;

FIG. 9 is a rear perspective view of a system for automatic control of the positioning of sliding aerodynamic structures, according to an illustrative embodiment;

FIG. 14 is a rear partial perspective view showing standard tail lights for a truck or cargo body and the top panels of the aerodynamic structure, according to an illustrative embodiment;

FIG. 15 is a side partial perspective view showing the standard tail lights for a truck or cargo body and the top panels of the aerodynamic structure, showing the top panel in the stowed position, according to the illustrative embodiment;

FIG. 16 is a side partial perspective view showing the standard tail lights for a truck or cargo body and the top panels of the aerodynamic structure, showing the top panel transitioning from the stowed position toward a deployed position, according to the illustrative embodiment;

FIG. 17 is a side partial perspective view showing the standard tail lights for a truck or cargo body and the top panels of the aerodynamic structure, showing the top panel in the deployed position, according to the illustrative embodiment;

FIG. 18 is a rear partial perspective view showing the top panel in the deployed position and including integrated tail lights, according to an illustrative embodiment;

FIG. 24 is a partial perspective view of a folding aerodynamic structure employing pneumatic actuators, shown in the deployed position, according to an illustrative embodiment;

FIG. 24A is a partial perspective view of the folding aerodynamic structure employing pneumatic actuators, shown in the stowed position, with the side panel folding over the top panel, according to the illustrative embodiment;

FIG. 24B is a partial perspective view of the folding aerodynamic structure employing pneumatic actuators, shown in the stowed position, with the top panel folding over the side panel, according to the illustrative embodiment;

FIG. 25 is a partial perspective view of the folding aerodynamic structure employing multiple double-acting actuators per side, showing the panels in the deployed position, according to the illustrative embodiment;

FIG. 26 is a detailed perspective view of a linear actuator and associated hinge assembly, according to the illustrative embodiment;

FIG. 26A is a top view of the torsion bar when in the stowed positioning, according to the illustrative embodiment;

FIG. 26B is a top view of the torsion bar when in a deployed static configuration, according to the illustrative embodiment;

FIG. 26C is a top view of the torsion bar when in a deployed positioning at speed, according to the illustrative embodiment;

FIG. 29A is a perspective view of an angularly adjustable trailer skirt, shown in the stowed position, according to an illustrative embodiment;

FIG. 29B is a perspective view of the angularly adjustable trailer skirt, shown in the extended position, according to the illustrative embodiment;

FIG. 30A is a perspective view of a vertically adjustable trailer skirt, shown in the stowed position, according to an illustrative embodiment;

FIG. 30B is a perspective view of the vertically adjustable trailer skirt, shown in the extended position, according to the illustrative embodiment;

FIG. 31A is a partial side view of a behind-bogie skirt, shown in the stowed position, according to an illustrative embodiment;

FIG. 31B is a partial side view of the behind-bogie skirt, shown in the extended position, according to the illustrative embodiment;

FIG. 34A is a side view of a truck cab and trailer body with an inflatable tractor-trailer gap sealing device having single-stage inflation and secured to the trailer, the tractor-trailer gap sealing device shown in the inflated position, according to an illustrative embodiment;

FIG. 34B is a top view of the inflatable tractor-trailer gap sealing device having single-stage inflation, shown in the inflated position, according to the illustrative embodiment;

FIG. 35A is a side view of a truck cab and trailer body with an inflatable tractor-trailer gap sealing device having single-stage inflation and secured to the truck, the tractor-trailer gap sealing device shown in the inflated position, according to the illustrative embodiment;

FIG. 35B is a top view of the inflatable tractor-trailer gap sealing device having single-stage inflation and secured to the truck, shown in the inflated position, according to the illustrative embodiment;

FIG. 36A is a side view of a truck cab and trailer body with an inflatable tractor-trailer gap sealing device having multi-stage deployment, the tractor-trailer gap sealing device being secured to the trailer body and shown in the inflated position, according to the illustrative embodiment;

FIG. 36B is a top view of the inflatable tractor-trailer gap sealing device having multi-stage deployment and secured to the trailer, shown in the inflated position, according to the illustrative embodiment;

FIG. 37A is a side view of a truck cab and trailer body with an inflatable tractor-trailer gap sealing device having multi-stage deployment, the tractor-trailer gap sealing device being secured to the truck and shown in the inflated position, according to the illustrative embodiment;

FIG. 37B is a top view of the inflatable tractor-trailer gap sealing device having multi-stage deployment and secured to the truck, shown in the inflated position, according to the illustrative embodiment;

FIG. 38A is a top view of an inflatable tractor-trailer gap sealing device having single-stage inflation and a semi-solid middle portion secured to the trailer, shown in the inflated position, according to the illustrative embodiment;

FIG. 38B is a top view of an inflatable tractor-trailer gap sealing device having single-stage inflation and a semi-solid middle portion secured to the truck, shown in the inflated position, according to the illustrative embodiment;

FIG. 39A is a top view of an inflatable tractor-trailer gap sealing device having multi-stage inflation and a semi-solid middle portion secured to the trailer, shown in the inflated position, according to the illustrative embodiment;

FIG. 39B is a top view of an inflatable tractor-trailer gap sealing device having multi-stage inflation and a semi-solid middle portion secured to the truck, shown in the inflated position, according to the illustrative embodiment;

DETAILED DESCRIPTION

Various illustrative embodiments shown and described herein enable automated control of the positioning of the aerodynamic structure. In accordance with the illustrative embodiments, the positioning of the aerodynamic structure refers to the deployment, adjustment and/or retraction of the aerodynamic structure, and generally describes the location of the aerodynamic structure with respect to a vehicle cargo body of tractor trailer body. The positioning of the aerodynamic structure can be controlled by electric, electro-pneumatic, or other actuators, to deploy, adjust and/or retract the aerodynamic structure. Other systems for the purpose of aerodynamic drag force reduction featuring electric or electro-pneumatic actuation are also described herein. Electronic control units (ECUs) for the aerodynamic control system are also provided to measure vehicle conditions, such as speed, and determine when to deploy, adjust and/or retract the aerodynamic structure. ECUs described herein measure vehicle conditions either by interfacing with existing sensors standard on tractor trailer and cargo bodies, such as the ABS controller, trailer wheel sensors, or tractor power lines, or by employing independent sensors, such as GPS, accelerometers, pressure taps, or optical readers. The term "cargo body" as used herein, refers to a truck cargo body or a trailer body that is typically towed by a truck or other vehicle.

The teachings herein are readily applicable to a variety of aerodynamic structures, including both three-sided and four-sided arrangements. By way of background, refer to U.S. Pat. No. 8,100,461, entitled REAR-MOUNTED AERODYNAMIC STRUCTURE FOR TRUCK CARGO BODIES, for examples of aerodynamic structures. Reference is also made to commonly assigned U.S. Provisional Application Ser. No. 61/600,579, entitled REAR-MOUNTED RETRACTABLE AERODYNAMIC STRUCTURE FOR CARGO BODIES, by Andrew F. Smith et al., which details a variety of aerodynamic arrangements to which the principles of the embodiments described herein can be applied, and the teachings of which are expressly incorporated herein by reference.

1. Electrically-Actuated Aerodynamic Structures

Figure 1:
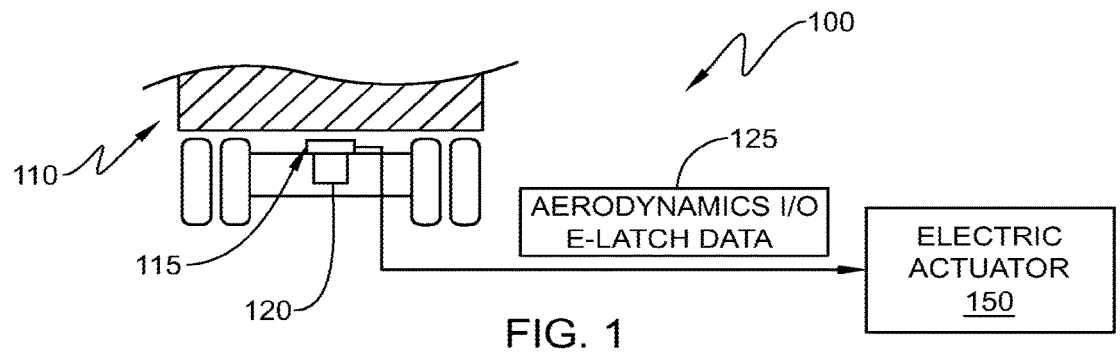
FIG. 1 is an overview block diagram of a system for electrically-actuated aerodynamic structures, according to an illustrative embodiment.

FIG. 1 is an overview block diagram of a system 100 for controlling the positioning of electrically-actuated aerodynamic structures, according to an illustrative embodiment. Electrically-actuated systems refer to systems in which the primary actuation mechanism is electric. As shown, a truck 110 includes conventional anti-lock braking system (ABS) 115 having a logic processing unit 120. The energizing current is provided by the vehicle ABS controller 115, or switched by the ABS controller 115. The same controller provides a reliable speed signal, acquired from existing wheel speed sensors, and a logic processing unit 120 capable of energizing relevant electrical circuits based primarily on vehicle speed conditions. The aerodynamics input and output (such as the wheel speed conditions) as well as the E-latch data (data pertaining to when the electric actuator 150 controls the positioning of the aerodynamic structure) is transmitted to the electric actuator 150 via cabling 125 or other appropriate datastream. The aerodynamics I/O refers to any inputs and/or outputs pertinent to the functionality of an active aerodynamic structure. The E-latch data corresponds to any latching mechanism using energizing current to maintain a positioning (i.e. latched or released state) of the aerodynamic structure. The latching mechanism can comprise a latch actuated by solenoid or geared motor; an electronic strike, an electromagnetic latch using a magnetic field to maintain a latched state; and any other appropriate latch known to those skilled in the art. The system logic implemented in accordance with the illustrative embodiment prioritizes braking events over aerodynamic events, and actuates aerodynamic devices when the speed signal indicates a speed over a certain threshold (or under a certain threshold, determining whether the actuator is in a latched or released state). The system can employ open-loop logic (as shown in the flow chart of FIG. 2) or closed-loop logic (as shown in the flow chart of FIG. 3). Commercial trucks and other transportation vehicles are typically employed with power line communication ("PLC"), which is a technology implemented on commercial vehicles allowing communications from electronic control units (ECUs) on trailer to control units, visualization engines and other related controls for on-tractor or in-cabin.

Figure 2:
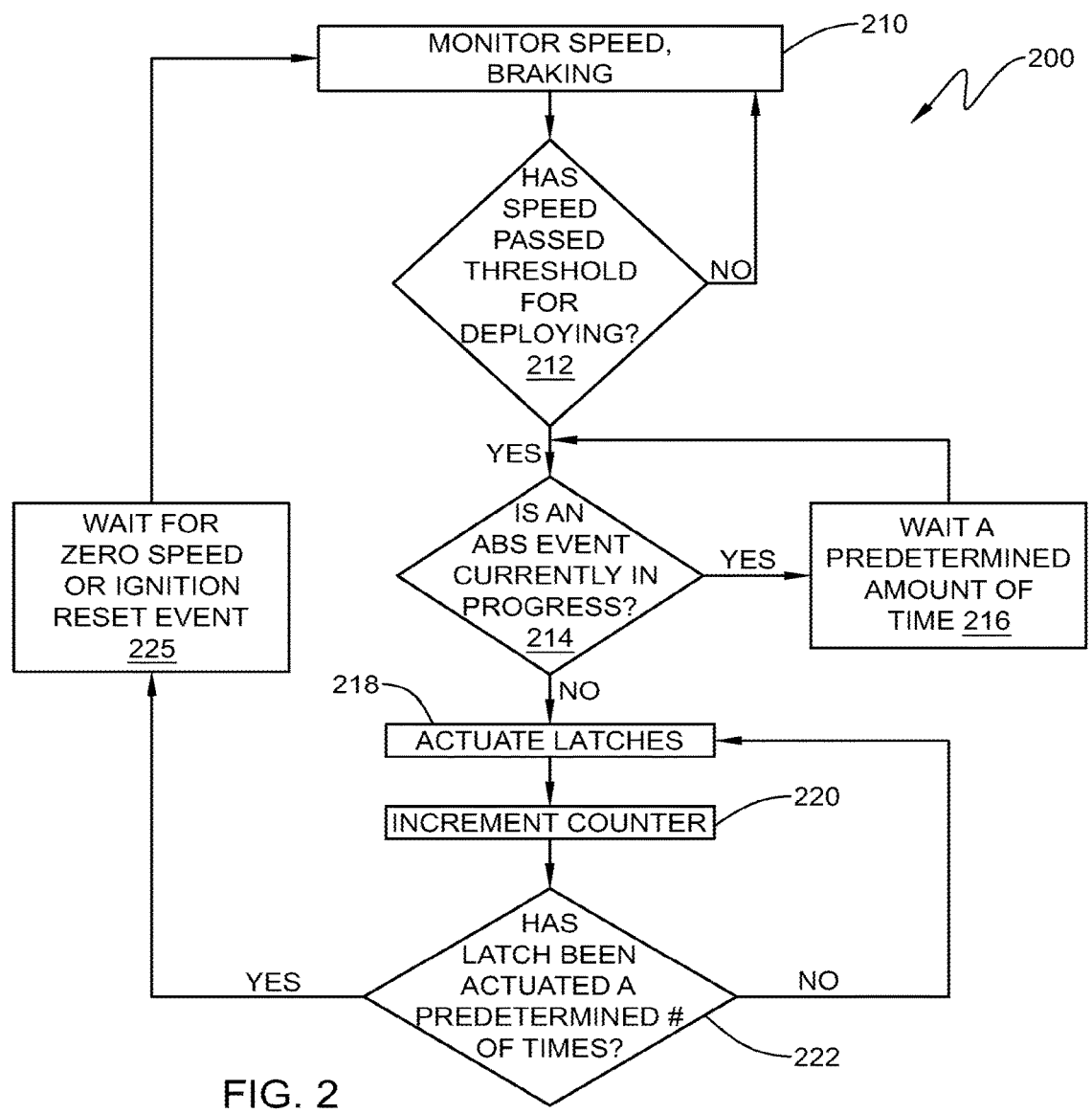
FIG. 2 is a flow diagram of a procedure employing open-loop logic to provide single-acting position of the aerodynamic structures, according to the illustrative embodiment.

FIG. 2 is a flow diagram of a procedure 200 employing open-loop logic to control the positioning of the aerodynamic structures, according to the illustrative embodiment. As shown, the procedure commences at step 210 by monitoring the speed and braking. At step 212, it is determined whether the speed has passed the threshold for deploying the aerodynamic structure. The threshold is a predetermined speed at which the aerodynamic structure is set to deploy. If the speed has not passed the threshold, it continues to loop back to step 210 to monitor the speed and braking. If the speed has passed a threshold for deploying, the procedure continues to step 214. The procedure then determines whether an ABS event is currently in progress. If an event is in process, at step 216 the procedure waits a predetermined amount of time and then checks again to see if an ABS event is in still in progress. This predetermined amount of time can be any amount of time set at the discretion of the user. If an ABS event is not in progress, the procedure advances to step 218 and the latches are actuated. The counter is then incremented at step 220. Finally, at step 222 the procedure determined whether the latch has been actuated a predetermined number of times. If not, the latches are actuated and the counter is incremented. When the latch has been actuated a predetermined number of times, the procedure advances to 225, and waits for zero speed or ignition reset event.

Figure 3:
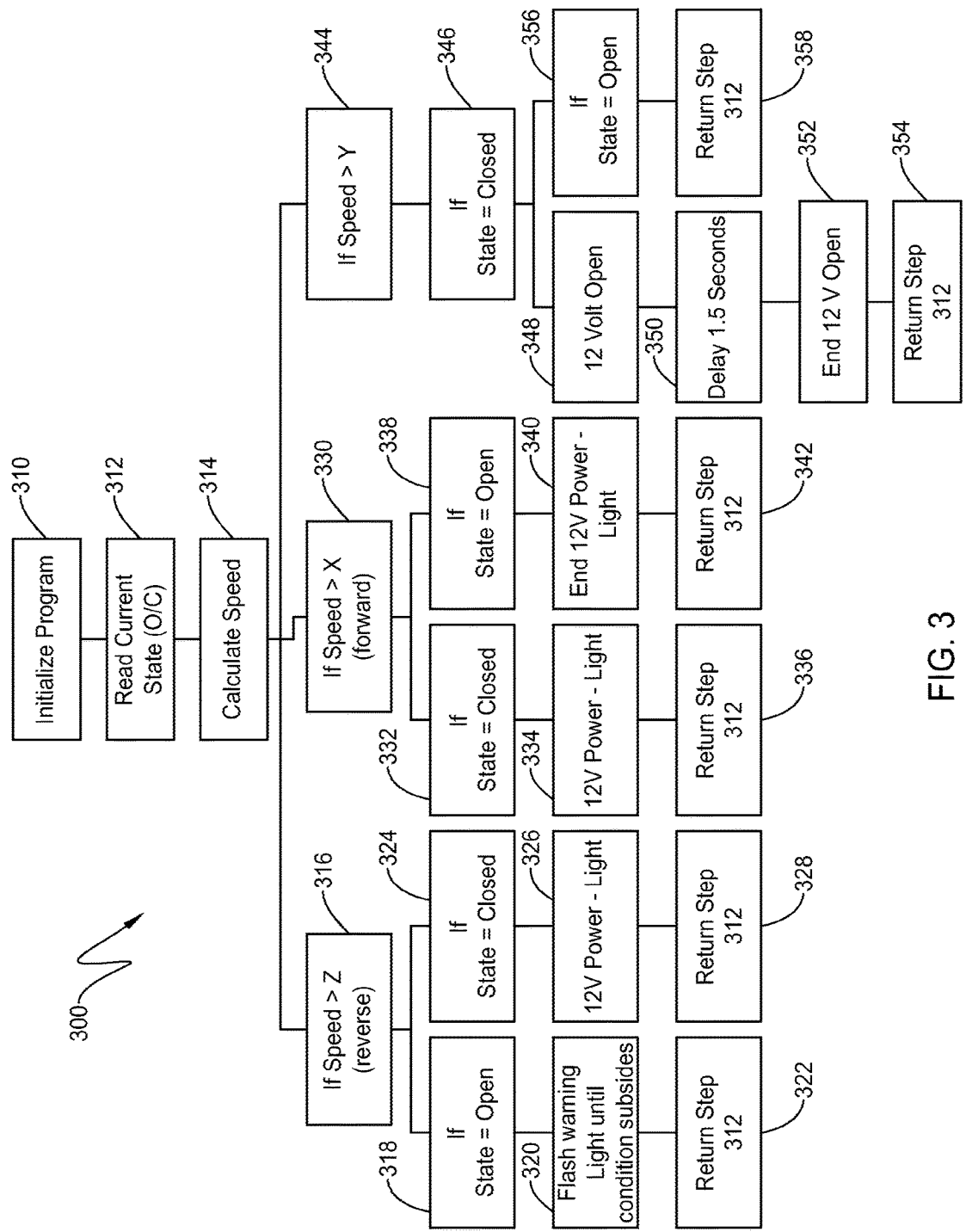
FIG. 3 is a flow diagram of an exemplary procedure to provide single-acting position control of the aerodynamic structures and to also provide visual feedback depending on vehicle state and position of aerodynamic structure, according to the illustrative embodiment.

FIG. 3 is a flow diagram of an exemplary procedure to control the positioning of the aerodynamic structures, in accordance with an illustrative embodiment. The procedure 300 commences at step 310 with an instruction to initialize the program. At step 312, the procedure reads the current state as being open or closed. At step 314, the speed is then calculated.

The procedure advances to step 316 if the speed is greater than "Z" when the truck is traveling in reverse, with "Z" being a predetermined speed such as 0.5 mph. If the state of the aerodynamic structure is open at step 318, the procedure directs a warning light to flash until the condition subsides at step 320, and then at step 322 the procedure returns to step 312. If the state of the aerodynamic structure is closed at step 324, then the procedure sends a constant 12V of power to the light at step 326, and then at step 328 returns to step 312. Alternative events are also anticipated for steps 320 and 326, such as constant 12 V of power to the light in step 320 and no power to the light in step 326; it is only important that steps 320 and 326 provide different signals so the driver can easily differentiate the position of his/her aerodynamic structure.

The procedure advances to step 330 if the speed is greater than "X" when the truck is traveling forward, with "X" being a predetermined speed such as 1 mph. If the state of the aerodynamic structure is closed at step 332, then 12 V of constant power is sent to the light at step 334, and then at step 336 the procedure returns to step 312. If the state of the aerodynamic structure is open at step 338, then the 12V power of light is ended at step 340 and then at step 342 the procedure returns to step 312. Similar to steps 320 and 326, steps 334 and 340 may provide alternative differentiating signals, and a simpler logic embodiment is also anticipated that would eliminate step 330 and dependents entirely.

The procedure advances to step 344 if the speed is greater than "Y", with "Y" being a predetermined speed such as 35 mph. If the state of the aerodynamic structure is closed at step 346, the procedure advances to step 348 where a 12V is sent to open the aerodynamic structure, there is a delay of 1.5 second at step 350, and then the 12V is ended at step 352, then at step 354 the procedure returns to step 312. If the state is open at step 356, then at step 358 the procedure returns to step 312.

Figure 4:
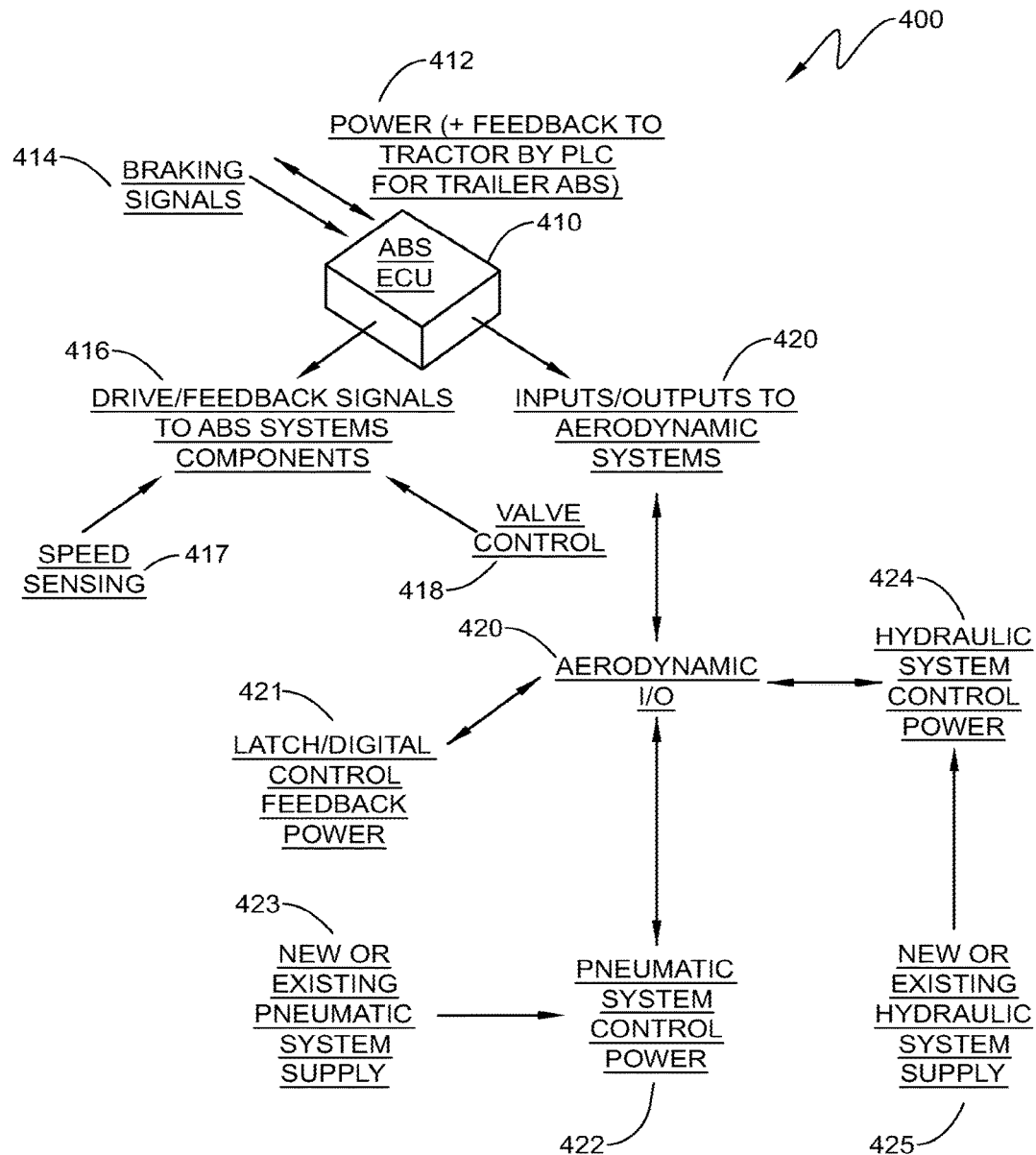
FIG. 4 is a more detailed diagram of the system for electronically-actuated aerodynamic structures, according to the illustrative embodiment.

FIG. 4 is a more detailed diagram of a system for electronically-actuated aerodynamic structures connected into the ABS controller of the truck, according to the illustrative embodiment. A visualization engine and other functional devices are shown, as operatively connected to the ABS controller of the truck. The system 400 shows the ABS ECU 410, the various controls associated therewith, and the aerodynamic I/O values associated therewith. As shown, the ABS ECU 410 communicates power and feedback 412 to the tractor by PLC for trailer ABS. Braking signals 414 are communicated to the ABS controller 410. Drive and feedback signals 416 to the ABS components are provided, including speed sensing 417 and valve control 418. The inputs and outputs to the aerodynamic systems (aerodynamic I/O) 420 are operatively connected to the ABS controller 410. The aerodynamic inputs and outputs 420 include the latch/digital control, feedback, and power 421; the pneumatic system control, power 422, which can also include new or existing pneumatic system supply 423; and hydraulic system control, power 424, which can also include new or existing hydraulic system supply 425.

The systems in accordance with the teachings of FIGS. 2-4 are bistable, meaning they have two stable states: a deployed state and a latched state. An electrically-actuated latching mechanism facilitates automated deployment of the aerodynamic structure. Illustratively, retraction is fully manual.

1.1 Folding Aerodynamic Structures

A three- or four-sided rear aerodynamic structure featuring an upper section (three-sided) or upper and lower sections (four-sided). having vertical (side) and horizontal (top and/or bottom) sections. The aerodynamic structure can feature panel structures that comprise top and side sections that are mechanically linked or structures that comprise top and side sections tat are discrete.

Deployment of the aerodynamic systems can use the weight force of the system components, aided by any stored mechanical (e.g. sprung), pneumatic or hydraulic force or combination thereof to render the system in a deployed state, when otherwise unrestrained, using a latching mechanism to retain a closed position. Opening is automated by use of an electric latch whereby actuation is dependent on an acquired vehicle speed signal.

Figure 5:
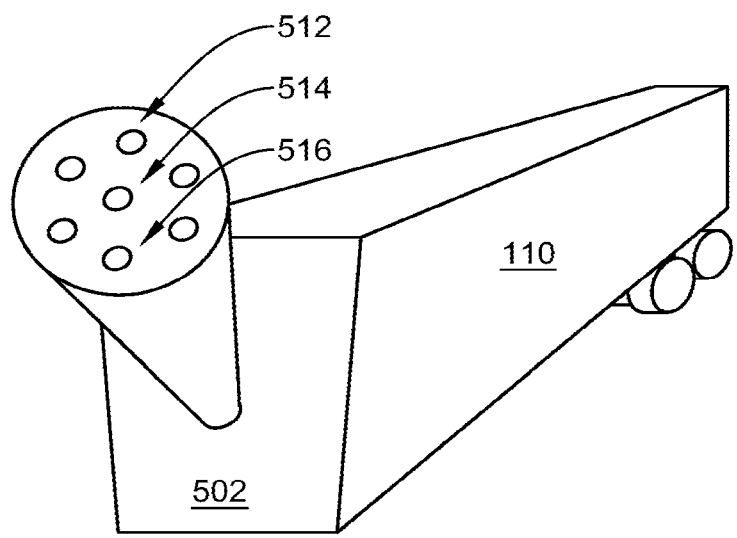
FIG. 5 is a perspective view of a front of a trailer, showing the power line communication connector, according to the illustrative embodiment.

FIG. 5 is a perspective view of a front of a trailer, showing the power line communication connector, according to the illustrative embodiment. As shown, the front 502 of a trailer 110 has a conventional connector 510, such as an SAE J560 connector. The connector 510 includes a ground 512, power and PLC communication 514, and brake light communication 516. These lines for the connector 510 are all for communication from/to the tractor.

Figure 6:
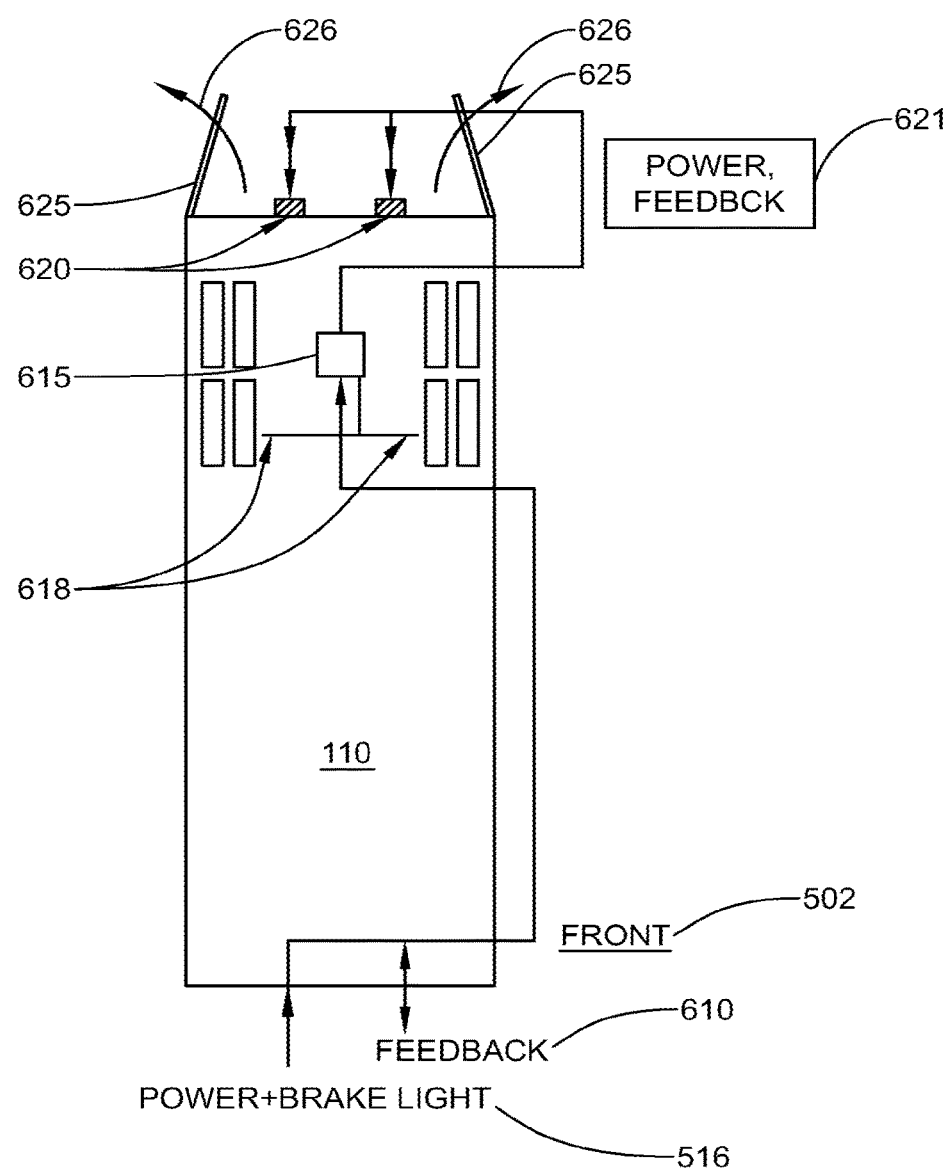
FIG. 6 is a schematic diagram of a bottom view of a system for automatic control of the positioning of folding aerodynamic structures, according to an illustrative embodiment.

FIG. 6 is a schematic diagram of a bottom view of a system linked into the ABS control for automatic control of the positioning of folding aerodynamic structures, according to an illustrative embodiment. Feedback 610 of the system is provided to the ABS control 615. Data from the speed sensors 618 is used to control the latches 620. The power and feedback to the latches 621 is sent from the ABS control to the latches 620. The latches 620 control the positioning of the panels 625, and allow the panel to extend into the deployed position (in the direction of arrow 626).

FIG. 7 is a rear perspective view of the system for automatic control of the positioning of the folding aerodynamic structures, with the aerodynamic structure shown in the stowed, or folded, position, according to the illustrative embodiment. As shown, the side panels 625 are latched closed by the electric latches 620.

FIG. 8 is a rear perspective view of the system for automatic control of the positioning of the folding aerodynamic structures, with the aerodynamic structure shown in the deployed, or open, position, according to the illustrative embodiment. As shown, the side panels 625 have been released by the electric latches 620 and deployed (in the direction of arrows 810).

1.2 Sliding Aerodynamic Structures

FIG. 9 is a rear perspective view of a system for automatic control of the positioning of sliding aerodynamic structures, according to an illustrative embodiment. A three-sided aerodynamic structure 900 is shown in FIG. 9, which is biased in the direction of spring force (SF1). The three-sided aerodynamic structure uses stored mechanical pneumatic or hydraulic force, or a combination thereof, to render the system in a deployed state (when otherwise unrestrained) using a latching mechanism (910, 915) to retain a closed position. As shown, a striker bolt 910 is provided on the aerodynamic structure that engages with an electronic latch 915 to retain the aerodynamic structure in a closed, or retracted, position. The springs 920 bias the aerodynamic structure into the closed position. Closing (retracting) and opening (deploying) the aerodynamic structure of FIG. 9 results in motion in a direction along arrows SF2. Opening is automated by use of an electric latch whereby actuation is dependent on an acquired vehicle speed signal. The power, ground, and optional feedback, 930 can be provided to the latch mechanism 915 as appropriate.

1.3 Cable Routing for Aerodynamic Structures

Figure 10:
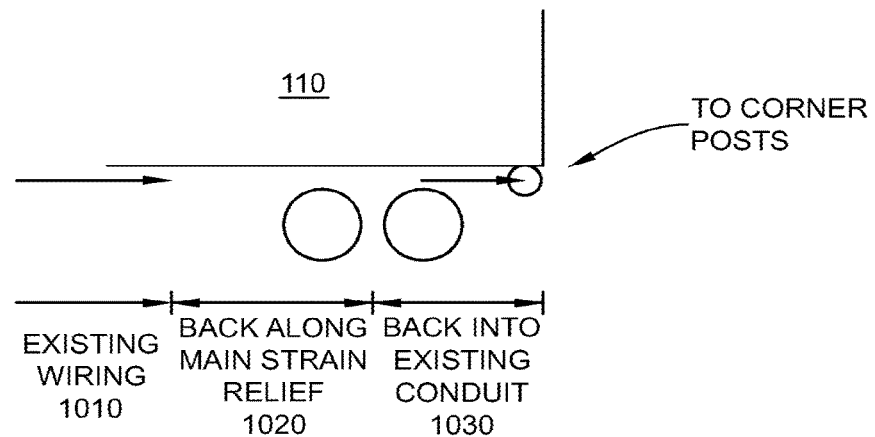
FIG. 10 is a side view of a cable routing arrangement for an aerodynamic structure, according to an illustrative embodiment.

FIG. 10 is a side view of a cable routing arrangement for an aerodynamic structure, according to an illustrative embodiment. Initial routing from the ABS module to a main loom conduit along the vehicle lengthwise axis features cable relaxation. This allows any required movement or otherwise facilitates any usability constraint in the ABS module. Where the ABS module is fitted on the vehicle bogie, cable relaxation is designed allowing for a change in vehicle bogie position. This cable routing mechanism can be shared with existing electrical cabling to the ABS module. As shown, the cabling is routed within the main loom conduit along the vehicle lengthwise axis. This conduit typically contains ground and power to the rear tail light cluster, and any additional electrical power for any auxiliary devices located at the vehicle rear. The cable is routed into the existing wiring 1010 from the ABS module to the main loom conduit. The cable is then routed within the main loom conduit 1020. Finally, the cable is routed back into existing conduit 1030, and into each door and to the e-latch solution (or alternative actuator, such as a pneumatic actuator or electric motor described in greater detail hereinbelow). The cabling in this region is affixed in a manner allowing each door to open to a fully retracted (e.g. cargo loading) position without pinching, adversely abrading, stretching, or in any other way impeding the functionality of the door or the life of the cable. The cable may feature additional abrasion resistance in this section. The cable run from the main loom conduit to the door may occur at the base of each door post, at the top of each door post or as a combination of both.

Figure 11:
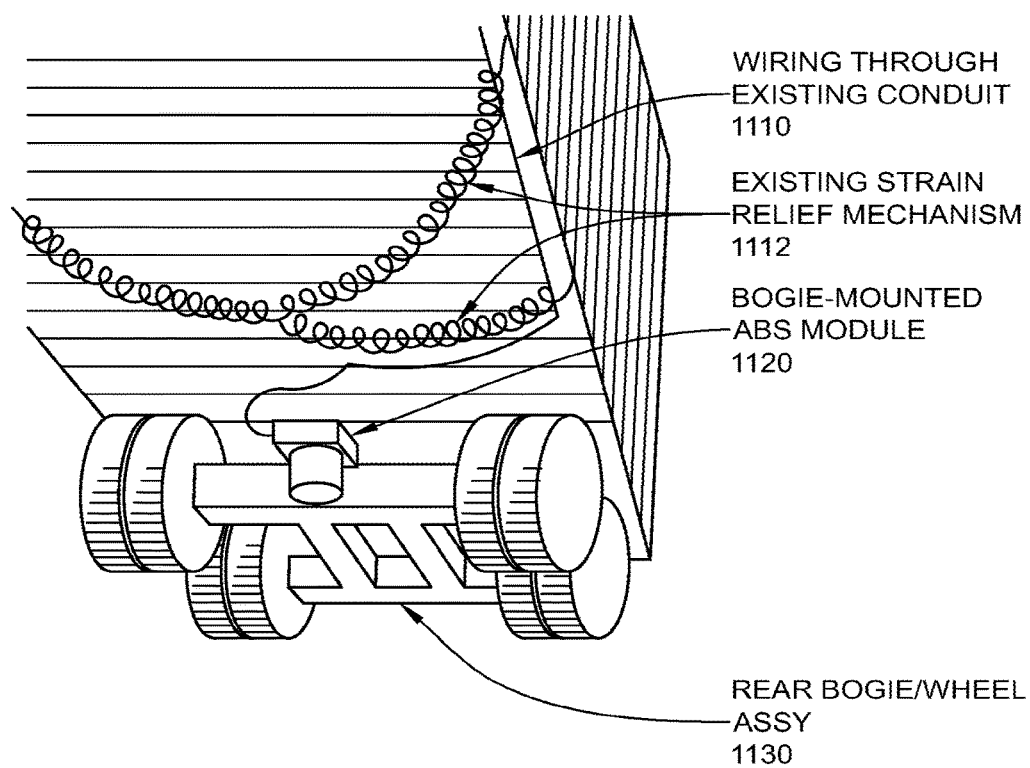
FIG. 11 is a bottom perspective view of the cable routing arrangement for an aerodynamic structure, according to the illustrative embodiment.

FIG. 11 is a bottom perspective view of the cable routing arrangement for an aerodynamic structure, according to the illustrative embodiment. As shown, the cabling is wired through the existing conduit 1110. The existing strain relief mechanism 1112 is shown in the bottom view of FIG. 11. The bogie-mounted ABS module 1120 is also shown in FIG. 11. The rear bogie/wheel assembly 1130 is shown in FIG. 11. The cabling assembly shown in FIGS. 10 and 11 is readily applicable to any aerodynamic structure and/or tractor-trailer assembly.

Figure 12:
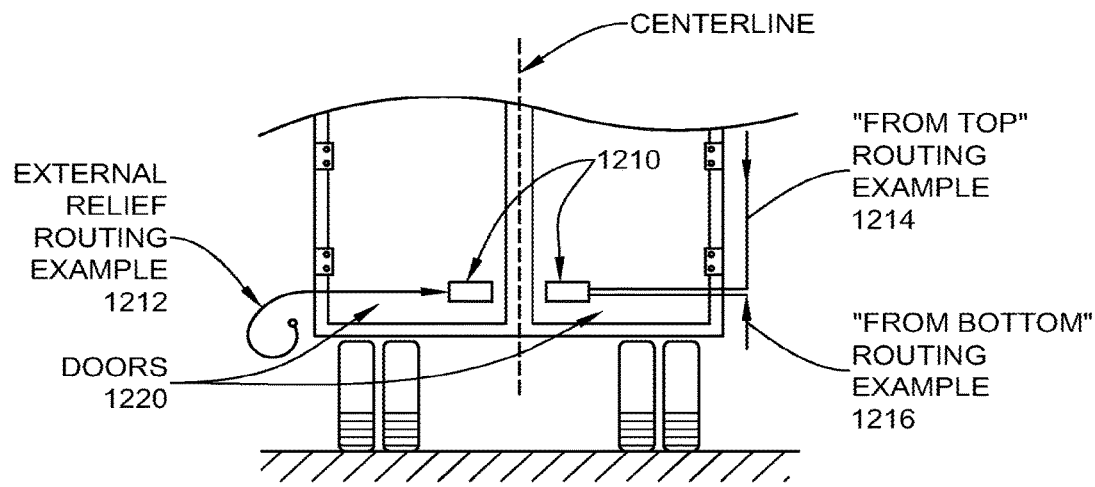
FIG. 12 is a rear partial perspective view of an external cable routing arrangement for an aerodynamic structure, according to the illustrative embodiment.

The cable routing may be internal or external to the cargo door(s). FIG. 12 is a rear partial perspective view of an external cable routing arrangement for an aerodynamic structure, according to the illustrative embodiment. As shown, the electronic latches 1210 are in communication through external routing. The latches 1210 can be operatively connected by an external relief routing arrangement 1212, a "from the top" routing arrangement 1214 or a "from the bottom" routing arrangement 1216 relative to the doors 1220.

Figure 13:
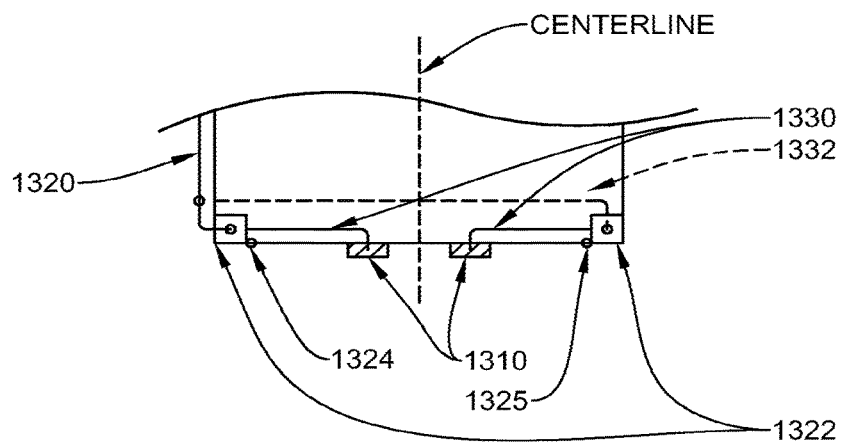
FIG. 13 is a top partial perspective view of an internal cable routing arrangement for an aerodynamic structure, according to the illustrative embodiment.

FIG. 13 is a top partial perspective view of an internal cable routing arrangement for an aerodynamic structure, according to the illustrative embodiment. As shown, the electronic latches 1310 are in communication through internal routing. The latches 1310 are secured to the panels by an internal routing arrangement. The wiring along the main conduit is shown at 1320. The trailer rear posts 1322 are shown and are adjacent the hinges 1324, 1325. The wiring inside the doors to the latches 1330 is shown, as well as the wiring to access the sides, along dotted line 1332.

1.4 Trailing Edge Lighting Cluster for Top Panels of Aerodynamic Structure

The folding aerodynamic structure can be benefited by employing a taillight system on the trailing edge of the upper panels. FIG. 14 is a rear partial perspective view showing standard tail lights 1400 for a truck or cargo body and the top panels 1410 of the aerodynamic structure, according to an illustrative embodiment. In accordance with the illustrative embodiment, there is a cap 1420 that is approximately 2-inches in height above the doors.

FIG. 15 is a side partial perspective view showing the standard tail lights for a truck or cargo body and the top panels of the aerodynamic structure, showing the top panel in the stowed position, according to the illustrative embodiment. The panel 1510 is mounted on a linkage (offset hinge, quadrilateral linkage, etc) capable of maintaining a linear displacement 1520 from the uppermost vertical edge, exposing the standard taillight cluster 1400, as shown in FIG. 15. When deployed, the top panels obscure this cluster and contain its own cluster integrated into the trailing edge, as shown in FIGS. 17 and 18. This system realizes aerodynamic advantages from having the top panel flush with the vehicle roof at the base surface, while maintaining visibility for the rear/tail light cluster, in accordance with regulatory requirements.

FIG. 16 is a side partial perspective view showing the standard tail lights 1400 for a truck or cargo body and the top panels 1510 of the aerodynamic structure, showing the top panel transitioning from the stowed position toward a deployed position, according to the illustrative embodiment. FIG. 17 is a side partial perspective view showing the standard tail lights for a truck or cargo body and the top panels of the aerodynamic structure, showing the top panel in the deployed position, according to the illustrative embodiment.

Figure 17A:
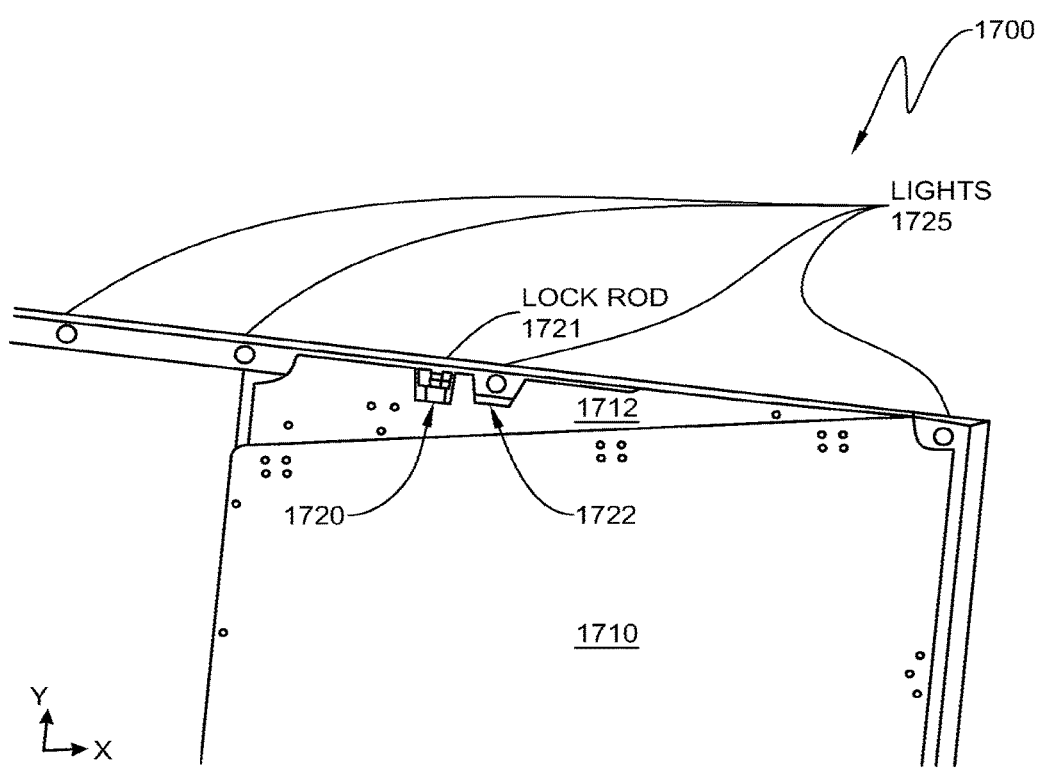
FIG. 17A is a rear partial perspective view of an aerodynamic structure when folded and including cutouts in a top panel of the aerodynamic structure, in accordance with an illustrative embodiment.

FIG. 17A is a rear partial perspective view of an aerodynamic structure including cutouts in a top panel of the aerodynamic structure, according to an illustrative embodiment. The aerodynamic structure 1700 includes a side panel 1710 that overlays an upper panel 1712 when the aerodynamic structure is in the folded position, as shown in FIG. 17A. The upper panel 1712 can include a first cutout 1720 for a lock rod 1721 and a second cutout 1722 for appropriate light(s) 1725. The lights are visible when the aerodynamic structure is closed by providing the cutouts on the upper panel. The shape, placement and positioning of cutout(s) are highly variable within ordinary skill to provide desired accessibility to components of the trailer, including the lock rod, lights, or any other portions of the trailer, door or frame. Furthermore, depending upon the folding arrangement of the aerodynamic structure, the cutouts can be placed on the side panel in addition to, or instead of, on the upper panel.

FIG. 18 is a rear partial perspective view showing the top panel 1810 in the deployed position and including integrated tail lights 1820, according to an illustrative embodiment.

2. Electro Pneumatically Actuated Aerodynamic Structures

Figure 19:
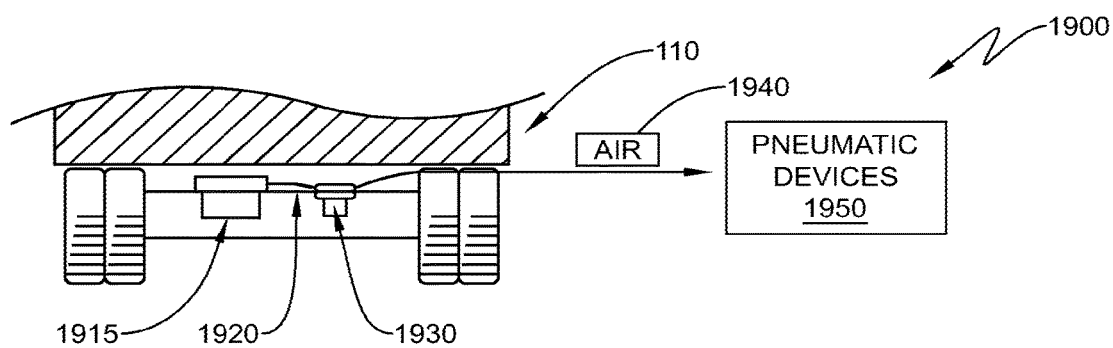
FIG. 19 is an overview block diagram of a system for electro-pneumatically actuated aerodynamic structures, according to an illustrative embodiment.

Electro-pneumatic systems refer to systems in which the primary actuation mechanism is pneumatic. More specifically, a pneumatic piston rod or rotary displacement actuator, actuated via solenoid. FIG. 19 is an overview block diagram of a system 1900 for electro-pneumatically actuated aerodynamic structures connected into the ABS controller, according to an illustrative embodiment. An ABS controller 1915 is operatively connected to the solenoid trigger 1920, and the ABS controller provides energy to the solenoid 1930 for controlling the air 1940 that is delivered to the pneumatic devices 1950. The energizing current for the solenoid 1930 is provided by the vehicle ABS controller 1915, or switched by the ABS controller. The same ABS controller 1915 also provides a reliable speed signal, acquired from existing wheel speed sensors, and a logic processing unit (see FIG. 1 and the corresponding description for more detail) capable of energizing relevant electrical circuits based primarily on vehicle speed conditions. While there are simplicity benefits in having a single ABS controller provide both pressurized air and vehicle speed, it is possible to use alternative sensors, such as accelerometers, GPS, or optical position readers, and/or alternative power supplies, such as an air compressor.

Figure 20:
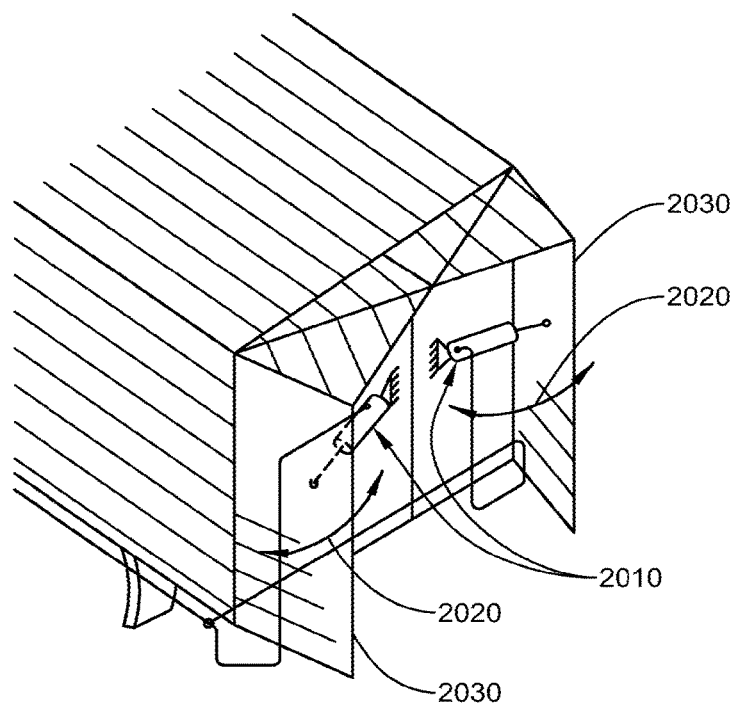
FIG. 20 is a top partial perspective view of an electro-pneumatically actuated aerodynamic structure, shown in a deployed position, according to the illustrative embodiment.
Figure 21:
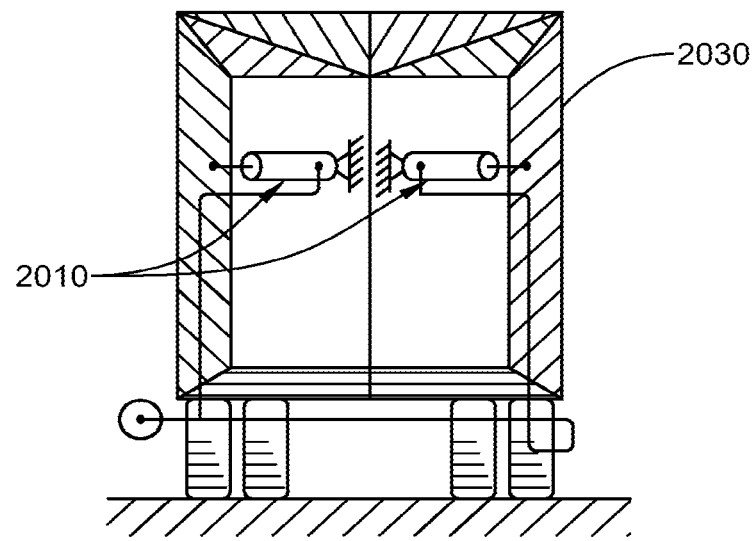
FIG. 21 is a rear perspective view of the electro-pneumatically actuated aerodynamic structure, shown in a deployed position, according to the illustrative embodiment.
Figure 22:
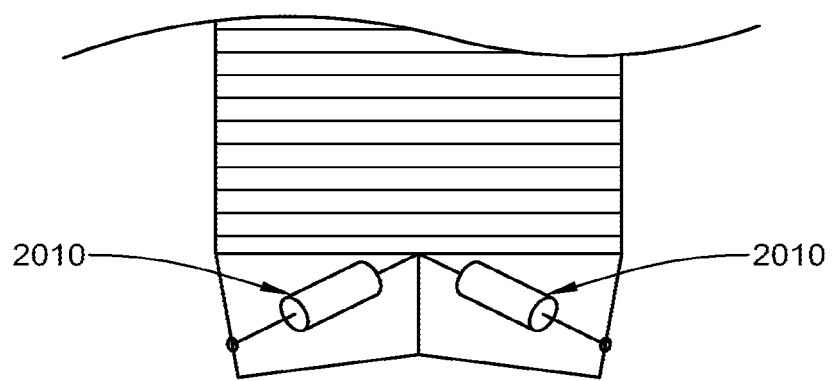
FIG. 22 is a top partial perspective view of the electro-pneumatically actuated aerodynamic structure, shown in the deployed position, according to the illustrative embodiment.

Generally, these systems are bistable (open/deployed and closed/parked states), with solenoid actuation effectively providing two states, in which the solenoid is energized or not. This pneumatic piston rod, in turn can be single acting (meaning it provides force in one linear or one angular moment sense only) or double acting (meaning it provides force in two directions along one axis or in two moment-senses around one axis). FIG. 20 is a top partial perspective view of an electro-pneumatically actuated aerodynamic structure, shown in a deployed position, according to the illustrative embodiment having two pneumatic cylinders. As shown, the pneumatic actuators 2010 control movement (in the direction of arrow 2020) of the side panels 2030. FIG. 21 is a rear perspective view of the electro-pneumatically actuated aerodynamic structure, shown in a deployed position, according to the illustrative embodiment. FIG. 22 is a top partial perspective view of the electro-pneumatically actuated aerodynamic structure, shown in the deployed position, according to the illustrative embodiment.

Figure 23:
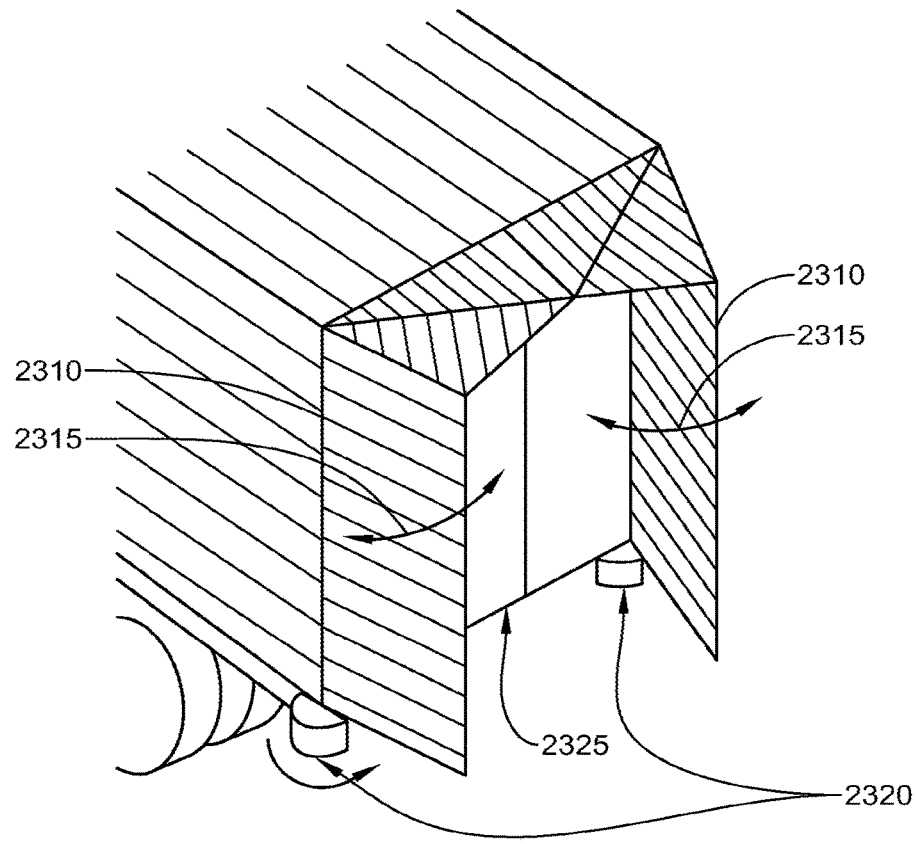
FIG. 23 is a rear perspective view of an electro-pneumatically actuated aerodynamic structure shown in the deployed position and employing rotary pneumatic actuators, according to the illustrative embodiment.

FIG. 23 is a rear perspective view of an electro-pneumatically actuated aerodynamic structure shown in the deployed position and employing rotary pneumatic actuators, according to the illustrative embodiment. The side panels 2310 move in the direction of arrows 2315 through use of rotary pneumatic actuators 2320 and associated pneumatic line(s) 2325.

Figure 23A:
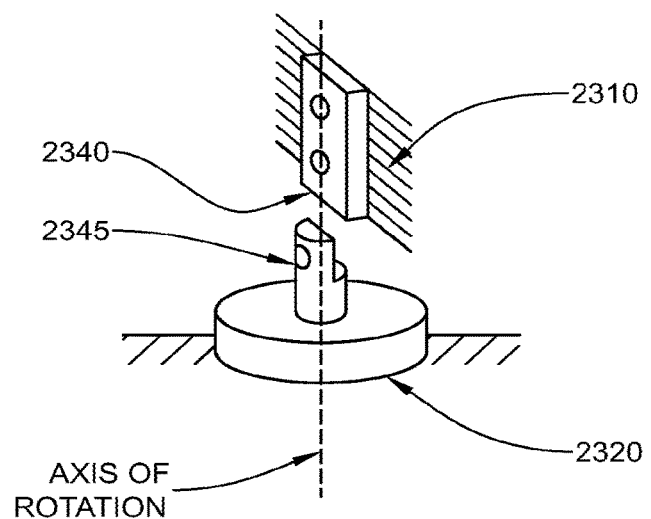
FIG. 23A is a detailed perspective view of the rotary pneumatic actuator, according to the illustrative embodiment.

FIG. 23A is a detailed perspective view of the rotary pneumatic actuator, according to the illustrative embodiment. As shown, the rotary actuator 2320 is secured to the side panel 2310 by a key and keyed shaft. The side panel 2310 has a key 2340 mounted thereon, which engages a keyed shaft 2345 of the rotary actuator 2320.

2.1 Folding Aerodynamic Structures with Pneumatic Actuator(s); Bistable Actuation A three- or four-sided aerodynamic structure using a pneumatic mechanism to retain one of two positions (open/deployed and closed/retracted) is provided, in which pneumatic reserves are shared with the braking system of the vehicle. Actuation is contingent on an acquired vehicle speed signal. The pneumatic mechanism can feature linear or rotational movement. The actuator can comprise a single single-acting actuator per side (or multiple single-acting actuators per side) to facilitate opening of a folding aerodynamic structure with mechanically linked or mechanically unique horizontal and vertical panel sections. The actuator can comprise a single double-acting actuator per side (or multiple double-acting actuators per side) that is used to automate opening and closing of a folding aerodynamic structure with mechanically linked or mechanically unique horizontal and vertical panel sections. In accordance with an illustrative embodiment, the ABS module is programmed to open the aerodynamic structure above a threshold speed, and to close the aerodynamic structure below a threshold speed. The opening and closing threshold speeds can be unique. The default and/or "failsafe" position of the aerodynamic device can be open (deployed) or closed (retracted).

FIG. 24 is a partial perspective view of a folding aerodynamic structure employing pneumatic actuators, shown in the deployed position, according to an illustrative embodiment, employing two pneumatic actuators 2410. FIG. 24A is a partial perspective view of the folding aerodynamic structure employing pneumatic actuators, shown in the stowed position, with the side panel folding over the top panel, according to the illustrative embodiment. FIG. 24B is a partial perspective view of the folding aerodynamic structure employing pneumatic actuators, shown in the stowed position, with the top panel folding over the side panel, according to the illustrative embodiment. FIG. 25 is a partial perspective view of the folding aerodynamic structure employing multiple double-acting actuators 2510 per side, showing the panels in the deployed position, according to the illustrative embodiment.

The systems employing bistable actuation with pneumatic actuators can features failsafe modes on detection of a significant braking event. The system can be programmed to lose system pressure providing manual actuation or to retract as soon as possible.

2.2 Folding Aerodynamic Structures with Multi-Position Pneumatic Actuation

In accordance with a pneumatic mechanism to set and hold any angular displacement of the panel assembly, pneumatic reserves are shared with the vehicle's braking system. Actuation is contingent on an acquired vehicle speed signal, allowing the aerodynamic structure to achieve an optimal position with respect to prevailing vehicle speed. The system is aided by further control of the pneumatic solution with respect to prevailing wind conditions, where wind condition information is used to calculate or otherwise account for effects of freestream yaw given wind conditions.

2.3 Folding Aerodynamic Structure; Aero-Mechanical Displacement

A three- or four-sided aerodynamic structure features folding, overlapping side and top (three-sided) or top and bottom (four-sided) sections, using the weight force of the system components aided by any stored mechanical (e.g. sprung), pneumatic or hydraulic force or a combination thereof, to render the system in a deployed state (when otherwise unrestrained), using a pneumatic mechanism(s) to set and hold any angular displacement of top or side panel assemblies from the vehicle afterbody, whereby pneumatic reserves are shared with the vehicle's braking system. Top and side panels are not mechanically linked, pneumatic actuation of overlapping sections is staggered and/or delayed accordingly. Pneumatic actuation is contingent on an acquired vehicle speed signal. A smaller degree of angular displacement in the deployed position is afforded by a spring or spring-damper system allowing additional angular displacement on any linked panel system as a function of pressure differences imparted by local wind conditions.

FIG. 26 is a detailed perspective view of a linear actuator and associated hinge assembly, according to the illustrative embodiment. As shown, a hinge 2610 with restraint 2612 and torsion bar 2614 secured between the side panel 2620 and the trailer door 2630. Additionally, linear actuator 2640 is provided between the side panel 2620 and trailer door 2630. As shown in FIG. 26A, when in the stowed position, the torsion bar and the actuator experience torque in the same direction. In the deployed static position of FIG. 26B, the torsion bar and the actuator are in equilibrium, and the actuator is not fully extended. In the deployed at speed position shown in FIG. 26C, the torsion bar torque is opposite the actuator torque and the air pressure torque, resulting in full deployment at full speed.

2.4 Sliding Aerodynamic Structures; Bistable Actuation

Figure 27:
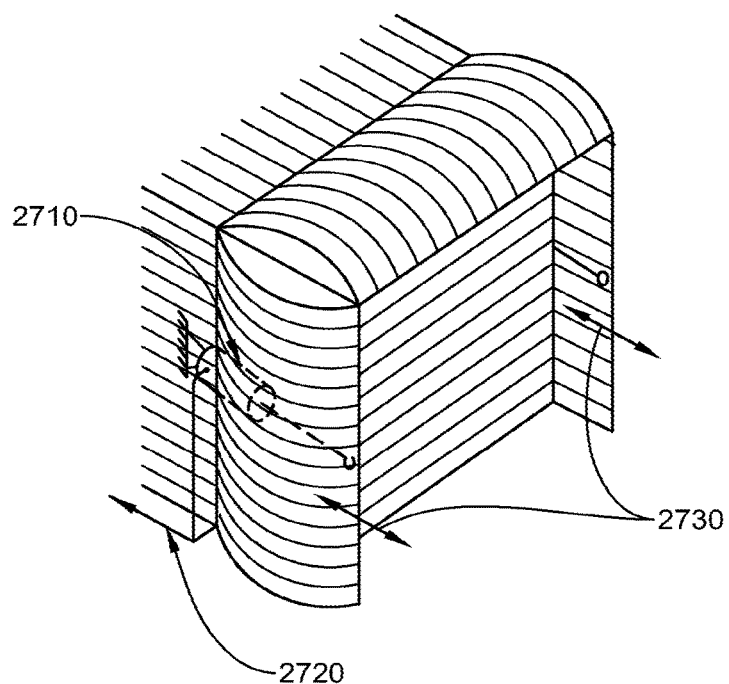
FIG. 27 is a partial perspective view of a sliding aerodynamic structure employing electro-pneumatic actuators, according to the illustrative embodiment.

A three-sided aerodynamic structure featuring sliding top and side sections, using stored mechanical, pneumatic or hydraulic force or a combination thereof, to render the system in a parked state (collapsed; no extension beyond the vehicle rear surface), using pneumatic actuation to move the system into a deployed state (as shown in FIG. 27). FIG. 27 is a partial perspective view of a sliding aerodynamic structure employing electro-pneumatic actuators, according to the illustrative embodiment. Illustratively, actuation is dependent upon an acquired vehicle speed signal. The actuators 2710 are connected to pneumatic line(s) 2720. The pneumatic actuators 2710 control movement of the system from the collapsed state into the deployed state, as shown by arrows 2730.

2.5 Sliding Aerodynamic Structures; Multi-Position Actuation

A three-sided aerodynamic structure features a sliding top and side sections (similar to the structure shown in FIG. 27), using stored mechanical, pneumatic or hydraulic force or combination thereof to render the system in a parked state (when otherwise unrestrained), using pneumatic actuation to move the system into intermediate and fully deployed states. Actuation is dependent upon an acquired vehicle speed signal.

2.6 Inflatable Systems

Figure 28A:
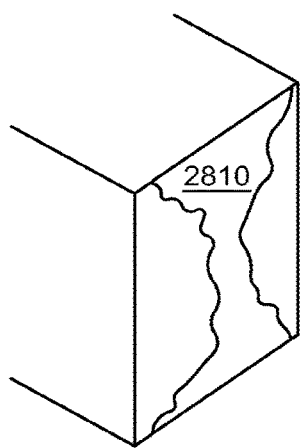
FIG. 28A is a partial perspective view of an inflatable aerodynamic structure, shown in the stowed, or deflated, positioning, according to the illustrative embodiment.
Figure 28B:
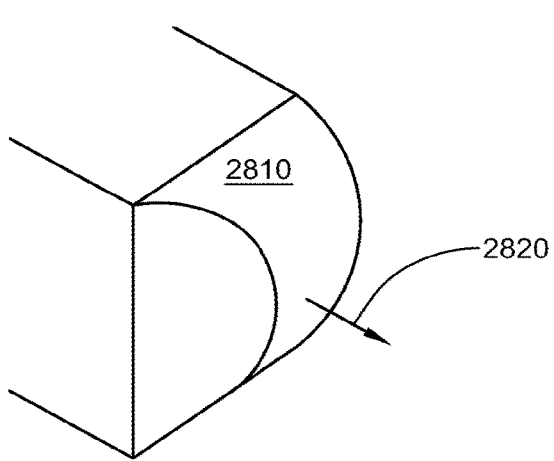
FIG. 28B is a partial perspective view of the inflatable aerodynamic structure, shown in the deployed, or inflated, positioning, according to the illustrative embodiment.

FIG. 28A is a partial perspective view of an inflatable aerodynamic structure 2810, shown in the stowed, or deflated, positioning, according to the illustrative embodiment. Actuation of the inflatable structure 2810 is dependent on an acquired vehicle speed signal as acquired by the vehicle ABS system and inflated (arrow 2820) using air from the vehicle braking system. FIG. 28B is a partial perspective view of the inflatable aerodynamic structure 2810, shown in the deployed, or inflated, positioning, according to the illustrative embodiment.

3. Other Systems Employing Electric of Electro-Pneumatic Actuation

A value-added vehicle ABS controller(s), or alternatively, an ECU incorporating vehicle speed sensing, can be used to render additional aerodynamic solutions active. At a most basic level these systems are bistable, with actuator or solenoid actuation effectively providing two states (when the solenoid is energized or not). It is also contemplated that multiple stable states can be presented.

3.1 Moveable Trailer Underbody Skirts and Scoops

Figure 32A:
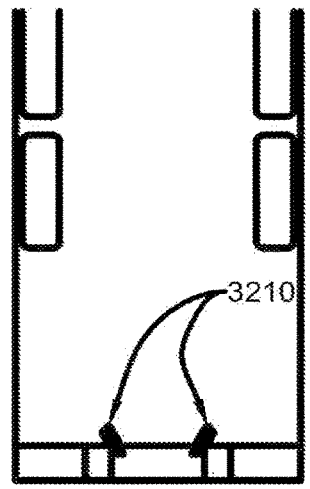
FIG. 32A is a bottom view of behind-bogie scoops, shown in the retracted position, according to an illustrative embodiment.
Figure 32B:
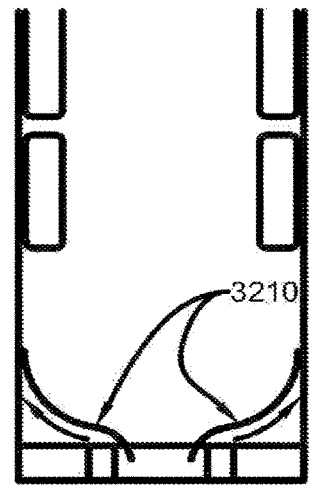
FIG. 32B is a bottom view of the behind-bogie scoops, shown in the extended position, according to the illustrative embodiment.
Figure 32C:
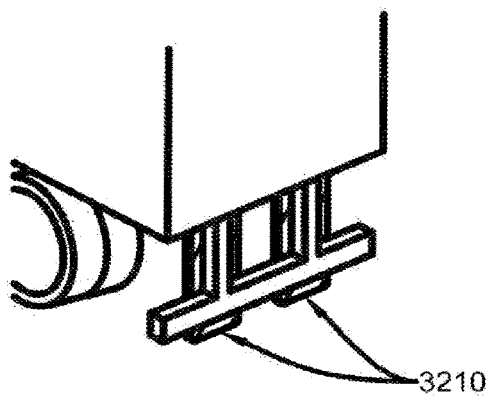
FIG. 32C is a rear perspective view of the behind-bogie scoops, shown in the retracted position, according to the illustrative embodiment.
Figure 32D:
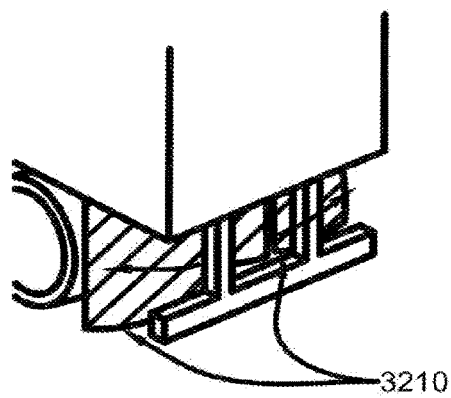
FIG. 32D is a rear perspective view of the behind-bogie scoops, shown in the extended position, according to the illustrative embodiment.

FIG. 29A is a perspective view of an angularly adjustable trailer skirt 2910 for a truck cargo body 110, shown in the stowed position, according to an illustrative embodiment. The adjustable angular displacement of the trailer skirt 2910 allows a change in vertical height-to-ground actuated electro-pneumatically, using stored mechanical, pneumatic or hydraulic force or combination thereof to render the system in a failsafe state. The angularly adjustable trailer skirt 2910 is adjustable in the direction of arrow 2920 as shown in FIG. 29B which is a perspective view of the angularly adjustable trailer skirt, shown in the extended position, according to the illustrative embodiment;

FIG. 30A is a perspective view of a vertically adjustable trailer skirt 3010, shown in the stowed position, according to an illustrative embodiment. The adjustable vertical displacement of the trailer skirt 3010 allows a change in vertical height-to-ground actuated by electro-pneumatic means, using stored mechanical, pneumatic or hydraulic force, or a combination thereof, to render the system in a failsafe state. The vertically adjustable trailer skirt 3010 is adjustable in the direction of arrow 3020. FIG. 30B is a perspective view of the vertically adjustable trailer skirt, shown in the extended position, according to the illustrative embodiment;

FIG. 31A is a partial side view of a behind-bogie skirt, shown in the stowed position, according to an illustrative embodiment. FIG. 31B is a partial side view of the behind-bogie skirt 3110, shown in the extended position as the skirt 3110 moves in the direction of arrow 3120, according to the illustrative embodiment;

FIG. 32A is a bottom view of behind-bogie scoops 3210, shown in the retracted position, according to an illustrative embodiment. FIG. 32B is a bottom view of the behind-bogie scoops 3210, shown in the extended position, according to the illustrative embodiment. FIG. 32C is a rear perspective view of the behind-bogie scoops 3210, shown in the retracted position, according to the illustrative embodiment. FIG. 32D is a rear perspective view of the behind-bogie scoops, shown in the extended position, according to the illustrative embodiment.

3.2 Single-Stage Inflatable Tractor-Trailer Gap Sealing Structure

An inflatable device is provided that partially or completely seals the tractor-trailer gap. The tractor-trailer gap refers to the gap that is typically created between the truck cab and the trailer body—partial or complete sealing of this gap is an aerodynamic improvement. Actuation of the inflatable device is dependent on an acquired vehicle speed signal. Likewise, rapid deflation occurs at speeds below a "highway speed" threshold. The device is constructed and arranged such that a limited angular displacement of tractor and trailer is allowed, characteristic of highway driving conditions. Below highway speeds, the device rapidly deflates, allowing angular deflections characteristic of city driving, parking and other driving related activities.

Figure 33A:
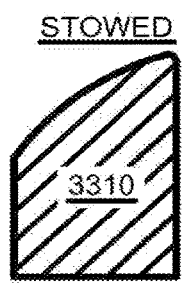
FIG. 33A is a side view of a truck cab and trailer body with a gap-sealing device shown in the stowed position, according to an illustrative embodiment.
Figure 33A:
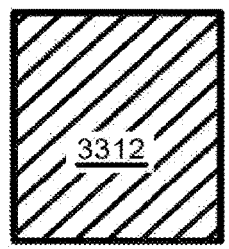
Figure 33B:
FIG. 33B is a top view of a truck cab and trailer body with the gap-sealing device shown in the stowed position, according to the illustrative embodiment.

FIG. 33A is a side view of a truck cab 3310 and trailer body 3312 with a gap-sealing device shown in the stowed position, according to an illustrative embodiment. FIG. 33B is a top view of the truck cab 3310 and trailer body 3312 with the gap-sealing device shown in the stowed position, according to the illustrative embodiment;

FIG. 34A is a side view of a truck cab 3310 and trailer body 3312 with an inflatable tractor-trailer gap sealing device 3410 having single-stage inflation and secured to the trailer 3312, the tractor-trailer gap sealing device shown in the inflated position, according to an illustrative embodiment. FIG. 34B is a top view of the inflatable tractor-trailer gap sealing device having single-stage inflation, shown in the inflated position, according to the illustrative embodiment. As shown in the top view, the inflatable gap sealing device allows for deflection of the trailer cab at speeds.

FIG. 35A is a side view of a truck cab 3310 and trailer body 3312 with an inflatable tractor-trailer gap sealing device 3510 having single-stage inflation and secured to the truck 3310, the tractor-trailer gap sealing device shown in the inflated position, according to the illustrative embodiment. FIG. 35B is a top view of the inflatable tractor-trailer gap sealing device having single-stage inflation, shown in the inflated position, according to the illustrative embodiment.

3.3 Multi-Stage Inflatable Tractor-Trailer Gap Sealing Structure

The addition of multiple inflatable stages for different speed ranges characteristic of highway cruising (with little angular displacement of tractor and trailer) and lower speed ranges (where high angular displacement of tractor and trailer is likely). The stages can also be inflated to reflect changes in tractor-trailer gap.

FIG. 36A is a side view of a truck cab 3310 and trailer body 3312 with an inflatable tractor-trailer gap sealing device 3610 having multi-stage deployment, the tractor-trailer gap sealing device being secured to the trailer body 3312 and shown in the inflated position, according to the illustrative embodiment. The multi-stage gap sealing device includes a first inflation stage 3611, a second inflation stage 3612, and a third inflation stage 3613, which altogether results in the inflation of the gap sealing device 3610. FIG. 36B is a top view of the inflatable tractor-trailer gap sealing device 3610 having multi-stage deployment (3611, 3612, 3613) and secured to the trailer 3312, shown in the inflated position, according to the illustrative embodiment.

FIG. 37A is a side view of a truck cab 3310 and trailer body 3312 with an inflatable tractor-trailer gap sealing device 3710 having multi-stage deployment, the tractor-trailer gap sealing device being secured to the truck 3310 and shown in the inflated position, according to the illustrative embodiment. The multi-stage gap sealing device includes a first inflation stage 3711, a second inflation stage 3712, and a third inflation stage 3613, which altogether results in the inflation of the gap sealing device 3710. FIG. 37B is a top view of the inflatable tractor-trailer gap sealing device having multi-stage deployment and secured to the truck, shown in the inflated position, according to the illustrative embodiment.

3.4 Single-Stage Inflatable Tractor-Trailer Gap Sealing Device with Semi-Solid Middle Portion A variation of the multi-stage inflatable concept concerns replacing one of the sections with a permanent, semi-solid section (e.g. foam core) shaped such that all angular displacements between tractor and trailer do not deform the section, while at cruise the inflatable sections are inflatable at highway speeds. FIG. 38A is a top view of an inflatable tractor-trailer gap sealing device 3810 having single-stage inflation of inflatable portions 3812 and a semi-solid middle portion 3814 secured to the trailer, shown in the inflated position, according to the illustrative embodiment. FIG. 38B is a top view of an inflatable tractor-trailer gap sealing device 3810 having single-stage inflation and a semi-solid middle portion secured to the truck, shown in the inflated position, according to the illustrative embodiment.

3.5 Multi-Stage Inflatable Tractor-Trailer Gap Sealing Device with Semi-Solid Middle Portion FIG. 39A is a top view of an inflatable tractor-trailer gap sealing device 3910 having a semi-solid middle portion 3912 secured to the trailer body 3312 and multi-stage inflation (3911 is inflatable with respect to tractor-trailer (linear) gap and 3912 is inflatable for highway speeds), according to the illustrative embodiment;

FIG. 39B is a top view of an inflatable tractor-trailer gap sealing device 3910 having a semi-solid middle portion 3912 secured to the truck 3310 and multi-stage inflation (3911 is inflatable with respect to tractor-trailer (linear gap) and 3912 is inflatable for highway speeds), shown in the inflated position, according to the illustrative embodiment.

3.6 Adjustable Tractor-Trailer Gap Sealing Flaps

Figures 40A, 40B:
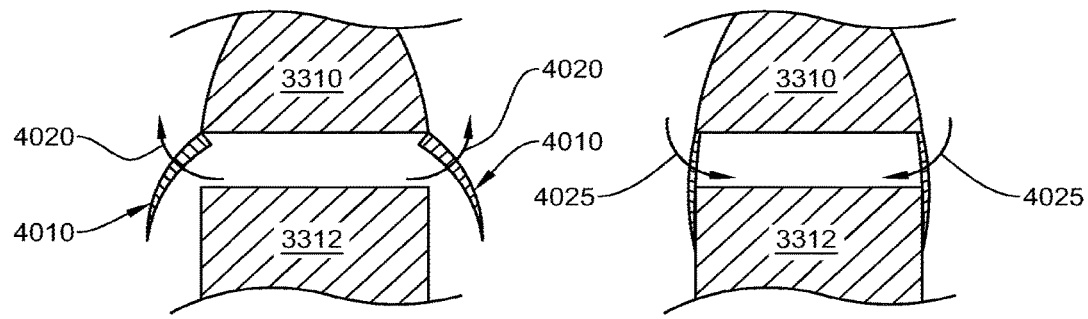
FIG. 40A is a top view of an adjustable tractor-trailer gap sealing device having gap sealing flaps secured to the truck, shown in the stowed position, according to the illustrative embodiment.
FIG. 40B is a top view of an adjustable tractor-trailer gap sealing device having gap sealing flaps secured to the truck, shown in the extended, or sealing, position, according to the illustrative embodiment.

A series of flaps mounted to the sides, or to the top (not shown) and sides of a tractor's relevant trailing edges. FIG. 40A is a top view of an adjustable tractor-trailer gap sealing device having gap sealing flaps 4010 secured to the truck 3310, shown in the stowed position, according to the illustrative embodiment. The ABS controller utilizes a steering angle input signal so that during turning maneuvers, the inside flap is deflected outwards (as shown by arrows 4020 in FIG. 40A), such that it deflects clear of the trailer 3312. The flaps 4010 are shown in close contact to the trailer 3312 (as shown by arrows 4025) in FIG. 40B. It is also contemplated that a system of springs, tab stops and levers maintain the same effect in a completely passive system, as commonly known to those skilled in the art.

3.7 Inflatable Trailer Upper Streamlining Structure

Figures 41A, 41B:
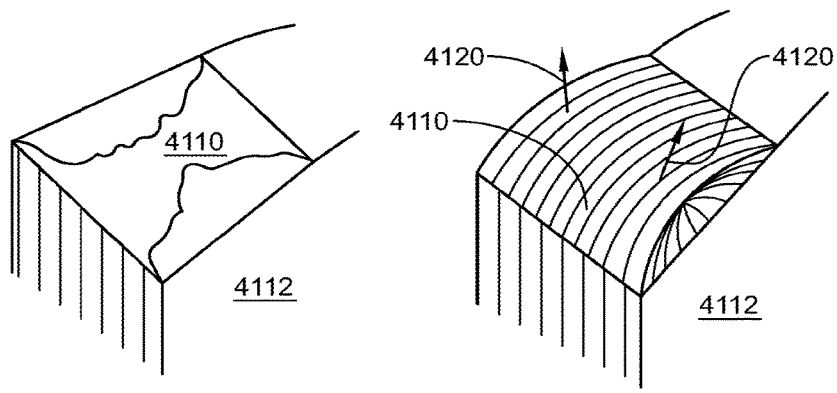
FIG. 41A is a top perspective view of an inflatable trailer upper streamlining device, shown in the deflated, or stowed, position, according to the illustrative embodiment.
FIG. 41B is a top perspective view of an inflatable trailer upper streamlining device, shown in the inflated, or deployed, position, according to the illustrative embodiment.

An inflatable device placed on top of a trailer at the upper front edge for the purposes of streamlining separated flow from the trailer roof leading and side edges is shown in FIGS. 41A and 41B. Actuation is dependent on an acquired vehicle speed signal, as is rapid deflation at speeds below a "highway speed" threshold. FIG. 41A is a top perspective view of an inflatable trailer upper streamlining device, shown in the deflated, or stowed, position, according to an illustrative embodiment. As shown, the inflatable device 4110 is secured on a top surface of the trailer 4112. The inflatable trailer upper streamlining device 4110 is shown in the inflated position in FIG. 41B, in which the device 4110 inflates outward and upward, in the direction of arrows 4120.

Figure 41C:
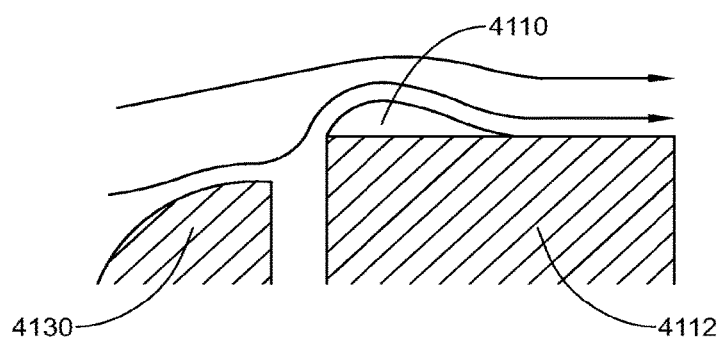
FIG. 41C is a side view of the inflatable trailer upper streamlining device, shown in the inflated position, and showing air passing over the truck cab and trailer body with the assistance of the upper streamlining device, according to the illustrative embodiment.

FIG. 41C is a side view of the inflatable trailer upper streamlining device 4110, shown in the inflated position, and showing air passing over the truck cab 4130 and trailer body 4112 with the assistance of the upper streamlining device 4110, according to the illustrative embodiment.

4. Electronic Control Units (ECUs) for Aerodynamic System Control

An alternative to using value-added vehicle ABS controller(s) to providing system logic, electrical power and signaling to aerodynamic control hardware is presented.

4.1 Aerodynamics ECU

Figure 42:
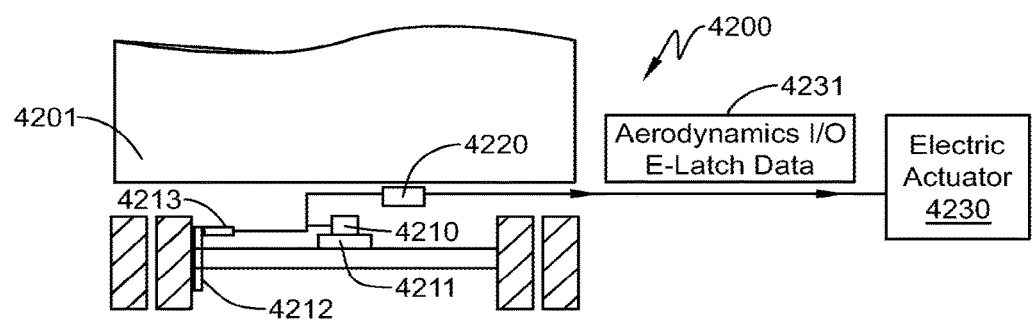
FIG. 42 is an overview block diagram of a system for electric control units (ECUs) for aerodynamic system control through interfacing with the ABS controller or wheel speed sensor, according to an illustrative embodiment.

FIG. 42 is an overview block diagram of a system for electric control units (ECUs) for aerodynamic system control through interfacing with an external speed sensor, such as the ABS controller (4210), wheel speed sensor (4213), an optical reader, or pressure differential sensors mounted to the rear doors and at an alternative location in the airstream; or an internal sensor, such as GPS, an accelerometer, according to an illustrative embodiment. A second ECU is presented for providing control of the aerodynamic structure hardware. The motorized aerodynamic system can be either double acting or single acting (e.g. motorized for both open and close or only one direction, respectively). In three illustrated examples, the aerodynamics ECU 4220 acquires a speed signal from either digital communication line from ABS controller 4210, power line communication from ABS controller 4210, or directly from wheel speed sensor 4213. In an exemplary embodiment, the wheel speed sensor is of the common style used in an ABS system consisting of a toothed or slotted wheel 4212 and a magnetic sensor 4213, allowing the aerodynamics ECU to process and execute system logic on basis of vehicle speed. The aerodynamics ECU optionally interfaces with the ABS controller to acquire a reliable "actuation OK" signal from it via PLC on a "constant hot" (J560 blue for example) power line or a digital output, allowing the aerodynamics ECU to process and execute system logic during times where system electrical and pneumatic resources are not dedicated to braking maneuvers.

Figure 42A:
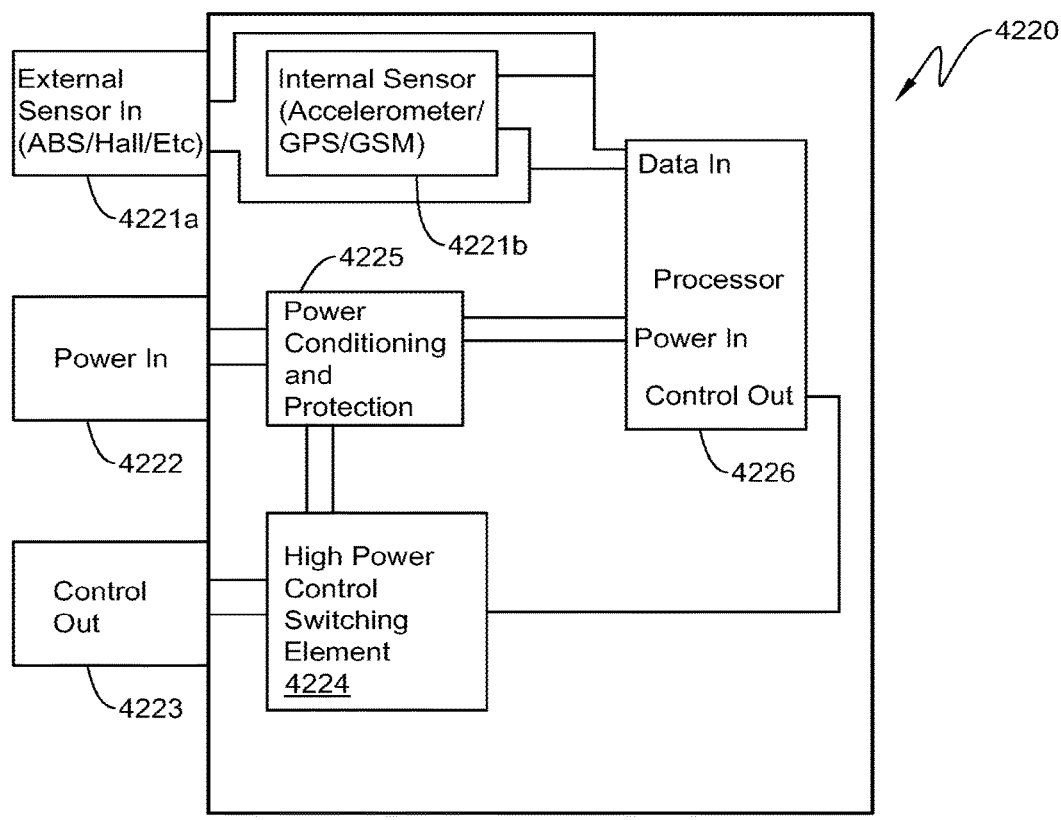
FIG. 42A is a schematic diagram of a more detailed view of the components of the ECU of FIG. 42, according to an illustrative embodiment.

Illustratively, as shown in FIG. 42A, there are multiple analogue/digital inputs and outputs on the aerodynamic ECU 4220 for the purpose of deploying, adjusting and retracting vehicle aerodynamic devices. The aerodynamic ECU 4220 optionally communicates status and fault information through PLC (power line communication) to the tractor. The electrical diagram of the Aerodynamic ECU shows two incoming lines and one outgoing line. The basic schematic of the ECU consists of a power conditioning element 4925, a processor 4926, and a high power control switching element 4924. The power conditioning element receives 12 volt DC power from the tractor and provides protection from current surges and regulates voltage to the proper level for powering the processor and power switching element. The processor 4926 receives the incoming data from an external sensor 4221a, such as the ABS controller, a gear tooth speed and direction sensor, or PLC from the tractor, or an internal sensor 4221b, such as accelerometer, GPS or GSM (Global System for Mobile Communications). From this incoming data, the processor determines the speed and direction of the trailer and executes logic sending commands to the switching element 4924. The high power switching element 4924 consists of one or more transistors or relays allowing for switching of higher current loads than the processor is capable of handling. The switching element sends power to pneumatic valves, electric motors or electric latches for controlling the position of the aerodynamic system.

Figure 43:
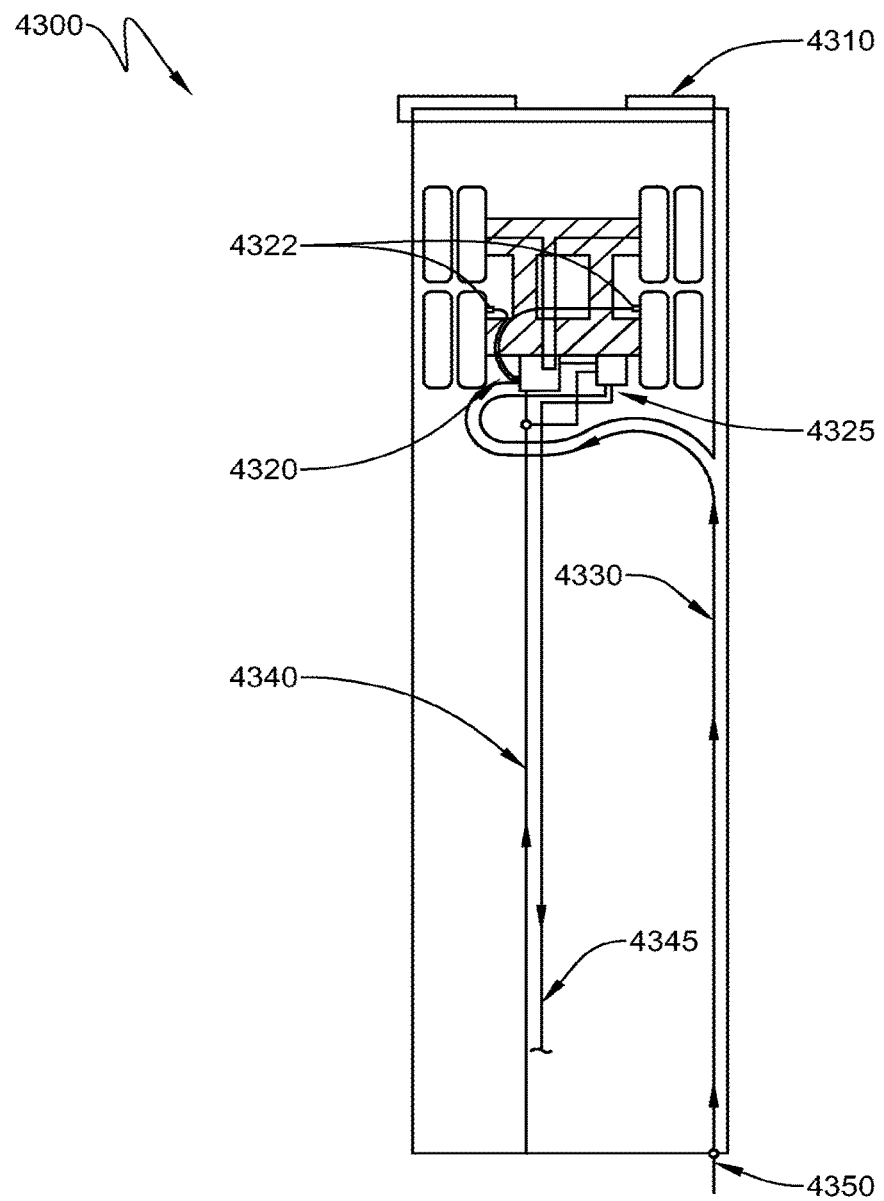
FIG. 43 is a schematic diagram of a bottom view of the routing of the system for ECUs for aerodynamic system control, as implemented on a trailer, according to the illustrative embodiment.

FIG. 43 is a bottom view of a schematic diagram showing the routing of the system 4300 for ECUs for aerodynamic system control, as implemented on a trailer, according to the illustrative embodiment. An electrical or electro-pneumatic aerodynamic structure 4310 is provided at a back end of the trailer. The ABS controller and valve manifold 4320 are operatively connected to the speed sensor 4322 and the aerodynamics ECU 4325. The aerodynamics ECU can be both with and without manifold, pressure reserve, and other functionalities known in the art. The electrical main conduit 4330 carries power to the ABS controller 4320 and the aerodynamics controller 4325. A pneumatic service line 4340 is operatively connected to the ABS controller and the aerodynamics controller. The pneumatic returns to aerodynamic devices via line 4345. The electrical main conduit 4330 can be from the main power line 4350, such as J560 known commonly in the art.

4.2 Aerodynamic ECU with Satellite Navigation

The system shown and described above with reference to FIGS. 42 and 43 is further enhanced with satellite navigation functionality for the purposes of acquiring absolute position of the tractor-trailer or truck, and deploying, adjusting or retracting commercial vehicle aerodynamic systems on the basis of the vehicle's absolute position. The state or positioning of the aerodynamic device can be updated for regulatory compliance, given known local, state and federal differences regarding vehicle requirements. The state or positioning of the aerodynamic device can also be updated for known locations where certain packaging strategies are required. For example, retracting all aerodynamic systems in known yards, docks, loading bays, etc.). The state or positioning of the aerodynamic structure can be updated for known locations for best packaging practice given civic sensitivities (e.g. all aerodynamic structures retracted in major cities).

The satellite functionality also provides a redundant speed signal also usable for the purposes of deploying, adjusting or refracting commercial vehicle aerodynamic systems based on speed.

4.3 Aerodynamic ECU with Platooning Awareness

Figure 44A:
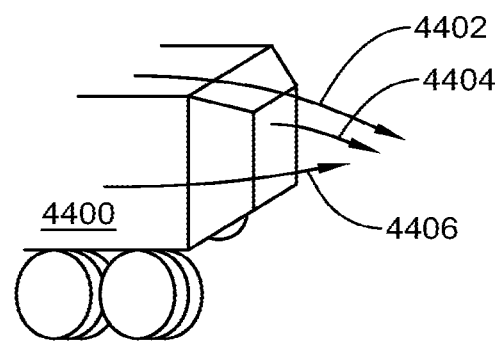
FIG. 44A is a partial perspective view of an aerodynamics ECU with platooning awareness for a single vehicle, according to an illustrative embodiment.
Figure 44B:
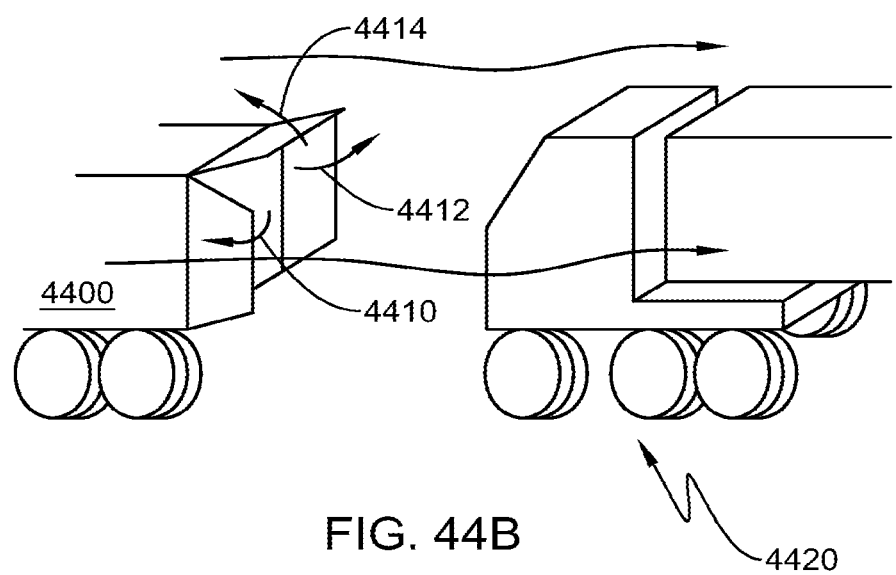
FIG. 44B is a partial perspective view of the aerodynamics ECU with platooning awareness for another vehicle following the first single vehicle, according to the illustrative embodiment.

Position awareness functionality is employed for the purposes of acquiring data characterizing absolute proximity of upstream and/or downstream vehicle forms and deploying, adjusting or retracting commercial vehicle aerodynamic systems on basis of net vehicle platoon drag force mitigation. FIG. 44A is a partial perspective view of an aerodynamics ECU with platooning awareness for a single vehicle, according to an illustrative embodiment. As shown in FIG. 44A, position awareness is employed for the aerodynamic structure mounted on the trailer 4400. As shown, the position awareness determines that this is the last vehicle in a platoon, and thus the air flows as shown by arrows 4402, 4404 and 4406. FIG. 44B is a partial perspective view of the aerodynamics ECU with platooning awareness for another vehicle following the first single vehicle, according to the illustrative embodiment. As shown, with platooning awareness employed, the aerodynamic structure of the trailer 4400 moves outward (in the direction of arrows 4410, 4412 and 4413). As shown, this results in an efficient airflow surrounding the platooning vehicles 4400 and 4420.

Various illustrative embodiments shown and described herein automate control of the positioning of an aerodynamic structure. It should be clear that the positioning (i.e. deployment, adjustment and/or retraction) of the aerodynamic structure can be controlled in an automatic manner in accordance with the teachings herein. The existing infrastructure of trucks and trailers can be utilized to perform the automatic actuation. For example, speed signals from existing wheel speed sensors for the ABS controller can be used to determine when the aerodynamic structure should be deployed and/or to determine when the structure should be retracted or adjusted. This is performed in an automatic manner so that there is no effort required on behalf of the truck operator to actuate the aerodynamic structures. This allows the driver to focus on driving as opposed to the aerodynamic structure.

Figure 45:
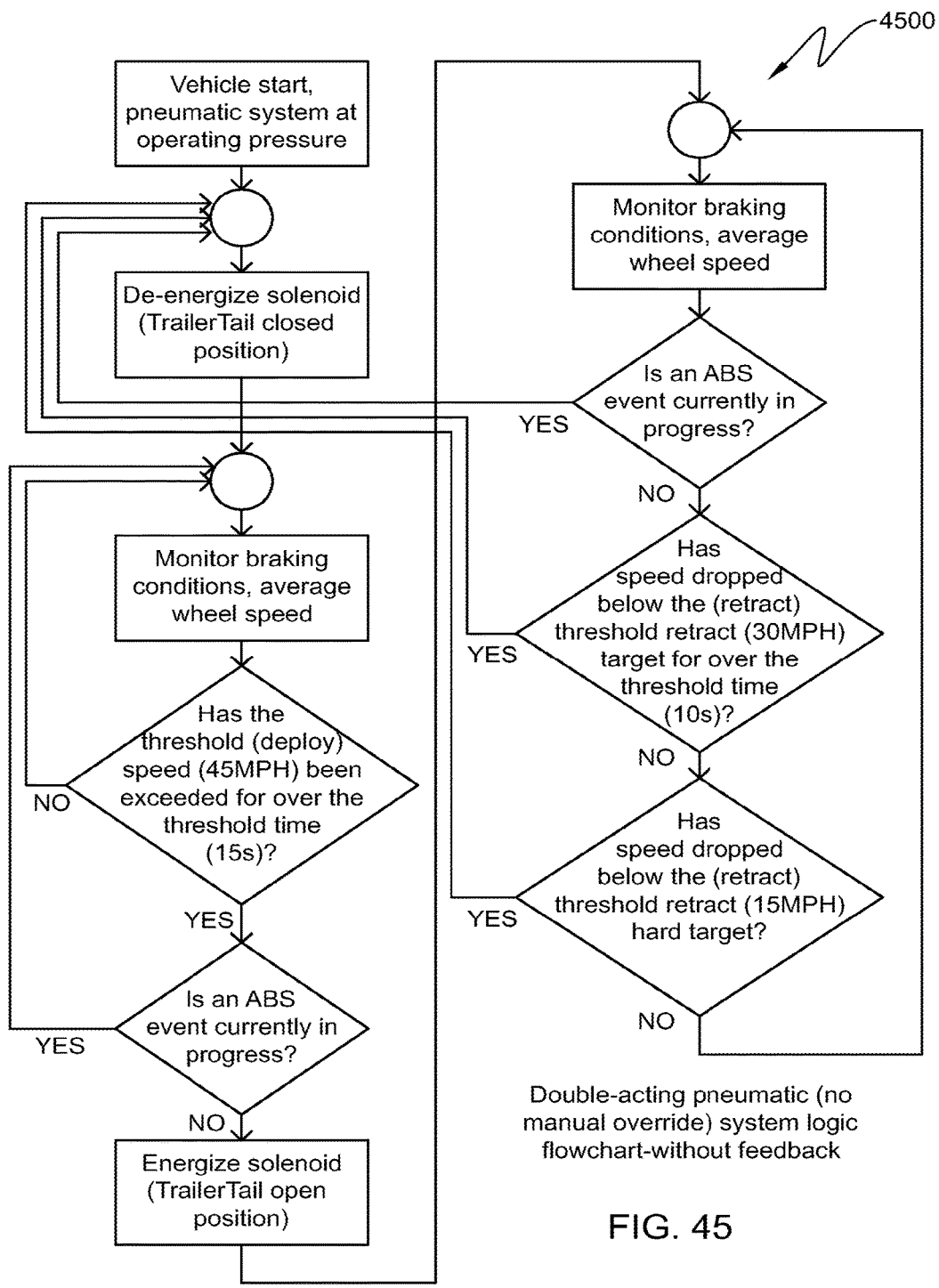
FIG. 45 is a flow diagram showing the operation of a double-acting system logic for use in controlling one or more aerodynamic panels in accordance with an embodiment.

Reference is now made briefly to FIG. 45, which depicts a flow diagram of a procedure/process 4500 showing the operation of a double-acting system logic for use in controlling one or more aerodynamic panels in accordance with an embodiment. The depicted steps should be self explanatory. In this embodiment the system operates free of any manual override and without (free of) feedback. However it should be clear to those of skill that such functions can be implemented in further embodiments.

Figure 45A:
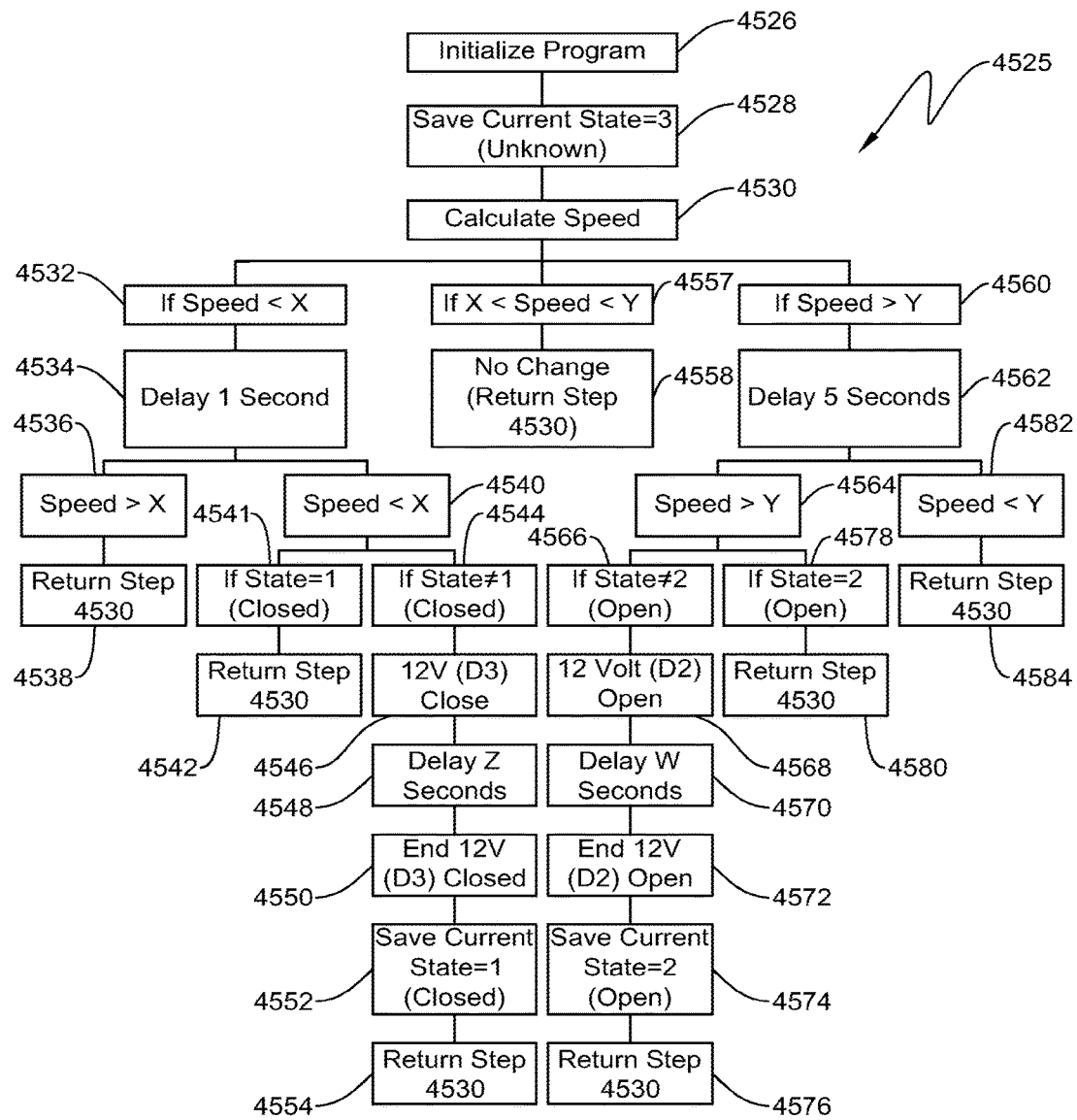
FIG. 45A is an alternative flow diagram showing an illustrative embodiment for double-acting automated control of one of more aerodynamic panels in accordance with an embodiment.

FIG. 45A is a flow diagram showing an illustrative embodiment for automated control of one of more aerodynamic panels in accordance with an embodiment. The procedure 4525 commences at step 4526 where the program is initialized. At step 4528, the current state of the aerodynamic structure is saved (as a "3" which signifies UNKNOWN), and at step 4530 the speed is calculated. In accordance with the exemplary embodiment, an aerodynamic structure having a state of "1" indicates it is closed, a state of "2" indicates it is open, and a state of "3" indicates an unknown state.

At step 4532, if the speed of the vehicle is less than "X", with X being a predetermined speed, such as 10 mph, then at step 4534 there is a delay of 1 second. If the speed is greater than X at step 4536, then at step 4538 the procedure returns to step 4530. If the speed is less than X at step 4540, then if the state is "1" (indicating the aerodynamic structure is closed), then at step 4541 the procedure returns to step 4530. If the state of the structure is not closed at step 4544, then at step 4546 the 12V signal to close is sent, and at step 4548 there is a delay of "Z" seconds, where a Z of 20 seconds is an exemplary embodiment; the important thing is simply that Z is large enough to allow the device to completely close during that time interval. Then at step 4550 the 12V signal ends. The current state is then saved at 4552 as closed, and at step 4554 the procedure returns to step 4530. If the speed is greater than X (10 mph) but less than "Y" (35 mph) at step 4557, then at step 4558 there is no change and the procedure returns to step 4530.

At step 4560, if the speed is greater than Y (35 mph), then at step 4562 a delay of 5 seconds is implemented. If the speed is greater than Y at step 4564 the procedure then determines the state of the aerodynamic structure. If the state is not open at step 4566, then a 12V signal is sent to open the structure at step 4568, then at step 4570 there is a delay of "W" seconds, where W is 120 seconds in an exemplary embodiment (W should be large enough to allow the device to completely open during that time interval), and then at step 4572 an end 12V signal is sent. The current state (being open) is then saved at step 4574, and at step 4576 the procedure returns to step 4530. If the speed is greater than Y at 4564 and the state is open at step 4578, then at step 4580 the procedure simply returns to step 4530 to calculate the speed. If the speed at step 4582 is less than Y, then at step 4584 the procedure returns to step 4530. The speed and delays selected for variables X, Y, W and Z can be easily customized to account for different vehicle or aerodynamic structure models, such as an aerodynamic structures with three or four sides, and, if desired, to also account for the route the particular trailer will travel. The speed and automatic release of the aerodynamic structures would have one particular set of variables for city driving, for example, and perhaps another for long-distance trips that involve more highway driving.

Figure 46:
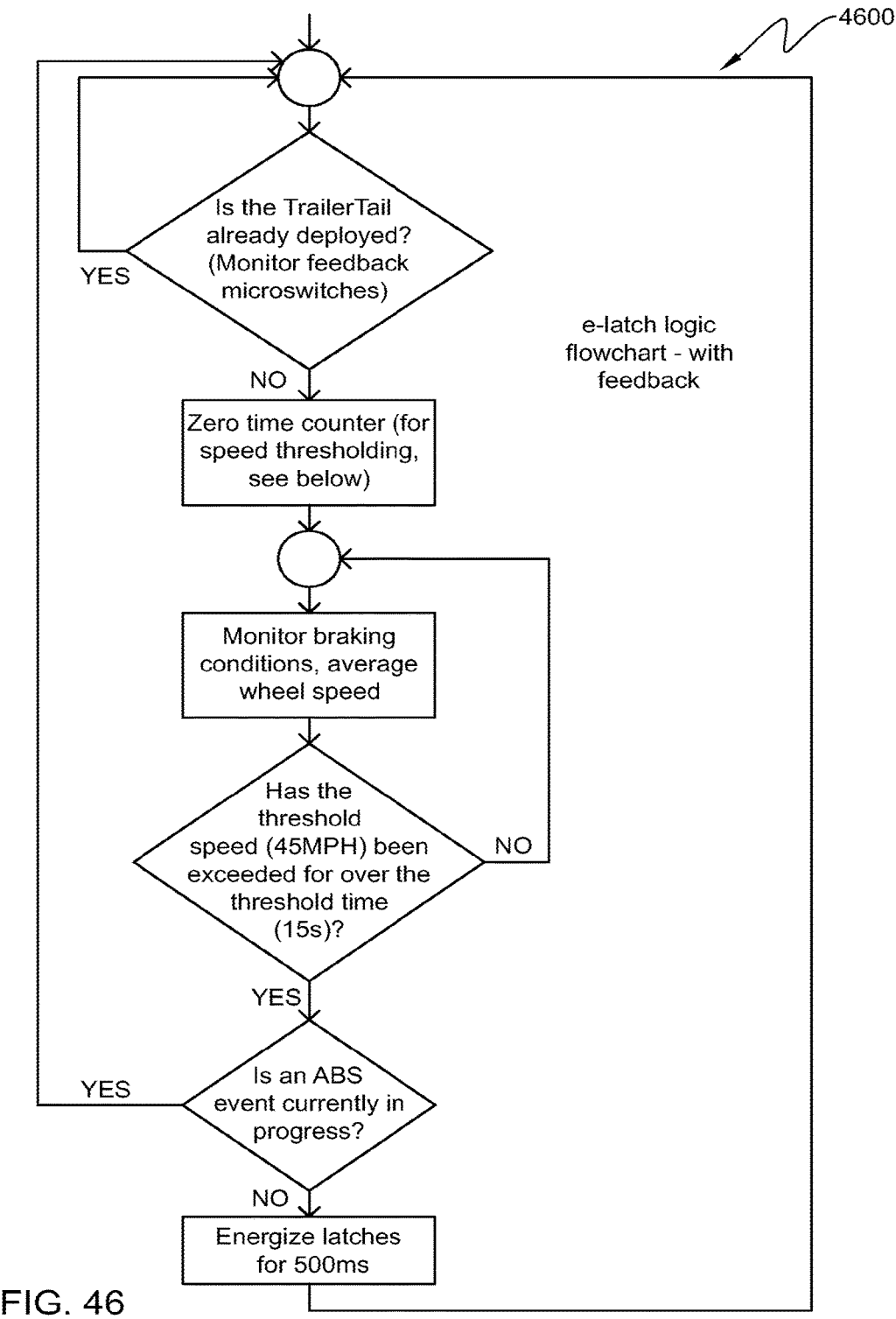
FIG. 46 is a flow diagram showing the operation of an e-latch system logic, with feedback, for use in selectively latching and unlatching one or more aerodynamic panels in accordance with an embodiment.

Referring to FIG. 46, there is shown a flow diagram of a procedure 4600 for the operation of an e-latch system logic, with feedback, for use in selectively latching and unlatching one or more aerodynamic panels in accordance with an embodiment. Again, the depicted steps should be self-explanatory.

Figure 47:
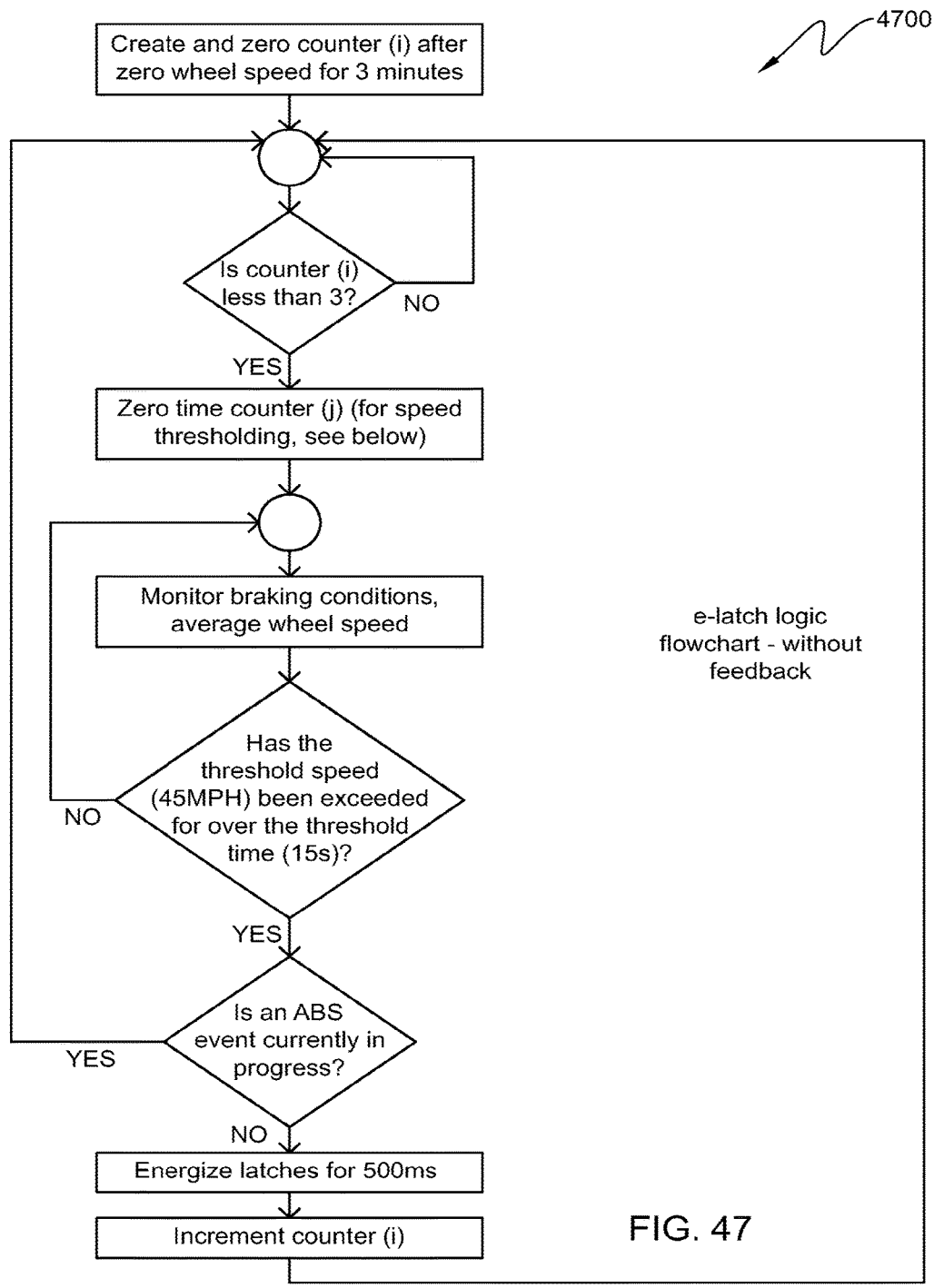
FIG. 47 is a flow diagram showing the operation of an e-latch system logic, without feedback, for use in selectively unlatching one or more aerodynamic panels in accordance with an embodiment.

Referring now to FIG. 47, there is shown a flow diagram of a procedure 4700 for the operation of an e-latch system logic, without (free of) feedback, for use in selectively latching and unlatching one or more aerodynamic panels in accordance with an embodiment. The depicted steps of this procedure/process should also be self-explanatory.

4.4. Sliding Swingarm Assembly

Figure 48:
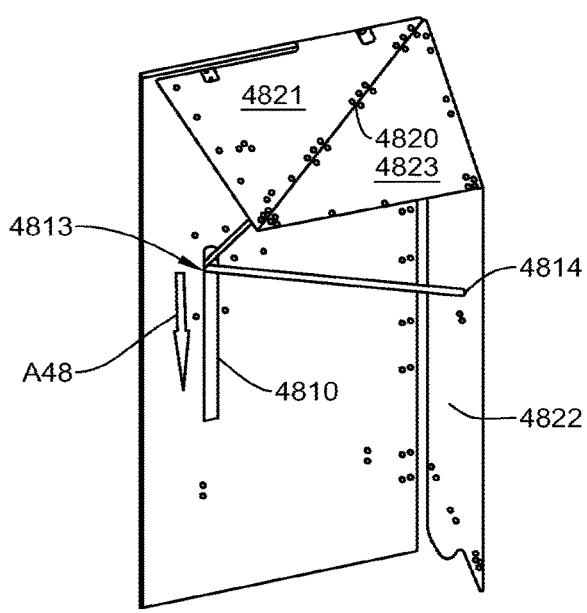
FIG. 48 is a top partial perspective view of an aerodynamic structure including a sliding swingarm assembly, in accordance with an illustrative embodiment.
Figure 49:
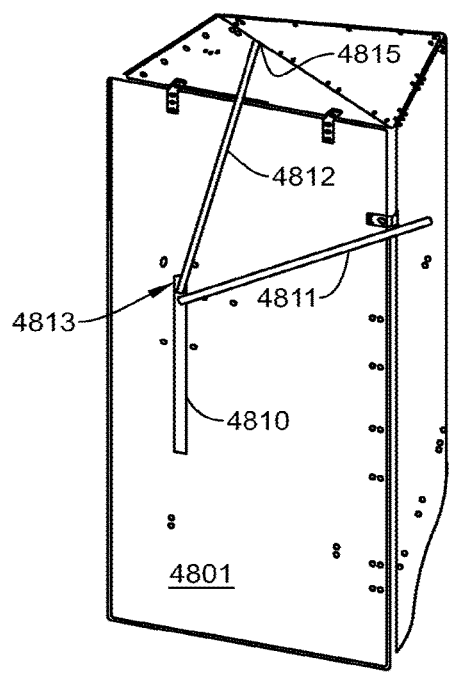
FIG. 49 is a partial perspective view of the aerodynamic structure including a sliding swingarm assembly, in accordance with the illustrative embodiment.

Reference is now made to FIGS. 48 and 49 showing an aerodynamic structure including a sliding swingarm assembly. FIG. 48 is a top partial perspective view of the aerodynamic structure and sliding swingarm assembly, shown in an open position. The aerodynamic structure includes a side panel 4822, a top panel 4821 and top joining panel 4823. The slider 4813 is located on a slider track 4810 and is connected to the side panel via tie rod 4811 and to the top panel via tie rod 4812. The aerodynamic structure is shown in the deployed position in FIGS. 48 and 49. To fold, stow or otherwise close the structure, the sliding mechanism 4813 moves downward (in the direction of arrow A48). This causes the top panels 4821 and 4823 to fold on the joint 4820 and the top panel 4821 to fold into the door surface 4801 to form an approximately flat structure when folded. The sliding mechanism can be biased to open (via a gas spring, for example) and then manually closed. The sliding mechanism can also (or alternatively) be motorized to provide automatic "hands-free" operation through a control system such as an ABS ECU or an otherwise controlled and programmed ECU known in the art. The motor can be electric, pneumatic or hydraulic and can be either double acting (motorized for both open and closed) or single acting (motorized in one direction and having passive return through stored energy from a spring or gravity).

4.5 Aerodynamics ECU

Figure 50:
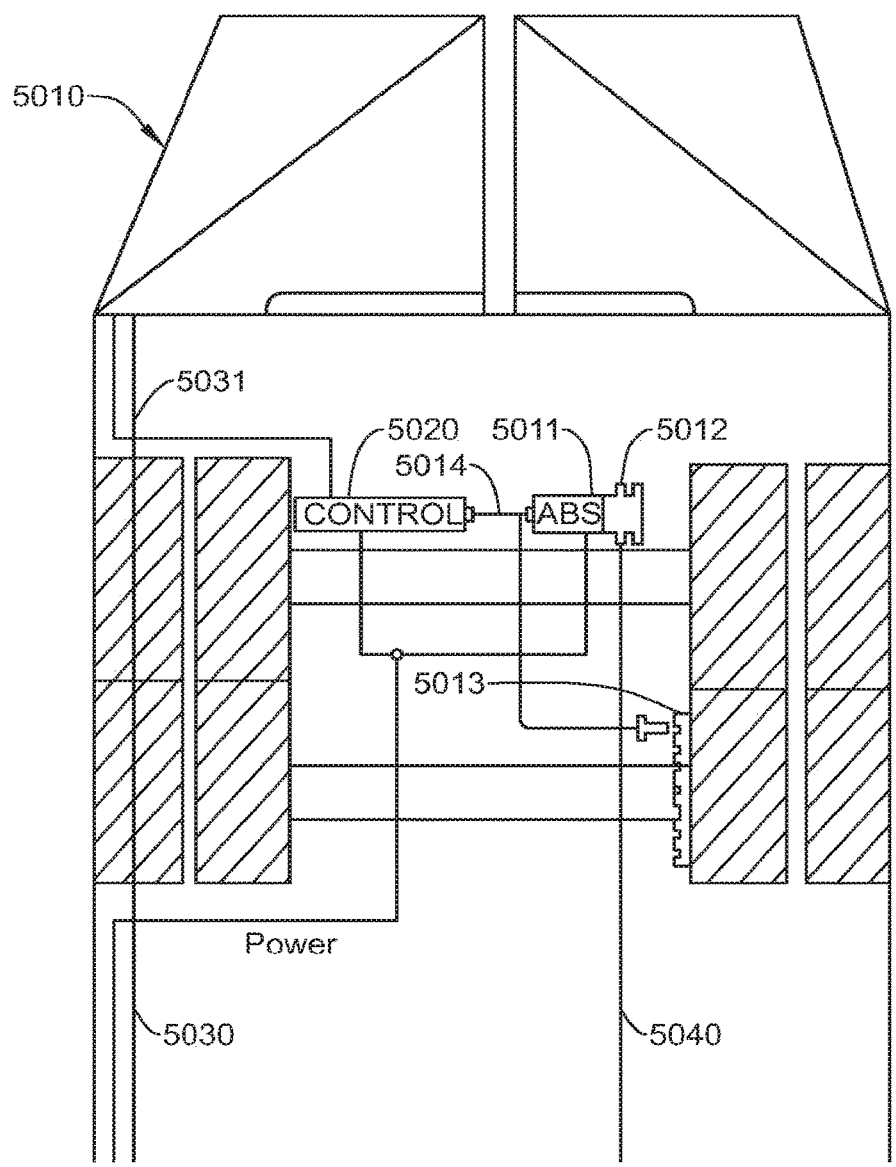
FIG. 50 is a schematic diagram of a bottom view of the routing of the system for ECUs for aerodynamic system control, in accordance with an illustrative embodiment.

Reference is made to FIG. 50 showing a schematic diagram of a bottom view of a trailer showing the routing system for ECUs for the aerodynamic system control, in accordance with an illustrative embodiment. An aerodynamic structure 5010 is mounted at the rear end of the trailer and can be electrical or electro-pneumatic. The ABS controller 5011 and valve manifold 5012 are operatively connected to the speed sensor 5013. Illustratively, the aerodynamic control (ECU) 5020 is connected to the same speed sensor 5013 via a signal splitting cable 5014. A main electrical conduit 5030 carries power to the ABS controller 5011 and the aerodynamics controller 5020. The conduit 5030 is also used to route control and power lines 5031 to the motorized aerodynamic structure 5010. A pneumatic service line 5040 is connected to the ABS control valve and can provide pressurized air to the aerodynamic controller 5020 as well, if desired. The cables in the main electrical conduit are connected to the tractor's power generation and storage system via the J560 connection as known commonly in the art.

4.6 Wiring Map of Automated Aerodynamic Controls

Figure 51:
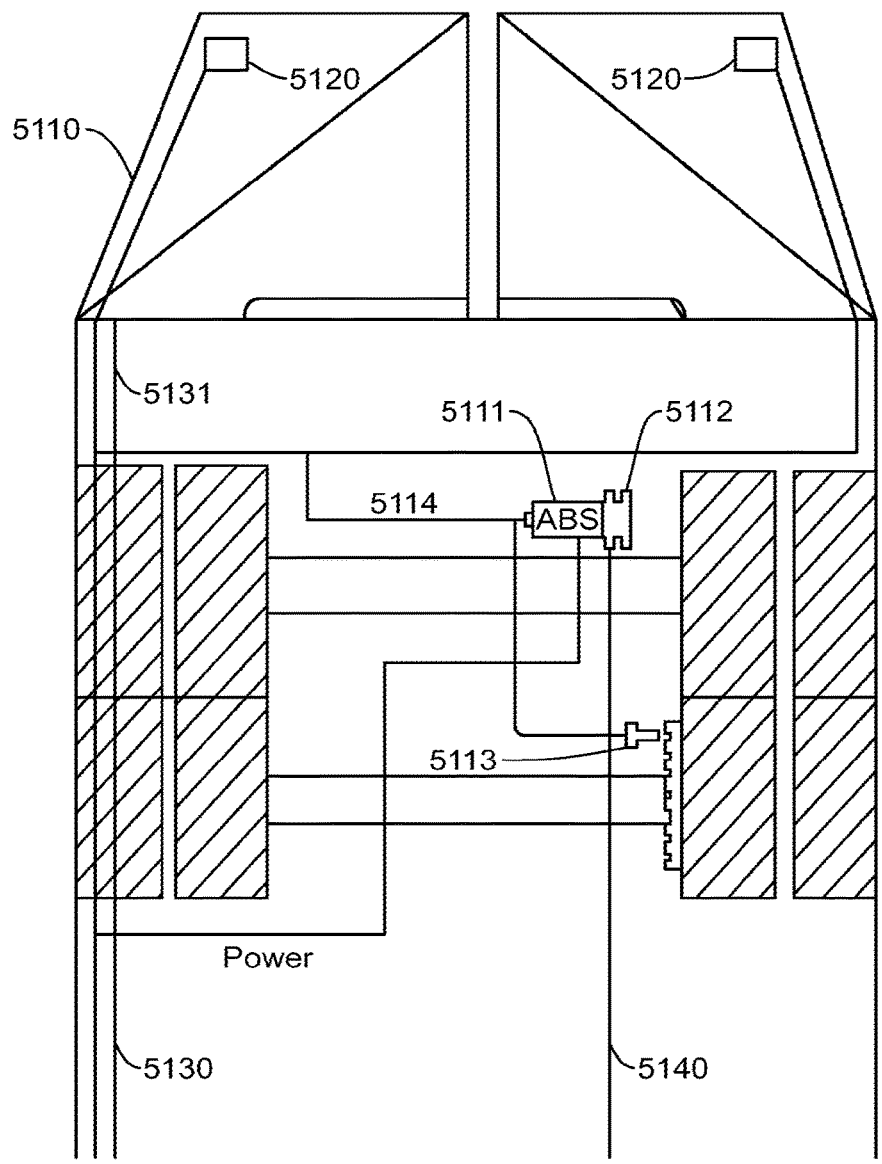
FIG. 51 is a schematic diagram of a bottom view of the system for ECUs and smart latches for aerodynamic system control, as implemented on a trailer, in accordance with an illustrative embodiment

FIG. 51 is a schematic diagram of a bottom view of the routing of the system for ECUs and "smart" latches 5120 for aerodynamic system control, as implemented on a trailer. An electrical or electro-pneumatic aerodynamic structure 5110 is mounted at a rear end of the trailer. In accordance with an illustrative embodiment, a smart latch 5120 is a latch that has a self-contained processing unit (instead of relying on a secondary processing unit). The smart latch processing unit is capable of deciphering the speed sensor signal and executing logic to indicate when to release the latch. The ABS controller 5111 and valve manifold 5112 are connected to the speed sensor 5113. The two smart latches are also connected to the same speed sensor 5113 via a signal splitting cable 5114, or other appropriate wired or wireless technology known in the art. The main electrical conduit 5130 carries power to the ABS controller 5111 and the smart latches 5120. The conduit 5130 can also be used to route control and power lines 5131 to the motorized aerodynamic device 5110. A pneumatic service line 5140 is connected to the ABS control valve and can provide pressurized air to the aerodynamic controller as well. The cables in the main electrical conduit are connected to the tractor's power generation and storage system via the J560 connection known commonly in the art.

4. Motor-Driven Cable System

Figure 52:
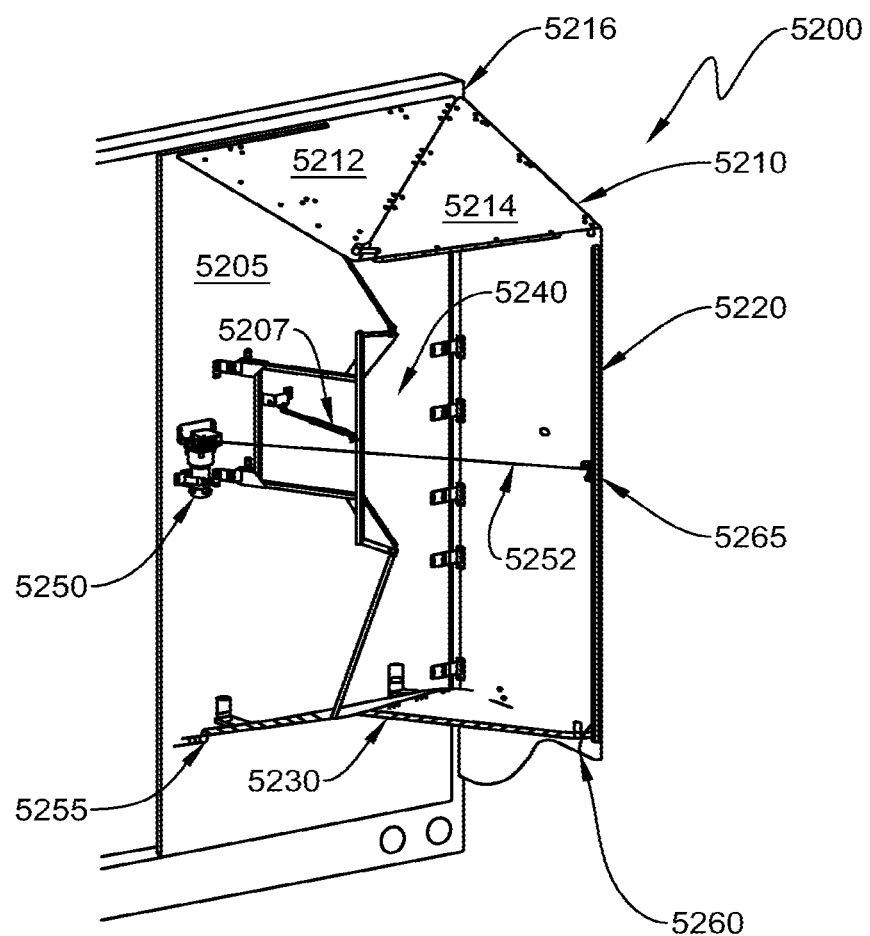
FIG. 52 is a partial perspective view of an aerodynamic structure shown in the deployed position and comprising an upper panel, a side panel and a lower panel including a hinged swingarm assembly and a powered actuator (e.g. an electric motor) to assist in opening and/or closing of the aerodynamic structure, in accordance with the illustrative embodiments.
Figure 52A:
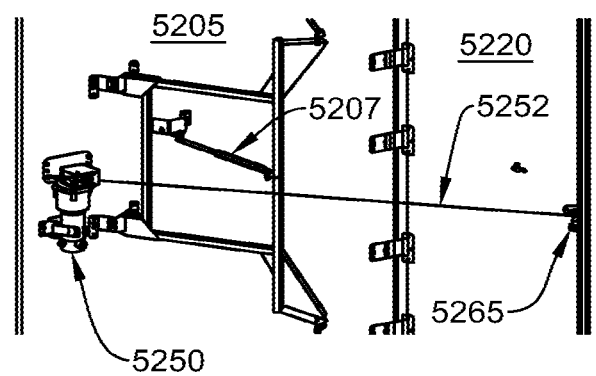
FIG. 52A is a more detailed view of the powered actuator shown in FIG. 52 operatively connected between the door and a side panel, in accordance with the illustrative embodiment.
Figure 53:
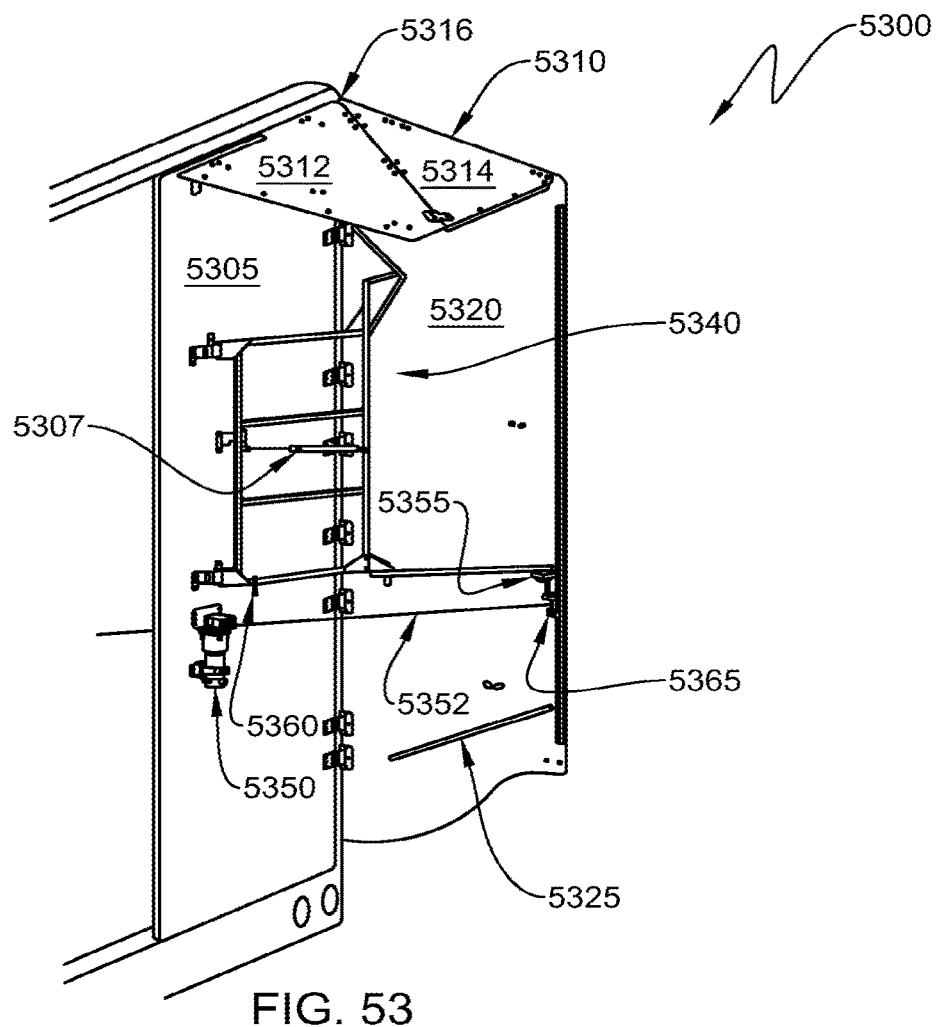
FIG. 53 is a partial perspective view of an aerodynamic structure shown in the deployed position and comprising an upper panel and a side panel, and including a hinged swingarm assembly and a powered actuator (e.g. an electric motor) to assist in opening and/or closing of the aerodynamic structure, in accordance with the illustrative embodiments.
Figure 53A:
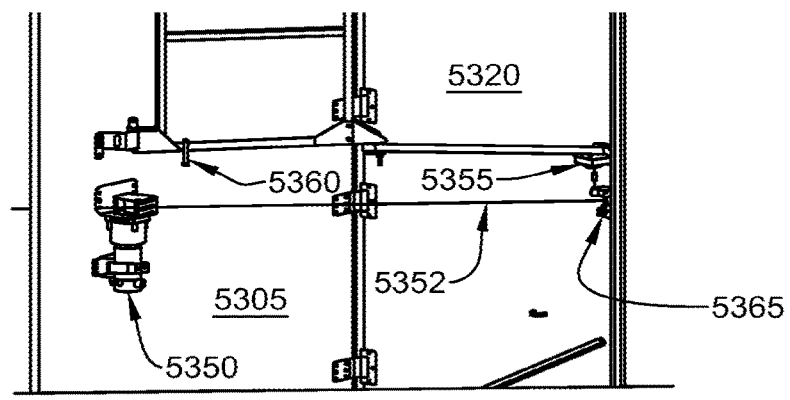
FIG. 53A is a more detailed view of the powered actuator shown in FIG. 53 operatively connected between the door and a side panel, in accordance with the illustrative embodiments.
Figure 54:
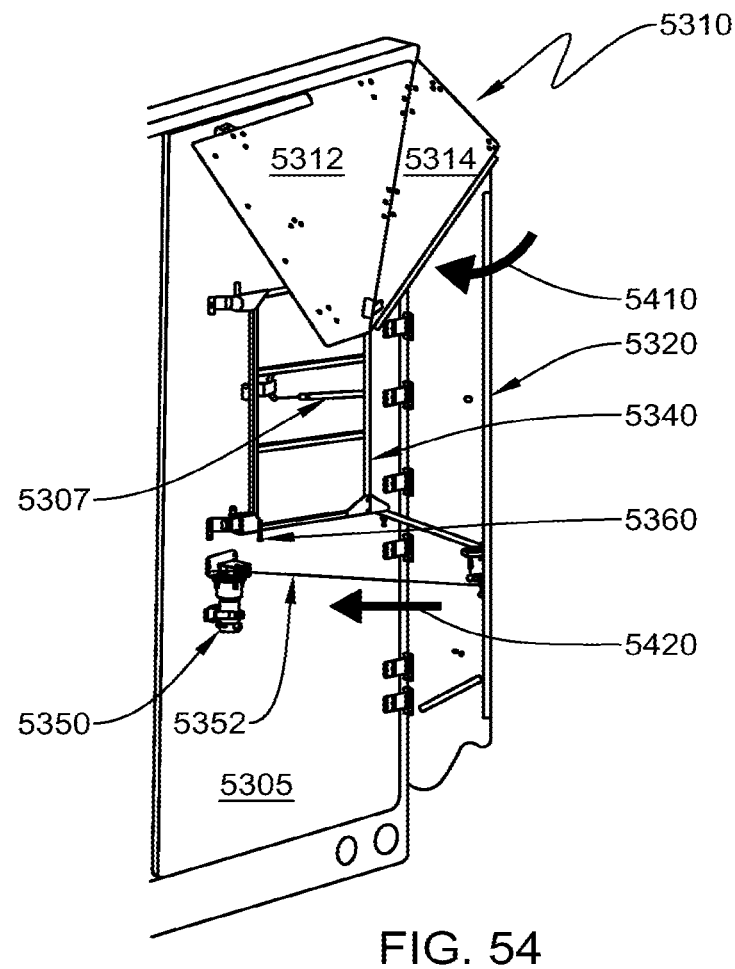
FIG. 54 is a partial perspective view of the aerodynamic structure of FIG. 53 shown in a partially-collapsed position, in accordance with the illustrative embodiments.
Figure 54A:
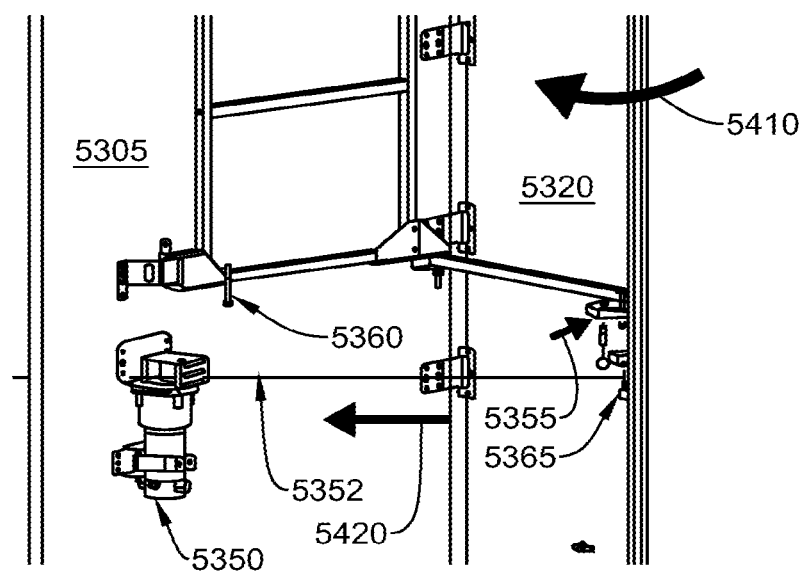
FIG. 54A is a more detailed view of the powered actuator shown in FIG. 54 operatively connected between the door and the side panel, shown in the partially-collapsed position, in accordance with the illustrative embodiments.

Reference is now made to FIGS. 52-56 showing various illustrative embodiments incorporating motor-driven cable systems. FIG. 52 is a partial perspective view of a four-sided aerodynamic structure shown in the deployed position and including a hinged swingarm assembly and a powered actuator (e.g. an electric motor) to assist in opening and/or closing of the aerodynamic structure, in accordance with the illustrative embodiments. FIG. 52A is a more detailed view of the powered actuator shown in FIG. 52 operatively connected between the door and a side panel. FIG. 53 is a partial perspective view of a three-sided aerodynamic structure shown in the deployed position and including a hinged swingarm assembly and a powered actuator (e.g. an electric motor) to assist in opening and/or closing of the aerodynamic structure, in accordance with the illustrative embodiments. FIG. 53A is a more detailed view of the powered actuator shown in FIG. 53 operatively connected between the door and a side panel. FIG. 54 is a partial perspective view of the aerodynamic structure of FIG. 53 shown in a partially-collapsed position. FIG. 54A is a more detailed view of the powered actuator shown in FIG. 54 operatively connected between the door and the side panel, shown in the partially-collapsed position.

As shown in FIG. 52, the four-sided aerodynamic structure 5200 comprises an upper panel 5210 that includes a first panel portion 5212 hingedly secured to the door 5205. The upper panel 5210 includes a second upper panel portion 5214 hingedly connected to the first panel portion along a hinge-line 5216, and secured to a side panel 5220. The aerodynamic structure 5200 also comprises a bottom panel 5230. A similar aerodynamic structure is shown in FIG. 53, which comprises an upper panel 5310 including first panel portion 5312 and second panel portion 5314 that hinge together along hinge line 5316, and a side panel 5320. Note that the three-sided structure 5300 shown in FIGS. 53 and 54 does not include a bottom panel. The linkage assembly 5240 of FIG. 52 is secured to the door 5205, the upper panel 5210 and the lower panel 5230. The linkage assembly 5340 of FIGS. 53-54 is secured between the door 5305, the upper panel 5310 and the side panel 5340.

With reference to FIGS. 52-54, a motor-driven cable system is provided that includes a winch motor 5250, 5350 that controls a cable 5252, 5352 (respectively). The cable is secured to the side panel by a tension switch rocker 5265, 5365. The motor-driven cable system allows for a fully automated system that can both open and close the aerodynamic structure 5200, 5300. The aerodynamic structure 5200, 5300 is passively biased open by the power of a gas spring 5207, 5307. Then the control unit requests the system to close the aerodynamic structure, the winch motor 5250, 5350 pulls in the cable (in the direction of arrow 5420 in FIG. 54), fighting against the bias of the gas spring 5207 and closing the unit, in the direction of arrow 5410 in FIG. 54.

An electronic latch 5255, 5355 holds the aerodynamic structure 5200, 5300 closed against the power of the gas spring 5207 and wind gusts, where applicable. The latch 5255, 5355 is secured to the striker bolt 5260, 5360 when the aerodynamic structure 5200, 5300 is in the closed position, against the door 5205, 5305. Although the latch 5255 is shown on the bottom panel 5230 and the associated pin or bolt 5260 is secured to the side panel 5220, it is expressly contemplated that the placement of the latch and associated pin can be placed at any appropriate position so as to hold the panels securely closed when in the folded position. Likewise, the latch 5355 is shown secured to the side panel, with the striker bolt 5360 secured proximate the hinged swingarm assembly 5340. The placement of the bolt and latch are similarly variable within ordinary skill to achieve secure latching of the panels in the closed position when the aerodynamic structure is closed.

When the electronic control unit (ECU) sends a request to open (for example, based upon the vehicle speed exceeding a certain amount, such as 35 mph), the electronic latch 5255, 5355 releases and the motor 5250, 5350 unwinds the cable 5252, 5352. Loss of tension in the cable signifies the end of the opening sequence, and the motor 5250, 5350 stops turning. The tension switch rocker 5265, 5365 monitors the amount of tension in the cable. In addition to stopping the motor at the end of the opening sequence, the tension switch rocker 5265, 5365 momentarily halts the motor if the opening sequence stalls for any reason (such as a high wind gust against the outside of the side panel). This protects against extra unspooling of cable, which could potentially get caught on other rear components.

There are several mechanisms that keep tension on the cable. The amount of tension can be monitored by the tension switch rocker 5265, 5365, shown in greater detail in FIG. 55. One way to ensure proper tension is maintained is to deliver a controlled level of electric current to the motor at all times when the aerodynamic structure is in a static position. This puts a constant amount of tension on the cable. A second tensioning means is the gas spring that forces the aerodynamic structure open, which keeps a constant tension on the wire. A tension sensing rocker switch (5265, 5365) controls when the electric winch spools out cable, maintaining tension during open and close operations. A third tensioning means is a cable spool mounted opposite the winch motor that stores any excess cable, and is held in tension using a spring motor (similar to a conventional tape measure storage system).

In certain illustrative embodiments, the motor-driven cable system and associated gas spring can be a functional system without the use of the latching mechanism. In accordance with a non-latching system, the cable and motor are responsible for maintaining the closed position of the aerodynamic structure under high winds (as opposed to being a back-up restraint system when the latching mechanism is included). The drive system can further have electronic brakes, physical breaks, backdrive limitations, employ an electric latch, or maintain applied force, in order to hold the unit closed when in high winds.

Moreover, the automated system for opening and closing the aerodynamic structure can be created using a plurality of actuators. These actuators perform a similar function to the gas spring or the winch, however use different motive forces. Types of actuators contemplated include a linear pneumatic cylinder, a pneumatic contracting muscle, a pneumatic expanding bladder, indirect drive linear electric motor, linear hydraulic cylinder, electric winch, rotary pneumatic motor, rotary electric motor, and other actuators known to those having ordinary skill.

5.1 Tension Rocker Switch

Figure 55:
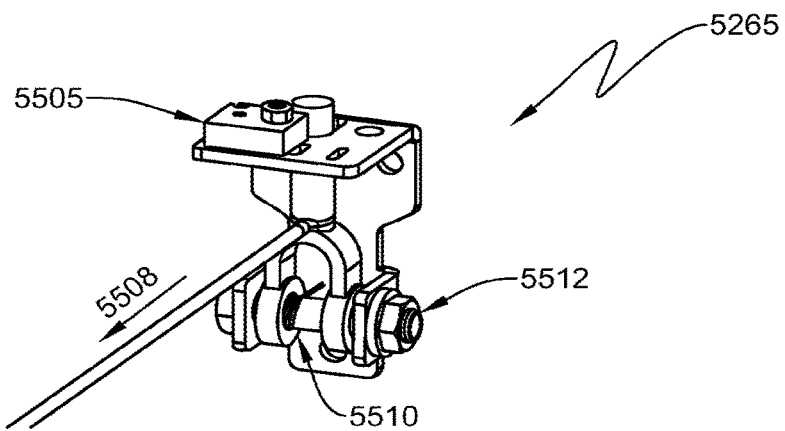
FIG. 55 is a detailed view of the tension rocker switch of the motor-driven cable winch system, in accordance with the illustrative embodiments.

Reference is now made to FIG. 55 showing a detailed view of the tension rocker switch of the motor-driven cable winch system, in accordance with the illustrative embodiments. The tension rocker switch is illustrated as the switch 5265 from FIG. 52; however it can also comprise the switch 5365 from FIGS. 53-54, or another appropriate switch in accordance with the illustrative embodiments herein. The rocker switch 5265 comprises a snap acting limit switch 5505 that senses the position of the rocker. When a sufficient amount of cable tension (arrow 5508) overcomes the torsion spring 5510 on the axle 5512, the rocker rotates into contact with the snap-acting limit switch 5505. A cover (not shown) can be placed over the limit switch 5505 to protect the switch from debris and other unwanted materials. The tension switch is used in conjunction with an electric winch operated fully automatic aerodynamic structure. The switch monitors that the cable maintains a specific amount of tension 5508 at all times and prevents the winch from unraveling excess cable.

5.2 Indicator Light on Electronic Latch

Figures 56, 56A:
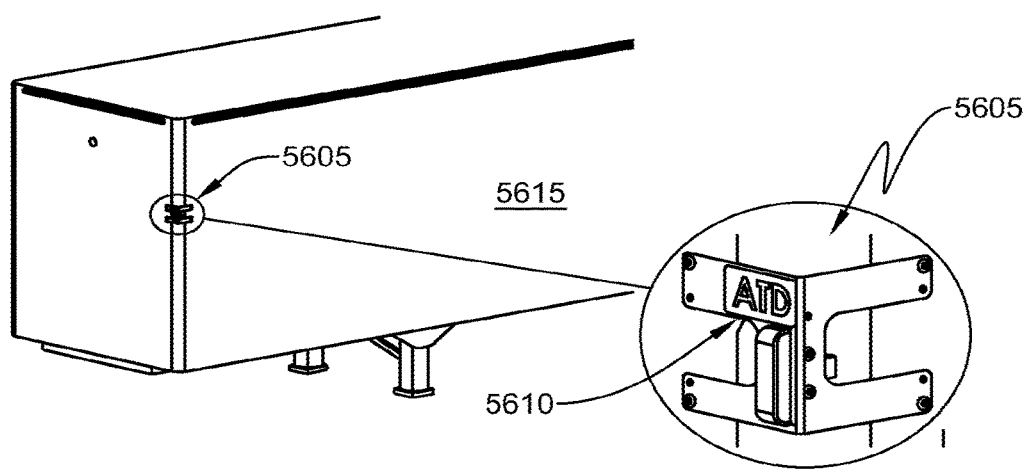
FIG. 56 is a partial perspective view of an indicator light to be used in conjunction with an electronic latching mechanism, in accordance with the illustrative embodiments.
FIG. 56A is a more detailed view of the electronic latching mechanism with integrated indicator light, in accordance with the illustrative embodiments.

In accordance with the electronic latch embodiments, an indicator light may be used. FIG. 56 is a partial perspective view of an indicator light to be used in conjunction with an electronic latching mechanism, in accordance with the illustrative embodiments. FIG. 56A is a more detailed view of the integrated indicator light. The system 5600 includes an integrated indicator light 5605, which is mounted to a bracket 5610. The light 5605 is mounted on the front radius of the trailer 5615 and is visible through the driver side rear view mirror. The light indicates the position of the aerodynamic structure as being open or closed. For example, the light can be "ON" if the aerodynamic structure is closed, the light can be "OFF" if the aerodynamic structure is open, and the light can be flashing if the aerodynamic structure is open and the vehicle is driving in reverse (such as to warn the driver of damage risk). The light works in conjunction with the fully automated and partially automated aerodynamic structure to increase driver awareness of the aerodynamic structure.

It should be clear that the various embodiments described herein provide effective and reliable mechanisms and techniques selectively deploying and manipulating rear aerodynamic devices. These mechanisms and techniques effectively employ a variety of motive mechanisms commonly available in the operational systems of commercial trucks including those hydraulics, pneumatics, vacuum and electromechanics.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, although the term "aerodynamic structure" has been used herein in relation, for the most part, to three-sided structures having an upper panel and a pair of side panels, it is expressly contemplated that a four-sided structure having an additional bottom panel or other appropriate structure can also employ the teachings herein. The embodiments herein are applicable to swinging door trailer structures, as well as rolling door structures, although swinging door embodiments have been shown and described for illustrative purposes. These embodiments are readily applicable to rolling door structures for providing aerodynamic benefits and access to the trailer interior as appropriate. Also, the upper panel of the aerodynamic structure is generally depicted as a folding origami-style panel; however a non-origami upper panel can also be implemented in accordance with the illustrative embodiments herein. Moreover, it is expressly contemplated that latch mechanisms, actuators, and other mechanical devices described herein can be operated using electric, hydraulic, pneumatic or a combination of such motive forces. Electrical devices can be employed using linear motors, stepper motor servos, or a combination thereof. Furthermore, while nominal speed is used as an event trigger example, it is expressly considered that other vehicle events, such as a change in speed over a set amount of time, driving in a certain gear, or an instantaneous acceleration value, can be used as an event trigger. One example is an accelerometer that signals to deploy an aerodynamic structure once the vehicle has increased its speed by 20 mph or more during a 30 second interval—this is a better design match to the capabilities and inherent margin of error in an accelerometer. Additionally, directional terms such as "top", "bottom", "side", "rear" and "front" are exemplary only and not definitive. Also, as used herein the terms "process" and/or "processor" should be taken broadly to include a variety of electronic hardware and/or software based control functions and components (as well as any appropriate pneumatic, hydraulic and/or electromechanical components). Moreover, any depicted process (including procedure or process steps) or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system comprising:
   one or more actuators operatively connected to at least one panel of an aerodynamic structure to move the aerodynamic structure from a deployed position to a retracted position or from a retracted position to a deployed position;
   one or more electronic control units that process sensor signals to analyze motion of a vehicle and control the one or more actuators based on the motion of the vehicle and control logic; and
   one or more mechanisms that bias the aerodynamic structure into the deployed position or the retracted position when the one or more actuators are not actuated, wherein two or more panels of the aerodynamic structure are operatively connected so that movement of one panel causes movement in another panel.

2. The system of claim 1 wherein the aerodynamic structure is rear-facing, and wherein the aerodynamic structure comprises at least an upper panel, a first side panel, and a second side panel.

3. The system of claim 2 wherein:
the upper panel, the first side panel, and the second side panel each mounted to a door of a cargo body of the vehicle and move between a folded position on the door in the retracted position and the deployed position,
in the deployed position, the aerodynamic structure has an internal cavity defined by the upper panel, the first side panel, and the second side panel, and
a linkage assembly is operatively connected between the upper panel and the first side panel or the second side panel so that movement of the first side panel or the second side panel causes movement of the linkage assembly in response thereto and movement of the upper panel in response to the movement of the linkage assembly.

4. The system as set forth in claim 2 wherein:
the aerodynamic structure further comprises one or more bottom panels,
the upper panel, the one or more bottom panels, the first side panel, and the second side panel each mounted to a door of the cargo body and move between a folded position on the door in the retracted position and the deployed position,
in the deployed position, the aerodynamic structure has an internal cavity defined by the upper panel, the one or more bottom panels, the first side panel, and the second side panel, and
a linkage assembly is operatively connected between the upper panel and the one or more bottom panels so that movement of the one or more bottom panels causes movement of the linkage assembly in response thereto and movement of the upper panel in response to the movement of the linkage assembly.

5. The system of claim 2 wherein the one or more actuators are operatively connected between a door of a cargo body of the vehicle and the first side panel or the second side panel.

6. The system of claim 2 wherein the one or more actuators are operatively connected between a door of a cargo body of the vehicle and the upper panel.

7. The system of claim 1 further comprising an electronic latch mechanism operatively connected to the one or more electronic control units, and wherein the electronic latch mechanism releases based on a signal received from the one or more electronic control units.

8. The system of claim 7 wherein the aerodynamic structure is configured to move to the deployed position or the retracted position under a biasing force supplied by the one or more mechanisms upon release of the electronic latch mechanism.

9. The system of claim 7 wherein the aerodynamic structure is secured in the retracted position when the electronic latch mechanism is in a latched state and the aerodynamic structure is biased into the deployed position by the one or more mechanisms when the electronic latch mechanism is in a released state.

10. The system of claim 7 wherein the aerodynamic structure is secured in the deployed position when the electronic latch mechanism is in a latched state and the aerodynamic structure is biased into the retracted position by the one or more mechanisms when the electronic latch mechanism is in a released state.

11. The system of claim 7 further comprising an indicator, wherein the indicator displays feedback from the electronic latch mechanism or the one or more actuators to alert a user of a position of the aerodynamic structure.

12. The system of claim 1 wherein the one or more powered actuators is a motor-driven cable winch system that automatically pulls one or more panels of the aerodynamic structure into the retracted position based upon a signal received from the one or more electronic control units.

13. The system of claim 1 wherein the one or more mechanisms that bias the aerodynamic structure comprise one or more gas springs or torsion springs.

14. The system of claim 1 wherein one or more of the one or more electronic control units is an antilock braking system controller.

15. The system of claim 1 wherein one or more of the one or more electronic control units is connected to a wheel speed sensor.

16. The system of claim 1 wherein one or more of the one or more electronic control units includes a built-in accelerometer to analyze the motion of the vehicle.

17. The system of claim 1 wherein one or more of the one or more electronic control units includes a built-in GPS to analyze the motion of the vehicle.

18. The system of claim 1 wherein one or more of the one or more of the electronic control units is connected to a first pressure sensor and a second pressure sensor, wherein the first pressure sensor is located at a rear of the aerodynamic structure and the second pressure sensor is located in an airstream, wherein the first pressure sensor and the second pressure sensor calculates aerodynamic pressure drag at the rear of the aerodynamic structure.

19. The system of claim 1 wherein one or more of the one or more electronic control units is connected to an optical reader that calculates the motion of the vehicle by viewing displacement of the ground relative to the vehicle.

20. The system of claim 1 wherein the one or more actuators includes one or more of: a linear pneumatic cylinder, a pneumatic contracting muscle, a pneumatic expanding bladder, an indirect drive linear electric motor, a linear hydraulic cylinder, an electric winch, a rotary pneumatic motor, or a rotary electric motor.

21. The system of claim 1, wherein the actuator is operatively connected to the at least one panel by a linkage.

22. A system comprising:
one or more actuators operatively connected to at least one panel of an aerodynamic structure to control positioning of the aerodynamic structure between one of a deployed position or a retracted position;
one or more electronic control units that process sensor signals to analyze motion of the vehicle and control the one or more actuators based on motion of the vehicle and control logic;
one or more mechanisms that bias the aerodynamic structure into the other of the deployed position or the retracted position,
wherein two or more panels of the aerodynamic structure are operatively connected so that movement of one panel causes movement in another panel,
wherein the aerodynamic structure comprises at least one upper panel and at least two side panels, and
wherein the one or more actuators are operatively connected between a door of a cargo body of the vehicle and the at least one upper panel or the at least two side panels.

23. A system comprising:
one or more actuators operatively connected to at least one panel of an aerodynamic structure by a linkage to move the aerodynamic structure from a deployed position to a retracted position or from a retracted position to a deployed position;
one or more electronic control units that process sensor signals to analyze motion of a vehicle and control the one or more actuators based on the motion of the vehicle and control logic; and
one or more mechanisms that bias the aerodynamic structure into the deployed position or the retracted position when the one or more actuators are not actuated.

24. The system of claim 23, wherein two or more panels of the aerodynamic structure are operatively connected so that movement of one panel causes movement in another panel.

* * * * *